(12) United States Patent
Cho et al.

(10) Patent No.: US 10,937,245 B2
(45) Date of Patent: Mar. 2, 2021

(54) LIGHTING AND INTERNET OF THINGS DESIGN USING AUGMENTED REALITY

(71) Applicant: SIGNIFY HOLDING B.V., Eindhoven (NL)

(72) Inventors: Nam Chin Cho, Peachtree City, GA (US); Parth Joshi, Sugar Hill, GA (US); William Thomas Cook, Peachtree City, GA (US); Debasmita Mukherjee, Kolkata (IN); Aarathi Ramesh, Kozhikode (IN); Vinay Mahantgauda Patil, Pune (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/195,581

(22) Filed: Nov. 19, 2018

(65) Prior Publication Data

US 2019/0188917 A1    Jun. 20, 2019

Related U.S. Application Data

(63) Continuation-in-part of application No. 15/971,623, filed on May 4, 2018, now Pat. No. 10,726,463.
(Continued)

(51) Int. Cl.
*G06T 19/00* (2011.01)
*G06T 15/50* (2011.01)

(52) U.S. Cl.
CPC .......... *G06T 19/006* (2013.01); *G06T 15/506* (2013.01); *G06T 2210/04* (2013.01)

(58) Field of Classification Search
None
See application file for complete search history.

(56) References Cited

U.S. PATENT DOCUMENTS 6,980,697 B1   12/2005   Basso et al.
9,111,326 B1    8/2015   Worley
(Continued)

FOREIGN PATENT DOCUMENTS

EP   1883052        1/2008
EP   2709427        3/2014
WO   WO 2014/150430  9/2014

OTHER PUBLICATIONS

Monika Maragkou and Nicolas Roy, Daylight Analysis in the Design Process of Residential Buildings _ The Daylight Site, Feb. 14, 2017, Velux Group (Year: 2017).*

(Continued)

*Primary Examiner* — YuJang Tswei

(57) ABSTRACT

An augmented reality-based lighting design method includes displaying, by an augmented reality device, a real-time image of a target physical area on a display screen. The method further includes displaying, by the augmented reality device, a lighting fixture 3-D model on the display screen in response to a user input, wherein the lighting fixture 3-D model is overlaid on the real-time image of the target physical area. The method also includes determining, by the augmented reality device, illuminance values for locations in the target physical area, where the illuminance values indicate illuminance levels of a light to be provided by a lighting fixture represented by the lighting fixture 3-D model. The method further includes displaying, by the augmented reality device, the illuminance values on the display screen overlaid on the real-time image of the target physical area.

9 Claims, 40 Drawing Sheets

Related U.S. Application Data

(60) Provisional application No. 62/722,780, filed on Aug. 24, 2018, provisional application No. 62/608,361, filed on Dec. 20, 2017.

(56) References Cited

U.S. PATENT DOCUMENTS

| | | | |
|---|---|---|---|
| 9,495,936 B1* | 11/2016 | Norquist | G09G 5/02 |
| 10,210,664 B1* | 2/2019 | Chaturvedi | G06T 19/006 |
| 10,275,563 B2 | 4/2019 | Schafer et al. | |
| 2002/0010734 A1 | 1/2002 | Ebersole | |
| 2002/0138316 A1 | 9/2002 | Katz et al. | |
| 2004/0007994 A1 | 1/2004 | Ribarich et al. | |
| 2010/0060639 A1* | 3/2010 | Breton | G06T 15/50 345/426 |
| 2010/0265311 A1 | 10/2010 | Carpenter et al. | |
| 2013/0061142 A1 | 3/2013 | Brier | |
| 2013/0084970 A1 | 4/2013 | Geisner et al. | |
| 2014/0159589 A1* | 6/2014 | Pandharipande | H05B 37/0227 315/155 |
| 2014/0292208 A1* | 10/2014 | Chemel | H05B 33/0854 315/154 |
| 2015/0271375 A1 | 9/2015 | Chien | |
| 2016/0363696 A1 | 12/2016 | Dao | |
| 2018/0132841 A1 | 5/2018 | Dreyfuss | |
| 2018/0197339 A1 | 7/2018 | Sathyanarayana et al. | |
| 2019/0114828 A1 | 4/2019 | Trowbridge | |

OTHER PUBLICATIONS

International Search Report for PCT/EP2018/025323, dated Apr. 10, 2019.

Anonymous: "(1) Ai Photometric Light—Arnold for Maya User Guide—Solid Angle". Feb. 4, 2015 (Feb. 4, 2015). pp. 1-2, XP055342274, retrieved from the internet: URL:http://web.archive.org/web/20150204051354/https://supportsolidangle.com/display/AFMUG/Ai+Photometric+Light.

Sato I et al: "Acquiring a Radiance Distribution to Superimpose a Virtual Objects Onto a Real Scene", IEEE Transactions on Visualization and Computer Graphics, IEEE Service Center, Los Alamitos, CA, US, vol. 5, No. 1, Mar. 31, 1999 (Mar. 31, 1999), pp. 1-12, XP002487627.

Monika Maragkou and Nicolas Roy, "Daylight Analysis in the Design Process of Residential Buildings_The Daylight Sight", Feb. 14, 2017, VELUX Group (Year: 2017).

* cited by examiner

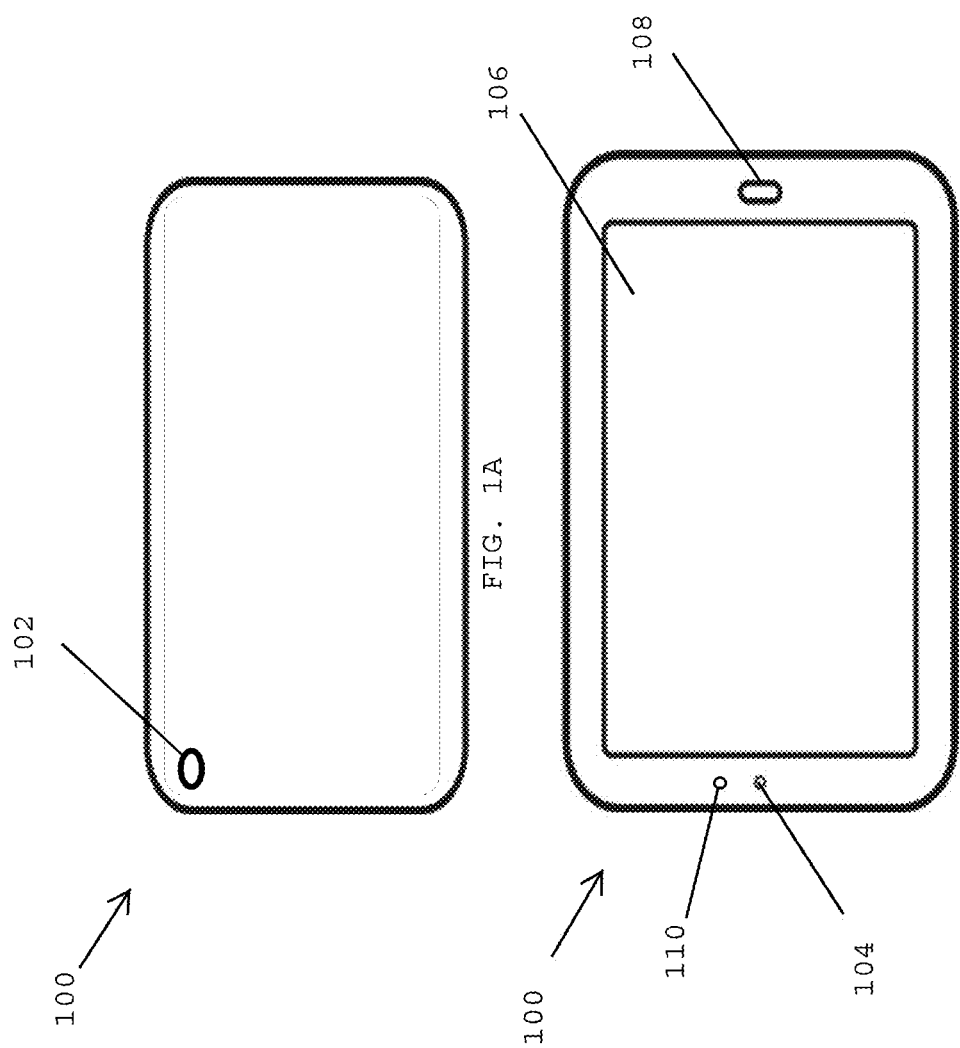

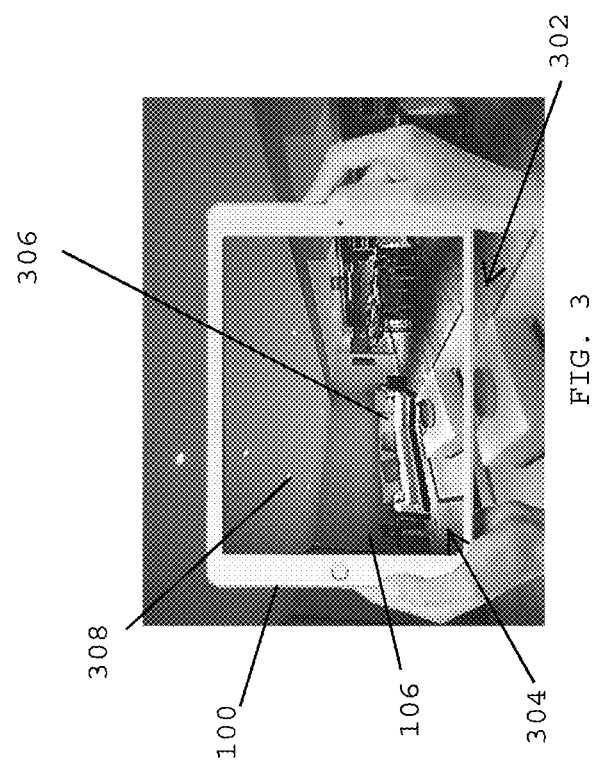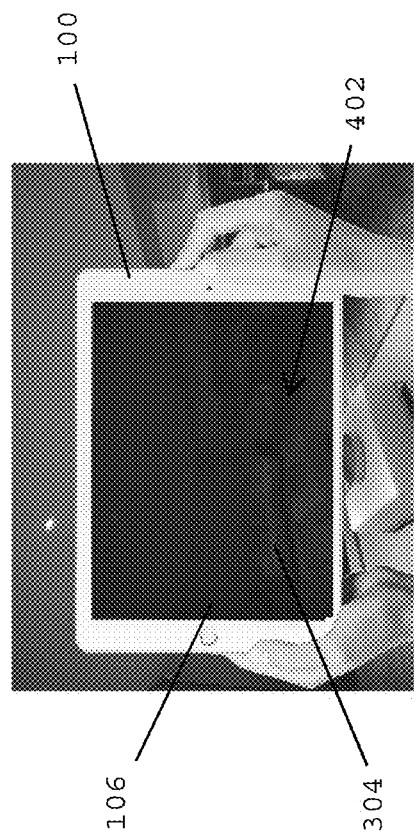

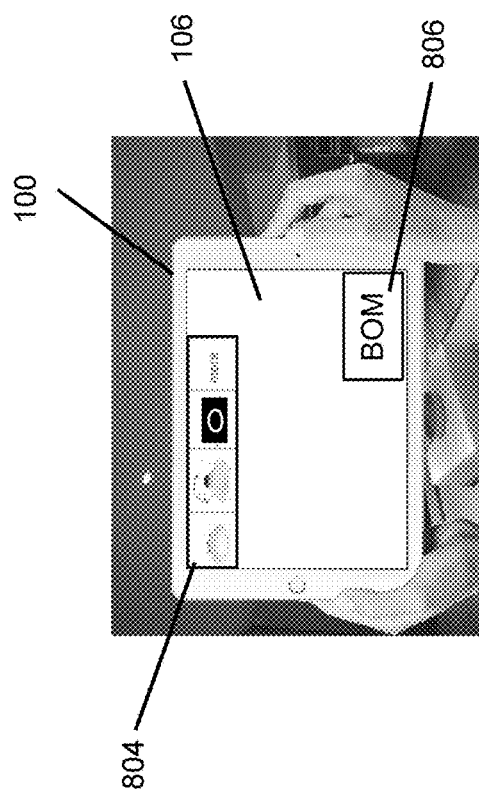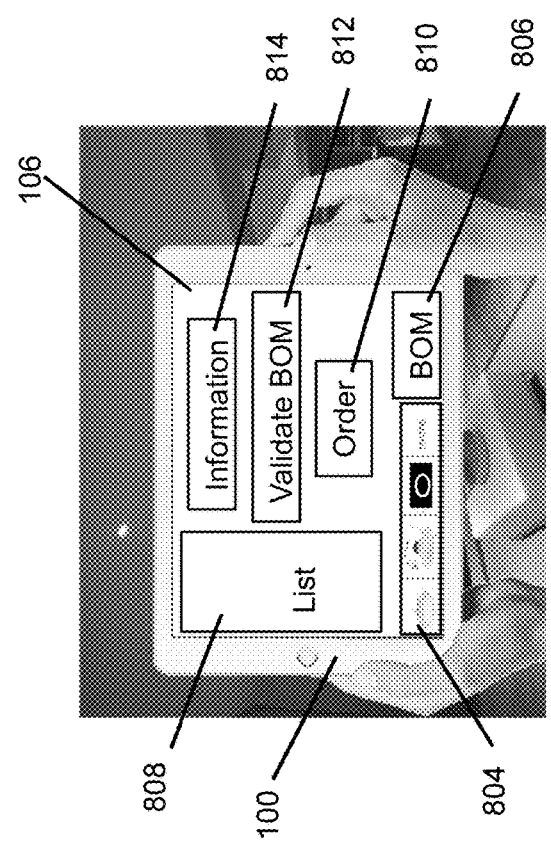

LIGHTING AND INTERNET OF THINGS DESIGN USING AUGMENTED REALITY

CROSS REFERENCE TO RELATED APPLICATIONS

The present application claims priority under 35 U.S.C. Section 119(e) to U.S. Provisional Patent Application No. 62/722,780, filed Aug. 24, 2018 and titled "Augmented Reality Based Light Intensity Display," and is a continuation-in-part of and claims priority to U.S. patent application Ser. No. 15/971,623, filed May 4, 2018 and titled "Lighting and Internet of Things Design Using Augmented Reality," which claims priority under 35 U.S.C. Section 119(e) to U.S. Provisional Patent Application No. 62/608,361, filed Dec. 20, 2017 and titled "Lighting and Internet of Things Design Using Augmented Reality". The entire contents of the preceding applications are incorporated herein by reference.

TECHNICAL FIELD

The present disclosure relates generally to lighting and controls solutions, and more particularly to lighting or internet of things (IoT) design using augmented reality.

BACKGROUND

A common lighting design method involves examining a target area with respect to floor plan, ceiling height, structures, etc. and estimating lighting for the target area using modeling tools. The modeling tools generally rely on 3-D models of the target area that are created based on the examination of the target area. The generation of the 3-D models of the target area and the modeling tools that use the 3-D models can be quite complex. The reliability of the estimated lighting of the target area is also heavily dependent on the accuracy of the 3-D models. Similar challenges also exist in IoT design. Thus, a solution that provides a user friendly and reliable means of lighting design is desirable. A similar solution can also be applied in IoT design.

SUMMARY

The present disclosure relates generally to lighting and controls solutions, and more particularly to lighting or IoT design using augmented reality. In an example embodiment, an augmented reality-based lighting design method includes displaying, by an augmented reality device, a real-time image of a target physical area on a display screen. The method further includes displaying, by the augmented reality device, a lighting fixture 3-D model on the display screen in response to a user input, wherein the lighting fixture 3-D model is overlaid on the real-time image of the target physical area. The method also includes determining, by the augmented reality device, illuminance values for locations in the target physical area, where the illuminance values indicate illuminance levels of a light to be provided by a lighting fixture represented by the lighting fixture 3-D model. The method further includes displaying, by the augmented reality device, the illuminance values on the display screen overlaid on the real-time image of the target physical area.

In another example embodiment, an augmented reality-based lighting design method includes displaying, by an augmented reality device, a real-time image of a target physical area on a display screen. The method further includes displaying, by the augmented reality device, a lighting fixture 3-D model on the display screen in response to a user input, where the lighting fixture 3-D model is overlaid on the real-time image of the target physical area. The method also includes displaying, by the augmented reality device, color coded illuminance information on the display screen overlaid on the real-time image of the target physical area, where different colors of the color coded illuminance information indicate different illuminance values that indicate illuminance levels of a light to be provided by a lighting fixture represented by the lighting fixture 3-D model.

In another example embodiment, an augmented reality-based lighting design method includes displaying, by an augmented reality device, a real-time image of a target physical area on a display screen. The method further includes displaying, by the augmented reality device, a lighting fixture 3-D model on the display screen in response to a user input, where the lighting fixture 3-D model is overlaid on the real-time image of the target physical area. The method also includes generating, by the augmented reality device, a lighting pattern based on illuminance values associated with locations in the target physical area, and displaying, by the augmented reality device, the lighting pattern on the display screen overlaid on the real-time image of the target physical area.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIGS. 1A and 1B illustrate an augmented reality device for lighting design and internet of things (IoT) design according to an example embodiment;

FIGS. 3-7A illustrate lighting design stages using the augmented reality device of FIGS. 1A-1D according to an example embodiment;

FIG. 8B illustrates a bill of material (BOM) generation interface displayed on the augmented reality device 100 of FIGS. 1A and 1B according to an example embodiment;

FIG. 8C illustrates a bill of material (BOM) displayed on the augmented reality device 100 of FIGS. 1A and 1B according to an example embodiment;

Figure 1C:
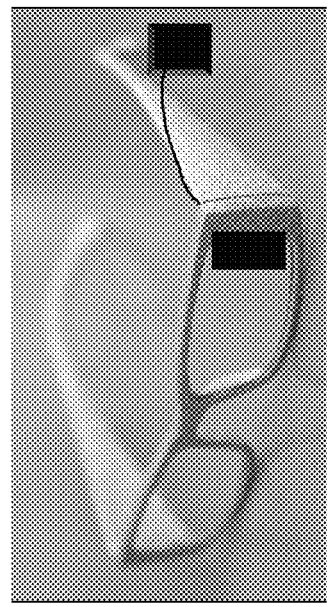
FIGS. 1C and 1D illustrate an augmented reality device for lighting design and IoT design according to another example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding but not necessarily identical elements.

DETAILED DESCRIPTION OF THE EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

In some example embodiments, an augmented reality (AR) platform may be used by a user, such as lighting designers, consumers, builders, installers, contractors, homeowners, tenants, landlords, building occupants, etc. to place virtual fixture models into a real environment to quickly gauge appearance as well as view, coordinate, or layout various fixtures lighting parameters such as fixture aesthetic or accessory options, color temperature, shape, distribution, brightness, light levels, light beam coverage of a space or field of view (e.g., for a camera that may be integrated into the fixture) or sensor range/direction for sensors (e.g., IR or other type of motion or environmental sensor) or accessory devices (speaker range/direction, microphone range/direction) accompanying or separate from a luminaire, etc.

An AR device may include a lighting design AR application and a database of lighting fixtures along with associated photometric files or parameter data files with alternative gradient of lighting information. The photometric files (e.g., IES files) contain necessary information to estimate one or more lighting patterns that are produced by lighting fixtures within a three dimensional space. The photometric files may also include color temperature, luminance intensity, and/or other information about the light emitted by a lighting fixture. The lighting design AR application enables a user to select and place one or more lighting fixtures in a real-time image of a physical/real space being displayed, for example, on a viewport of the AR device and allows visualization of how the selected lighting fixture(s) will behave and appear in the physical/real space. The AR application enables a rendered overlay of the lighting fixture and lighting patterns as well as other light characteristics (e.g., color temperature and luminosity) and accounts for reflected lighting patterns and shadows on surfaces of objects/structures in the physical/real space detected by the AR device image processing or other communication between the AR device and detected objects, which produces reasonably realistic results without requiring installation of actual lighting fixtures. For example, the AR device may implement a standalone artificial intelligence application or artificial intelligence code that is integrated with the AR application to detect and identify objects/structures in the physical/real space.

Similarly, an AR device may include a sensor (or accessory) design AR application and a database of sensors along with associated data files (range, viewing angle, resolution or similar operation information that may be visualized through the AR device). For example, the files may contain necessary information to estimate one or more view angles and a range that are associated with the sensor (e.g., motion, light, temperature, humidity, sound or other type of sensor) or accessory device (e.g., camera, microphone, speaker, emitter/detector, wireless device like Bluetooth or WiFi repeater, etc.) within a three dimensional space. The files may also include other information about the light emitted by the sensor or accessory. The AR application enables a user to select and place one or more sensors or accessories in a real-time image of a physical/real space being displayed, for example, on a viewport of the AR device and allows visualization of how the selected sensors or accessories will behave and appear in the physical/real space. The AR application enables a rendered overlay of the sensors or accessories and associated patterns or visuals as well as other characteristics. The AR device may account for reflected patterns or interference based on surfaces of objects/structures in the physical/real space detected by the AR device image processing or other communication between the AR device and detected objects, which produces reasonably realistic results without requiring installation of actual sensors or accessories.

FIGS. 1A and 1B illustrate an augmented reality device 100 for lighting design according to an example embodiment. In some example embodiments, FIG. 1A illustrates a back side of the augmented reality device 100, and FIG. 1B illustrates the front side of the augmented reality device 100. For example, the augmented reality device 100 may be a tablet, a smartphone, etc. Alternatively, the augmented reality device 100 may be a headset, glasses, goggles, or another type of device with an augmented reality capable display.

Referring to FIGS. 1A and 1B, in some example embodiments, the augmented reality (AR) device 100 may include a back-facing camera 102 on a back side of the augmented reality device 100. The AR device 100 may also include a viewport/display screen 106 on a front side of the augmented reality device 100. In some example embodiments, the AR device 100 may also include a front-facing camera 104, a user input area 108, an ambient light sensor 110, accelerometers, or other sensors useful in determining orientation or real-time feedback from the physical space the AR device 100 is located for use in interpreting and displaying the AR on the display 106 of the AR device 100.

In some example embodiments, the viewport 106 may be used to display images as seen by the cameras 102, 104 as well as to display objects (e.g., icons, text, etc.) stored, received, and/or generated by the AR device 100. The viewport 106 may also be used as a user input interface for the AR device 100. For example, the viewport 106 may be a touch sensitive display screen. The viewport 106 may contain a number of pixels in the vertical and horizontal directions (known as display resolution). For example, the viewport 106 may have a display resolution of 2048×1536. Each pixel may contain subpixels, where each subpixel typically represents red, green, and blue colors.

In some example embodiments, an image of a physical/real area in front of the AR device 100 may be displayed on the viewport 106 in real time as viewed by the camera 102. For example, the AR device 100 may include a lighting design AR application that activates the camera 102 such that a real-time image of the physical space viewed by the camera 102 is displayed on the viewport 106. Alternatively, the camera 102 may be enabled/activated to display a real-time image of the physical space before or after the lighting design AR application started. In some example embodiments, the real-time image displayed on the physical space may be displayed with a slight delay.

In some example embodiments, the AR device 100 may include an artificial intelligence application and/or component that can determine real light emitting surfaces and/or other surfaces or structures, such as windows, ceilings, walls, floors, mirrored or reflective surfaces, etc. in a physical space/area, and automatically suggest/provide recommended types of lighting fixtures along with additional information such as suggested location, orientation, and/or an appropriate number of lighting fixtures based on characteristics associated with the light fixtures (e.g., glare, intensity, available color temperatures or colors, available optics or accessories that change the beam angle or distribution produced by the light fixture, etc.). For example, the artificial intelligence software application and/or component may identify or suggest the right location for a certain fixture in the observed space, which results in requiring minimal input, interaction, and decision making by a user in achieving lighting design of a physical space/area. Similarly, a software application incorporating suggestions or that identifies suggested locations for devices such as sensors (motion, light, environmental conditions like heat, humidity, sound, etc.) or accessories (e.g., cameras, microphones, speakers, wireless communication, repeaters, etc.) could be used in embodiments aimed at sensors or accessories instead of or in addition to light fixtures.

Figure 1D:
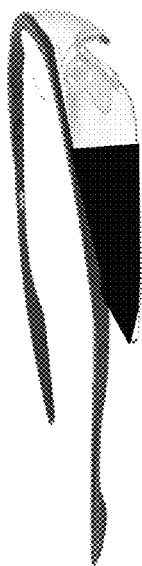

FIGS. 1C and 1D illustrate augmented reality devices 120, 130 for lighting design and IoT design according to another example embodiment. In some example embodiments, the AR device 120 may be used to perform the operations described above with respect to the AR device 100 in a similar manner. For example, the glass screens of the devices 120, 130 may be used as display screens similar to the viewport 106 of the AR device 100. In some example embodiments, another AR device may be used to perform the operations performed by the AR device 100 in a similar manner as described above with respect to FIGS. 1A and 1B. Although the descriptions below are presented generally with respect to the AR device 100 of FIGS. 1A and 1B, the description is equally applicable to the AR devices 120, 130 of FIGS. 1C and 1D.

Figure 2:
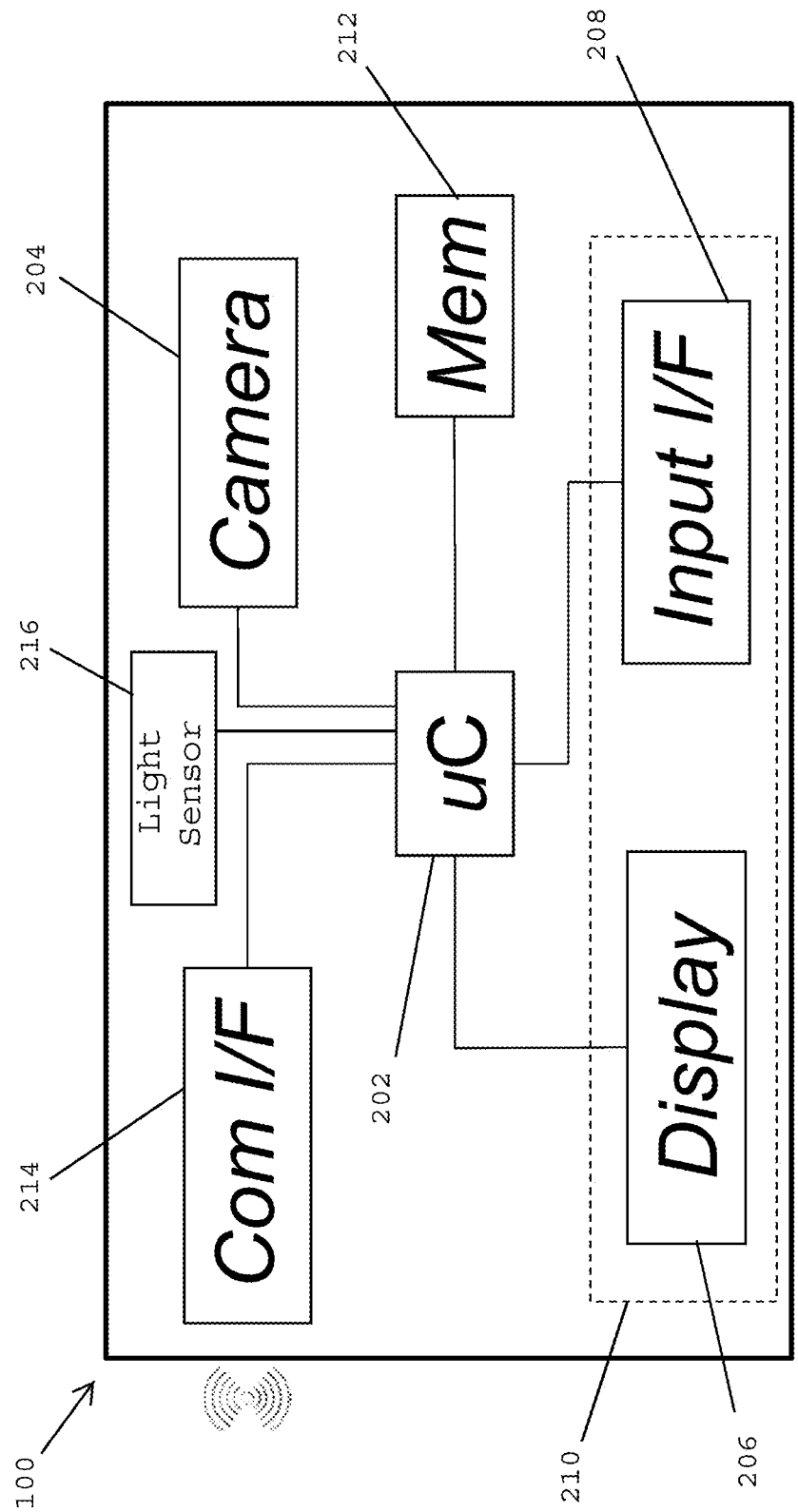
FIG. 2 illustrates a block diagram of the augmented reality devices of FIGS. 1A-1D according to an example embodiment.

FIG. 2 illustrates a block diagram of the augmented reality device 100 of FIGS. 1A and 1B according to an example embodiment. In some example embodiments, the block diagram of FIG. 2 may correspond to the augmented reality devices 120, 130 of FIGS. 1C and 1D. Referring to FIGS. 1A, 1B, and 2, in some example embodiments, the AR device 100 includes a controller 202, a camera component 204, a display component 206, an input interface 208, a memory device 212, and a communication interface 214. For example, the camera component 204 may correspond to or may be part of the cameras 102, 104. The display component 206 may correspond to or may be part of the viewport/display screen 106 and may include circuitry that enables or performs displaying of information (e.g., images, text, etc.) on the viewport 106. For example, the pixels of the viewport may be set/adjusted to display the image as viewed by the camera 102 or 104. The input interface 208 may correspond to the user input area 108 and/or the user input capability of viewport 106. For example, the display component 206 and the input interface 208 may make up or may be part of the viewport 106, where the viewport 106 is, for example, a touch-sensitive display screen. The communication interface 214 may be used for communication, wirelessly or via a wired connection, by the AR device 100.

The controller 202 may include one or more microprocessors and/or microcontrollers that can execute software code stored in the memory device 212. For example, the software code of the lighting design AR application and IoT design application may be stored in the memory device 212 or retrievable from a remote storage location (e.g., cloud service or remotely located server or database) via the communication interface 214 or other communication means. Other executable software codes used in the operation of the AR device 100 may also be stored in the memory device 212 or in another memory device of the AR device 100. For example, artificial intelligence lighting and/or other software may be stored in the memory device 212 as part of the AR application or along with the AR application and may be executed by the controller 202.

To illustrate, the controller 202 may execute the artificial intelligence application to determine real light emitting surfaces and/or structures (e.g., windows), reflective surfaces, etc. in a physical space/area, for example, based on the real-time image of the physical space/area as viewed by the camera 102 or 104 and/or based on lighting condition sensed by an ambient light sensor component 216 (corresponding to, connected to, or included in the ambient light sensor 110), and automatically suggest/provide recommended type(s) of lighting fixtures along with additional information such as suggested location, orientation, and/or an appropriate number of lighting fixtures. In general, the one or more microprocessors and/or microcontrollers of the controller 202 execute software code stored in the memory device 212 or in another device to implement the operations of the AR device 100 described herein. In some example embodiments, the memory device 212 may include a non-volatile memory device and volatile memory device.

In some example embodiments, data that is used or generated in the execution of the lighting design AR application, IoT design AR application, and other code may also be retrieved and/or stored in the memory device 212 or in another memory device of the AR device 100 or retrieved from a remote storage location (e.g., cloud service or remotely located server or database) via the communication interface 214 or other communication means. For example, 3-D models of lighting fixtures and photometric data files (e.g., IES files) associated with the lighting fixture models may be stored in the memory device 112, or retrieved from storage on a remote "cloud"-based service, and may be retrieved during execution of the lighting design AR application. 3-D models of other devices such as sensors, cameras, microphones, speakers emitter/detector, wireless devices such as Bluetooth or WiFi repeater, etc. and data associated with the devices may be stored in the memory device 112, or stored in and retrieved from storage on a remote "cloud"-based service, and may be retrieved during execution of IoT design AR application on the AR device 100.

The data stored and/or retrieved may include information such as range, viewing angle, resolution or similar operation information that may be visualized through the AR device). For example, the data may contain necessary information to estimate one or more view angles and range that is produced by sensor (e.g., motion, light, temperature, humidity, sound or other type of sensor) or an accessory device, such as camera, microphone, speaker, emitter/detector, wireless device like Bluetooth or WiFi repeater, etc. within a three dimensional space. The files may also include other information about the light emitted by the sensor or the accessory device.

In some example embodiments, the lighting design AR application stored in the memory device 112 may incorporate or interface with an augmented reality application/software, such as ARKit, ARCore, HoloLens, etc., that may also be stored in the memory device 112 or called upon from or provided via a remote storage location (e.g., cloud service or remotely located server or database) via the communication interface 214 or other communication means.

The controller 202 may communicate with the different components of the AR device 100, such as the camera component 204, etc., and may execute relevant code, for example, to display a real-time image as viewed by the camera 102 and/or 104 as well as other image objects on the viewport 106.

Although the block diagram of FIG. 2 is described above with respect to the AR device 100, the block diagram and the above description are equally applicable to the AR devices 120, 130 of FIGS. 1C and 1D.

FIGS. 3-7A illustrate lighting design stages using the augmented reality devices of FIGS. 1A-1B according to an example embodiment. Although the descriptions below are presented generally with respect to the AR device 100 of FIGS. 1A and 1B, the description is equally applicable to the AR devices 120, 130 of FIGS. 1C and 1D. In some example embodiments, FIG. 3 illustrates a real-time image 304 of a target area 302 displayed on the AR device 100 incorporating the lighting design AR application. To illustrate, after the lighting design AR application is started, for example, by selecting a lighting design AR application icon displayed on the viewport 106, a real-time image 304 of the target area 302 may be displayed on the viewport 106. The real-time image 304 displayed on the viewport 106 may be an image of the target area 302 as viewed by the back-facing camera 102. For example, a sofa 306 and a lighting fixture 308 that are real objects in the target area 302 are shown in the real-time image 304. The back-facing camera 102 may be enabled/activated to view (not necessarily record) the target area 302 in response to the activation of the lighting design AR application or may be enabled/activated separately.

In some example embodiments, the AR device 100 may be used to assess the target area 302 to identify objects, structures, surfaces, etc. in the target area 302. For example, the AR device 100 may include and use one or more accelerometers to determine the orientation of the AR device 100 relative to the target area 302, and thus determine orientation of objects, structures, surfaces, etc. in the target area 302 based on the real-time image 304 of the target area 302 as captured by the camera 304. The AR device 100 may identify objects, structures, surfaces, etc. by executing artificial intelligence and image processing code and based on lighting condition of the target area sensed by the ambient light sensor 110. For example, the AR device 100 may identify light reflective (e.g., mirror), transmissive (e.g., windows), ceilings, walls, floor, furniture, etc. based on the real-time image 304 of the target area 302, the lighting conditions of the target area 302, the orientation of the AR device 100, etc. The AR device 100 may use information from the assessment of the target area 302, for example, to generate display models representing the lighting pattern(s) resulting from selected lighting fixture models as described below.

In some example embodiments, FIG. 4 illustrates a modified image 402 of the target area 302 displayed on the viewport 106 of the AR device 100. For example, a user may provide an input to the AR device 100 (e.g., via the input area 108 or via the viewport 106) to apply a darkening filter to the pixels of the viewport 106 such that the modified image 402 is a result of the real-time image 304 and the darkening of the viewport 106. As can be seen in FIG. 4, the real-time image 304 of the target area 302 may still be visible to the user after the darkening filter is applied. To illustrate, the darkening of the viewport 106 may provide a reference lighting level to allow subsequent adjustments of lighting pattern and other characteristics to be more easily discernable.

During the application of the darkening filter to the viewport 106, the pixels of the viewport 106 are transformed based on the pixel data from the camera 102 (i.e., the real-time image viewed by the camera 102) and the light level detected by the ambient light sensor 110. In some example embodiments, to darken the pixels of the viewport 106, the lighting design AR application may include code corresponding to the equation shown below that is executed by the AR device 100 with respect to the individual pixels of the viewport 106:

$$\text{PixNew}(R,G,B) = \text{PixOld}(R,G,B) * \text{DarkFilter}(R,G,B),$$

Where:
PixNew(R,G,B) is the pixel resulting from the filtering;
PixOld(R,G,B) is the pixel representing the real-time image as viewed by the camera 102; and
DarkFilter=f(Ambient Light Sensor)→Z % (e.g., Z=0.1), where Ambient Light Sensor range is 0 to 255.

By considering the ambient light level, the viewport 106 may be darkened to a level that allows the real-time image 304 of the target area 302 to be viewed by user. After the viewport is darkened, the lighting design AR application may display a message to the user indicating the option of displaying or adding lighting fixtures to the modified image 402.

Figure 5:
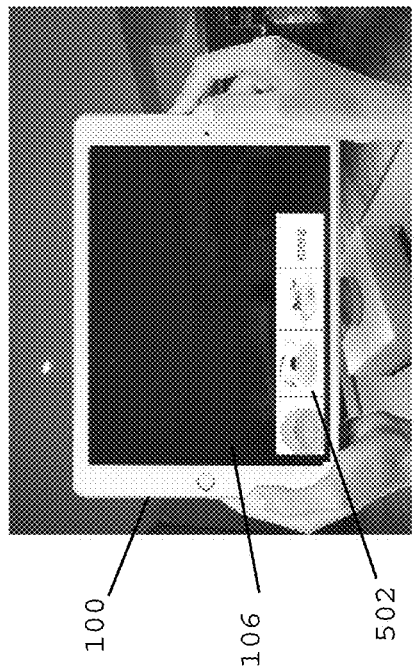

In some example embodiments, FIG. 5 illustrates the modified image 402 displayed on the viewport 106 of the AR device 100 along with lighting fixture 3-D models menu 502 for selection of one or more lighting fixture 3-D models by a user. As described above, each light fixture 3-D model may be stored in a database and may be associated with a photometric file (e.g., IES file) that includes information indicating lighting pattern, color temperature, luminance intensity, etc. In some example embodiments, the lighting fixture 3-D models selectable through the menu 502 may include different models of the same type of lighting fixture and/or different types of lighting fixtures, where the different models are associated with respective photometric files representing different lighting patterns, color temperatures, luminance intensity, etc.

In general, the light fixture 3-D models selectable through the menu 502 may be provided to the user for selection in one of several other means such as by displaying the models at other locations on the viewport 106, separately on a different display page, as drop-down menu items, etc. Alternatively, the light fixture 3-D models can be selected prior to bringing up the viewport 106 to display the selected light fixture 3-D models in the viewed space.

Figure 6:
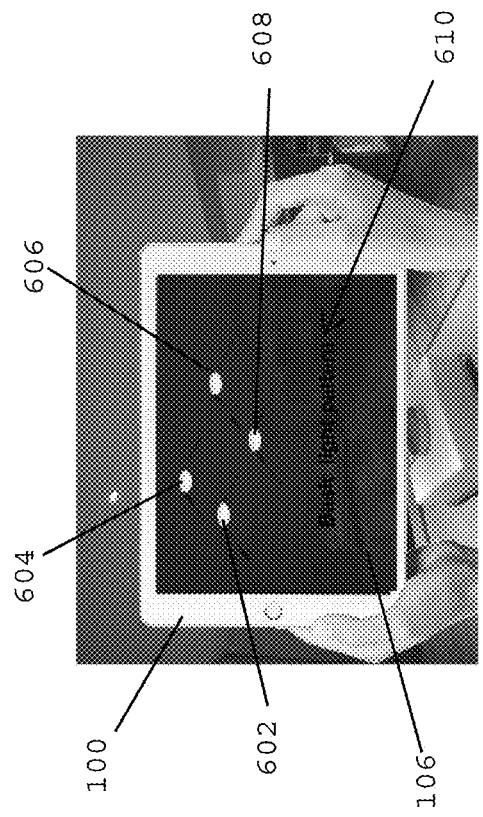

In accordance with some example embodiments, FIG. 6 illustrates four lighting fixture 3-D models 602-608 displayed on the viewport 106 along with the image 402 shown in FIGS. 4 and 5. To illustrate, a user may select four lighting fixture 3-D models from the lighting fixture models menu 502 provided to the user as shown in FIG. 5. A user may select the lighting fixture 3-D model 602 from the lighting fixture models menu 502 shown in FIG. 5 and place the model 602 at a desired location on the modified image 402. For example, a user may use a finger, stylus, or a mouse to select and place the model 602 at a desired location. The user may select and place the other 3-D lighting fixture 3-D models 604-608 at desired locations on the modified image 402 in a similar manner as the model 602, resulting in the image 610 displayed in the viewport 106 shown in FIG. 6. A user may remove one or more of the models 602-608 from the viewport 106, for example, by dragging the particular one more models of the viewport 602 or by other means as may be contemplated by those of ordinary skill in the art with the benefit of this disclosure.

In some example embodiments, when a user places the lighting fixture 3-D models 604-608 at the locations on the modified image 402, the lighting fixture 3-D models 602-608 are associated with physical locations in the target area 302 such that the lighting pattern resulting from the selected lighting fixture models 602-608 is shown relative to the physical locations in the target area 302. For example, the AR device 100 may use display coordinates of the viewport 106 to keep track of the physical locations of the target area corresponding to the locations on the modified image 402. The AR device 100 may track one or more of tilt angle, orientation, direction, location, distance, etc. of the AR device 100 to keep the viewport 106 associated with physical locations of the target area 302.

Figure 7A:
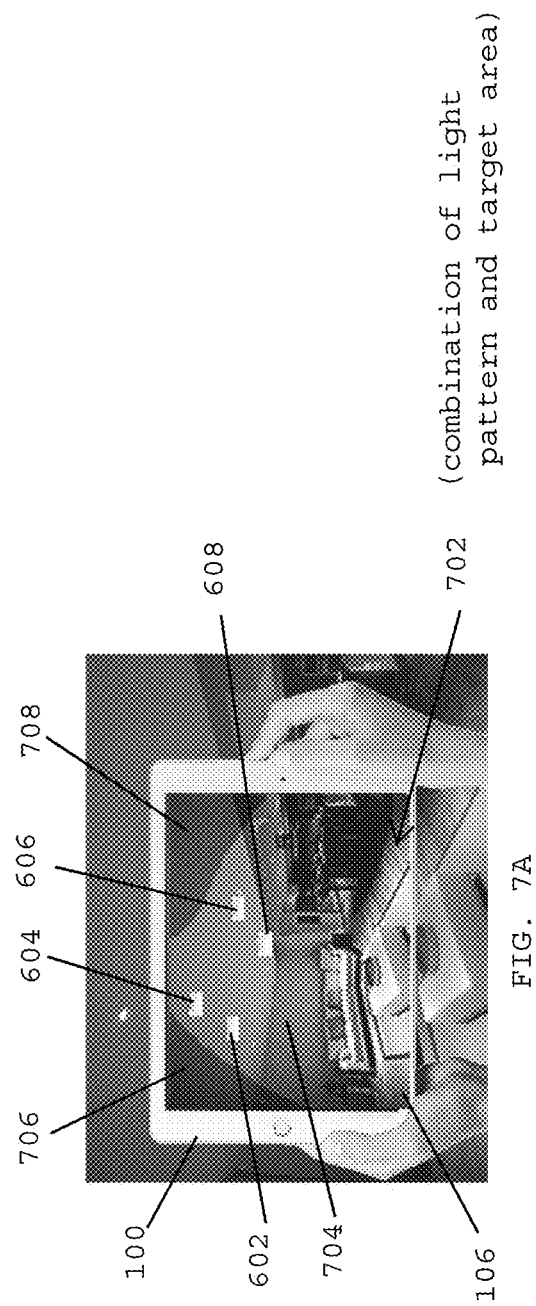

In some example embodiments, FIG. 7A illustrates an image 702 of the target area 302 overlaid with a lighting pattern resulting from the selected lighting fixture 3-D models 602-608 and associated photometric files. The AR device 100 executes the lighting design AR application to process the photometric data of each selected 3-D model 602-608 and generate the lighting pattern and the 3-D models 602-608 overlaid on the real-time image 304 of the target area 302. In some alternative embodiments, another device, such as a local or remote (e.g., cloud) server, may execute some of the functions of the lighting design AR application such as the processing of the photometric data, and provide the resulting information to the AR device 100.

In some example embodiments, the lighting design AR application selectively removes/changes the darkening filter applied to the pixels, as necessary, based on the photometric profile (e.g., IES) of the selected lighting fixture 3-D models 602-608. To illustrate, the pixels of the viewport 106 may be selectively brightened based on the photometric data corresponding to the selected lighting fixture 3-D models 602-608. For example, pixels of the viewport 106 that are in the lighting distribution area of the selected lighting fixture 3-D models 602-608 may be brightened in contrast to the modified image 402 shown in FIG. 4.

In some example embodiments, the lighting pattern as determined by the AR device 100 may include an area 704 that is well lit as compared to areas 706 and 708 that may be dimly lit. For example, the areas 706, 708 may be lit primarily as a result of reflected light from the lights produced by the selected lighting fixture 3-D models 602-608. To illustrate, the lighting design AR application may process the photometric data of the selected 3-D model 602-608 to determine areas that may be lit directly and/or as a result of reflected light. The lighting design AR application may process the photometric data of the selected 3-D model 602-608 to determine the appearance of shadows on detected or determined surfaces/objects in the real-time image 304 of the target area 302, resulting in realistic lighting patterns. For example, the AR device 100 may execute an artificial intelligence application to determine objects and structures in the target area, for example, based on the real-time image of the target area as viewed by the camera of the AR device 100. For example, the AR device 100 may identify reflective surfaces, walls, furniture, etc. and account for reflections, shadows, etc. in removing/changing the darkening filter applied to the pixels of the viewport 106. In some example embodiments, the AR device 100 also accounts for the lighting conditions in the target area, for example, based on lighting conditions sensed by the ambient light sensor 110. For example, the AR device 100 may use the lighting condition in the target area to set/adjust parameters used in removing/changing the darkening filter applied to the pixels of the viewport 106.

In some example embodiments, the AR device 100 may use the photometric data associated with each selected lighting fixture 3-D model 602-608 to generate a lighting display model of the lighting pattern that is overlaid on the real-time image of the target area, resulting in the image 702 shown in FIG. 7A. The display model of the lighting pattern (including luminance levels, color temperature, etc.) may be a polygon or another type of image. In some alternative embodiments, the AR device 100 may send information indicating the selected lighting fixture 3-D models 602-608 to another processing device, such as a local or cloud server, and the other processing device may generate a display model (e.g., a polygon or another image) based on the photometric data associated with the respective lighting fixture 3-D models 602-608. The AR device 100 may receive or retrieve the generated display model from the other processing device for display on the viewport 106, where the display model is overlaid on the real-time image of the target area 302.

In some example embodiments, the display model may be a polygon, such as a 2-dimensional (2D) polygon, a 3-dimensional (3-D) polygon, a combination of 2D and/or 3-D polygons, etc., or one or more other types of images such as graphical images, etc. To illustrate, the image displayed in FIG. 7A may be a result of the AR device 100 overlaying a lighting display model over the image 610 shown in FIG. 6, which effectively removes/changes the darkening filter shown in FIG. 5. For example, the AR device 100 may generate or retrieve a polygon that has display parameters corresponding to the lighting pattern represented by the photometric data files associated with the multiple selected lighting fixture 3-D models 602-608. Information such as color temperature, luminance levels, etc. contained in the photometric data files may be represented by the display parameters of the polygon, and the pixels of the viewport 106 may be changed/set based on these parameters. Different points or parts of the generated polygon may be associated with different luminance levels, color temperature values, etc. contained in the photometric data files. The AR device 100 may display the real-time image of the target area overlaid with the polygon by adjusting/setting the pixels of the viewport 106. For example, the display of the generated polygon on the viewport 106 may remove/change the darkening filter applied at the design stage shown in FIG. 5, resulting in the image shown in FIG. 7A.

In some example embodiments, the AR device 100 may generate or retrieve a display model, such as a polygon (e.g., a 2D polygon, a 3-D polygon, a combination of 2D and/or 3-D polygons, graphical images, etc.) or another type of image(s), for each one of the selected lighting fixture 3-D model 602-608 and combine the multiple display models to generate a display model representing the combined lighting pattern. For example, the AR device 100 may combine polygons that have parameters corresponding to the photometric data of each selected lighting fixture 3-D model 602-608 to generate a combined polygon that has display parameters that account for the display parameters of the individual polygons. The AR device 100 may retrieve the individual polygons or other types of display models from a local storage or a remote source such as a cloud server.

In some example embodiments, the AR device 100 may account for lighting conditions in the target area in generating the display model representing the lighting pattern resulting from the selected lighting fixture 3-D model 602-608. For example, the AR device 100 may use the lighting condition sensed by the ambient light sensor 110 as well as the photometric data of each selected lighting fixture 3-D model 602-608 to generate the display parameters of a polygon that is displayed on the viewport 106 overlaid on the real-time image of the target area 302. The AR device 100 may identify reflective surfaces, walls, furniture, etc. as described above and account for reflections, shadows, etc. in generating the polygon that is overlaid on the real-time image.

As illustrated in FIG. 7A, the selected lighting fixture 3-D models 602-608 are displayed in the real-time image of the target area 302, enabling the user to assess how the corresponding lighting fixtures or lighting effect will look when installed in the target area 302. Using the AR device 100, a user (e.g., a lighting designer, owner, etc.) may more effectively perform lighting design of a particular area (e.g., a living room, a bedroom, a hallway, office, warehouse, an outdoor landscape, a parking lot, etc.) without having to install actual lighting fixtures and at the same time minimizing design errors. Because the selected lighting fixture models 602-608 are associated with the physical locations of the target area 302 as described above and because the lighting display models (e.g., the polygon(s)) are associated with the selected lighting fixture models 602-608, a user may move in the target area 302 holding the AR device 100 and assess the placements of the lighting fixtures and the resulting lighting effect at different locations in the target area 302. As the user moves through and near the target area 302, the shape of the lighting pattern displayed on the viewport 106 may change depending on the part of the target area viewable by the camera 102 of the AR device 100 and the corresponding real-time image displayed on the viewport 106.

As described above, a display model that represents the photometric data associated with one or more lighting fixtures may be a 2D polygon, a 3-D polygon, and a combination of 2D and/or 3-D polygons, graphical image(s), another type of image(s), etc. In general, a polygon that is used as a display model may be a 2D polygon, a 3-D polygon, a combination of 2D and/or 3-D polygons, graphical image(s), another type of image(s), etc.

In some example embodiments, a user may change the outward appearances (e.g., color) of the lighting fixture 3-D models 602-608 without changing lighting characteristics (e.g., luminance level, color temperature, etc.) associated with the lighting fixture 3-D models 602-608. For example, in response to a user input (e.g., clicking or tapping on a displayed lighting fixture 3-D model), the AR device 100 may change the color of the trim ring and/or the color of the housing of the displayed lighting fixture 3-D model without changing the lighting pattern displayed on the viewport 106. For example, clicking or tapping on a displayed lighting fixture 3-D model by a user may result in the AR device 100 executing software code to change the color of the housing in a predefined order (e.g., white, blue, red, white, . . . ).

In some example embodiments, a user may use the AR device 100 to assess the appearance of the corresponding lighting fixtures in the target area 302. For example, the AR device 100 may overlay the lighting fixture 3-D models 602-608 in the real-time image 304 of the target area 302 to assess the appearance of the corresponding lighting fixtures in the target area 302 without installing the lighting fixtures. To illustrate, after the real-time image 304 is displayed on the viewport 106 as shown in FIG. 3, the AR device 100 may overlay the lighting fixture 3-D models 602-608 on the real-time image 304 in response to a user input. For example, the lighting fixture 3-D models menu 502 may be displayed on the viewport 106 along with the image 304. A user may select and place the lighting fixture 3-D models 602-608 and/or other 3-D models on the real-time image 304. In some example embodiments, the lighting patterns associated with the lighting fixture 3-D models 602-608 and other 3-D models may or may not be displayed on the viewport 106 when the AR device 100 is used to assess the physical appearance of lighting fixtures. For example, the design stages associated with FIG. 4 and subsequent generation and/or display of a lighting pattern may be omitted.

As described above, the color of a trim ring, size of the trim ring, type of trim ring or alternative optical attachment, lens type, the color of a lighting fixture housing, alternative subcomponent(s) of the light fixture, and/or other aesthetic aspects of a displayed lighting fixture 3-D model may be changed, for example, by tapping or clicking on the displayed lighting fixture 3-D model. In some alternative embodiments, aesthetic features of displayed lighting fixture 3-D models, such as the 3-D models 602-608, may be changed after the lighting patterns associated with the lighting fixture 3-D models are displayed, for example, as shown in FIG. 7A.

In general, the lighting design AR application executed by the AR device 100 may include or rely on operations performed by AR applications, such as ARKit, ARCore, etc. In some alternative embodiments, a still image (a captured picture) of the target area 302 may be used instead of a real-time image. For example, a photograph that contains adequate information, such as tilt angle of the AR device 100, GPS location, etc. may allow the AR device 100 executing the lighting design AR application and/or an artificial intelligence application to determine 3-D information from the photograph and enable lighting design based on the information.

In some alternative embodiments, another device may perform some of the operations described herein with respect to the AR device 100. To illustrate, another device, such as a local or remote server, may generate one or more display models based on information provided by the AR device 100. For example, the AR device 100 may provide information such as the selected lighting fixture 3-D model 602-608 and/or relevant photometric data to another processing device that generates the display model(s), and the AR device 100 may receive/retrieve the generated display model(s) from the other processing device.

Figure 7B:
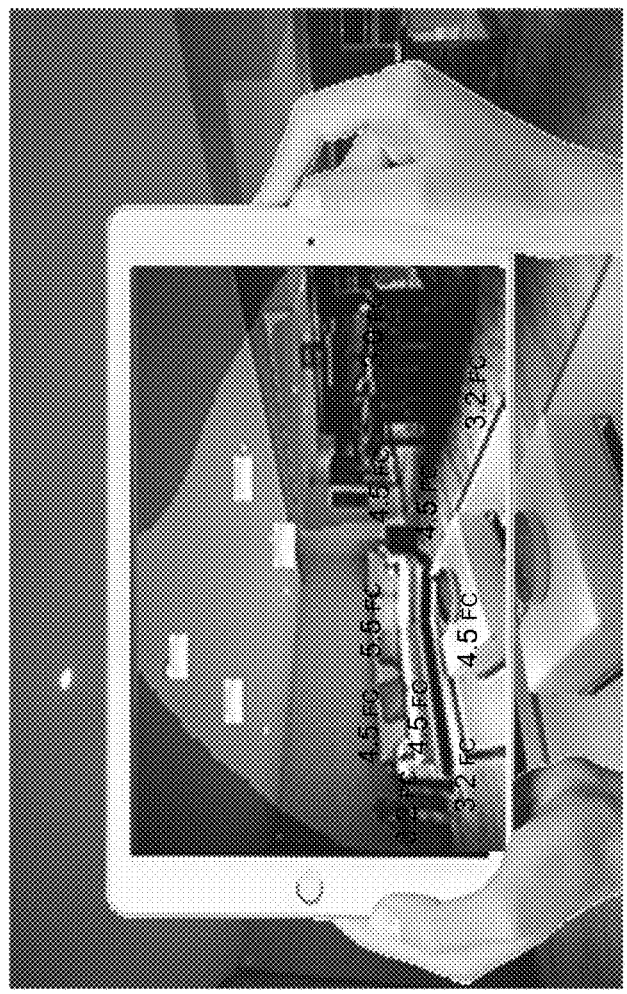
FIG. 7B illustrates illuminance levels indicated on the viewport of the AR device of FIGS. 1A and 1B according to an example embodiment.

FIG. 7B illustrates illuminance levels indicated on the viewport 106 of the AR device 100 of FIGS. 1A and 1B according to an example embodiment. In some example embodiments, luminance level values (interchangeably, luminance values) may be displayed on the viewport 106, for example, to provide a numeric representation of brightness levels at different locations of the target area based on the selected lighting fixture 3-D model 602-608. For example, different points or areas of a display model (e.g., different points or areas of a polygon) generated as described above may be associated or otherwise tagged with the luminance level values. To illustrate, some areas may be associated with higher brightness level (e.g., 5.5 foot-candle (FC)) while other areas may be associated with a relatively darker level (e.g., 3.2 FC). As a user moves in the target area holding the AR device 100, the luminance level values that are displayed may change depending on the part of the target area that is viewed by the camera 102 of the AR device 100 and displayed on the viewport 106 based on the location of the user relative to the selected lighting fixture 3-D model 602-608.

Figure 7C:
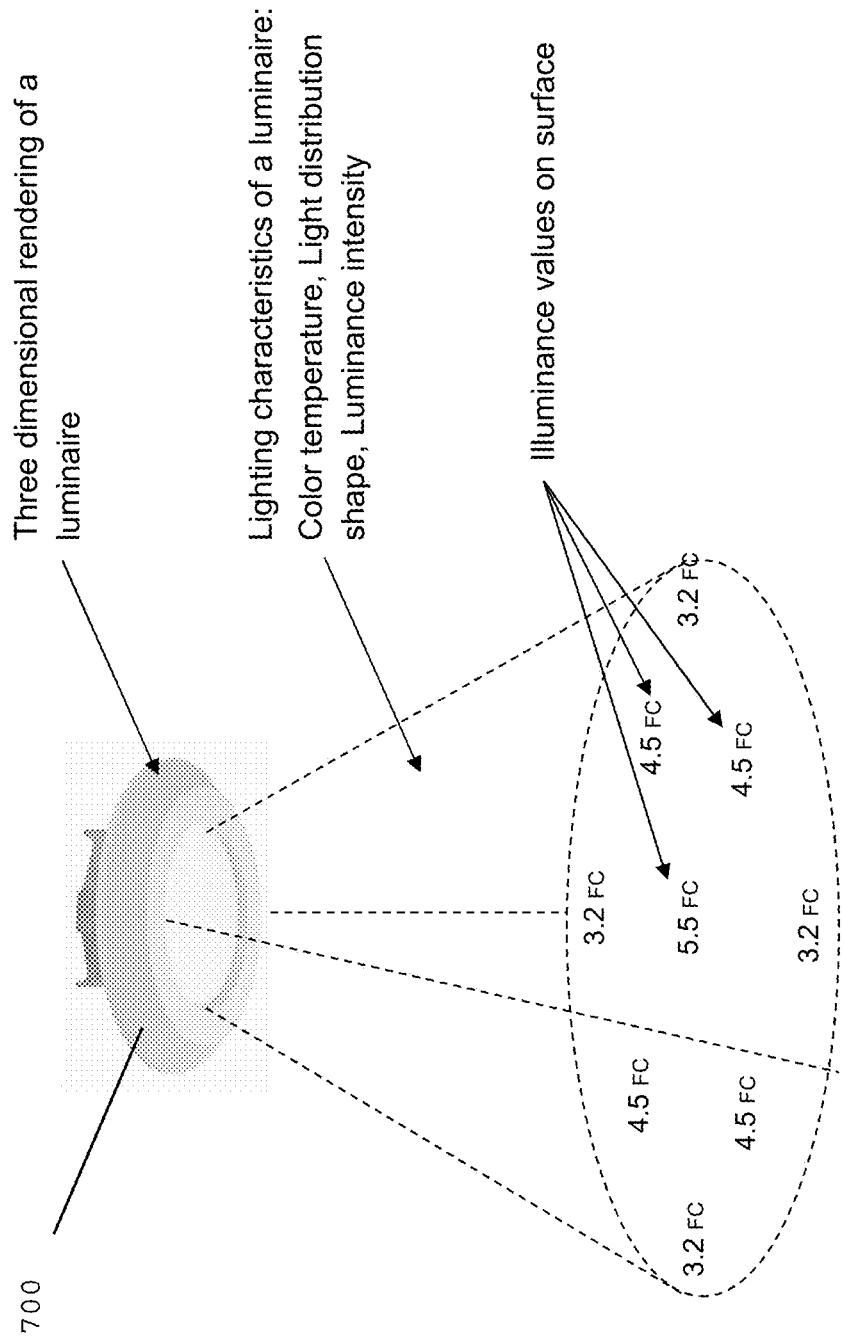
FIG. 7C illustrates a 3-D model of a lighting fixture and lighting pattern including illuminance levels based on photometric data or another gradient of lighting data associated with the lighting fixture according to an example embodiment.

FIG. 7C illustrates a 3-D model of a lighting fixture 700 and lighting pattern including illuminance levels that are based on photometric data or another gradient of lighting data associated with the lighting fixture according to an example embodiment. For example, the lighting fixture 700 may correspond to the lighting fixtures 602-608 shown in FIG. 7A. The photometric data associated with the lighting fixture 700 may be illustrated to convey lighting distribution shape, color temperature as well as the luminance levels indicated by the luminance level values, for example, at a surface that is a particular distance from the lighting fixture 700. Although the luminance level values are shown for a particular surface, the photometric data may include luminance level values at different distances. The AR device 100 may use the photometric data including lighting distribution shape, color temperature, the luminance levels, etc. to generate a display model that is overlaid on the real-time image of the target area displayed on the viewport 106. Although a polygon is described herein as an example of a display model, other types of display models such as other types of images may equally be used.

Figure 8A:
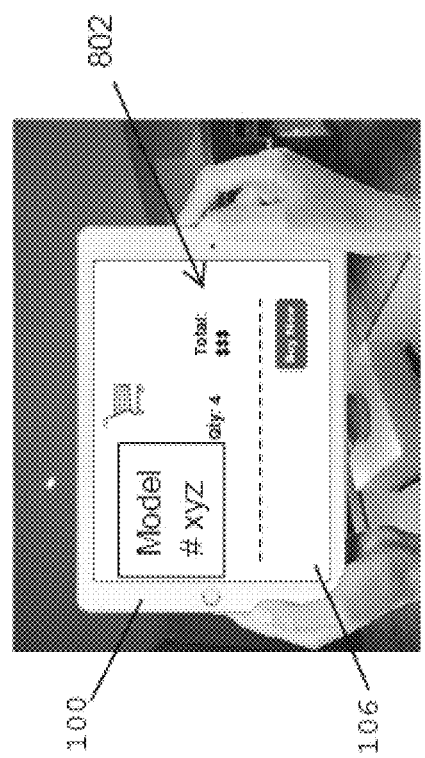
FIG. 8A illustrates an e-commerce interface displayed on the augmented reality device of FIGS. 1A and 1B according to an example embodiment.

FIG. 8A illustrates an e-commerce interface 802 displayed on the augmented reality device 100 of FIGS. 1A and 1B according to an example embodiment. Referring to FIGS. 1A-8A, the information included in the e-commerce interface 802 may be generated based on the lighting design stages described above. To illustrate, in some example embodiments, the user may be given an option to purchase the lighting fixtures corresponding to the selected lighting fixture 3-D models 602-608. For example, the AR device 100 may execute the AR application to display a weblink on the viewport 106 for a user to click or tap to purchase the lighting fixtures corresponding to the selected lighting fixture 3-D models 602-608. Alternatively, the weblink may be provided to the user on a separate web browser page or in a separate e-commerce application screen when the design stages are completed and/or the display of AR related information is terminated by the user. Other purchasing options including the option to make the purchase via voice command, etc. may also be provided to the user. For example, the lighting design AR application may incorporate or interface with another application to provide the purchasing option as well as to execute the purchase of the lighting fixtures based on the user's input.

In some alternative embodiments, the e-commerce interface 802 may be displayed in a different format than shown in FIG. 8A without departing from the scope of this disclosure. In some alternative embodiments, other user input icons and information may be displayed on the viewport without departing from the scope of this disclosure. Although the e-commerce interface 802 is described above with respect to the AR device 100 of FIGS. 1A and 1B, the description is equally applicable to the AR devices 120, 130 of FIGS. 1C and 1D.

FIG. 8B illustrates a bill of material (BOM) generation input interface 806 displayed on the augmented reality device 100 of FIGS. 1A and 1B according to an example embodiment. In some example embodiments, a user may use the BOM generation input interface 806 to generate a BOM (or purchase order for the BOM) or, more generally, a list of products available for purchase (including, in some embodiments, any accessories or additional items required for installation or operation) resulting from the AR-based design described above. For example, following the display of the image 702 shown in FIG. 7A, the BOM generation page may be displayed in the viewport 106 as shown in FIG. 8B. A user may tap or click on the BOM generation input interface 806, and, in response, the AR device 100 may execute the AR application or another application to generate a BOM that includes, for example, identification information (e.g., model number, product number, etc.) that corresponds to the lighting fixture 3-D models 602-608 shown in FIG. 7A and/or other lighting fixtures and devices added by the user (including, in some embodiments, any accessories or additional items required for installation or operation). The BOM generation page shown in FIG. 8B may be presented on the viewport 106 prior to the display of the e-commerce interface 802 shown in FIG. 8A. For example, the e-commerce interface 802 shown in FIG. 8A may be displayed on the viewport 106 following the generation of a BOM.

In some example embodiments, a product menu 804 may also be displayed on the viewport 106. For example, the product menu 804 may allow a user to add additional products to a BOM. The product menu 804 may allow a user to add lighting fixtures with or without integrated IoT devices (e.g., sensors, camera, speakers, microphones, etc.), load control devices (e.g., relays, switches, dimmers, etc.), IoT devices (e.g., standalone connected sensors, microphones, a speaker, etc.), trims, junction boxes, wall-stations, and other types of products and any accessories or additional items required for installation or operation (e.g., wire harness, connectors, cables, remote power supplies, etc.) to the generated BOM. As used herein IoT device refers to any sensor and/or communication device that may be integrated into a light fixture or may be a standalone device that is capable of controlling or otherwise communicating with or to a light fixture or other device located in the vicinity of the IoT device or providing communications for a light fixture or other device in the vicinity of the IoT device to a network. Alternatively or in addition, the product menu 804 may allow a user to add additional products prior to the generation of a BOM. To illustrate, following the design stages corresponding to FIG. 7A or FIG. 7B, a user may add other products (e.g., a load control device, etc.) using the product menu 804 prior to the generation of a BOM.

In some example embodiments, the product menu 804 may be a drop down menu, another type of user interface (e.g., a list), a link to another page, etc. In some example embodiments, a product search interface may also be presented instead of or in addition to the product menu 804. In some alternative embodiments, the BOM generation input interface 806 may be displayed on the viewport 106 at different design stages such as at the design stages corresponding to FIGS. 6-7C. In some alternative embodiments, the BOM generation input interface 806 may be displayed at a different location of the viewport 106 and/or or may be displayed or provided to the user in a different format such as a selection from a drop-down menu, etc.

FIG. 8C illustrates a bill of material (BOM) 808 displayed on the augmented reality device 100 of FIGS. 1A and 1B according to an example embodiment. Referring to FIGS. 1-8B, in some example embodiments, the BOM 808 may be generated by the AR device 100 in response to the user input provided via the BOM generation input interface 806. For example, a user may use the BOM generation input interface 806 displayed on the viewport 106 as shown in FIGS. 8B, 8C, or as can be displayed at other design stages such as the design stages corresponding to FIGS. 7A and 7B.

In some example embodiments, after the BOM 808 is generated and displayed, a user may add additional products such as lighting fixtures with or without integrated IoT devices, load control devices, IoT devices, trims, junction boxes, wall-stations, and other types of products to the generated BOM 808. For example, a user may use the product menu 804 to add additional products to the generated BOM 808 as described above with respect to FIG. 8B.

In some example embodiments, a user may request validation of the BOM 808 by providing an input using the BOM validation input interface 812. For example, clicking or tapping the BOM validation input interface 812 may result in the BOM 808 being sent to a technical support person, a contractor, a sales representative, or automated validation system in communication with the AR device that can confirm the accuracy, completeness, or availability of the items listed on the BOM. The transmission of the BOM 808 by the AR device 100 may be performed by executing the AR application and/or another software code or application as can be readily understood by those of ordinary skill in the art with the benefit of this disclosure. Alternatively or in addition to sending the BOM 808, clicking or tapping the BOM validation input interface 812 may initiate a chat session with a technical support person, a contractor, a sales representative, etc.

In some example embodiments, clicking or tapping the BOM validation input interface 812 may initiate operations by the AR device 100 to verify design information 814, which may include whether the products included in the BOM 808 are compliant with one or more lighting or electrical codes and/or guidelines. For example, the lighting or electrical codes and/or guidelines may be international, national, and/or local codes and guidelines. To illustrate, the lighting or electrical codes and/or guidelines may address light levels relevant to particular spaces (e.g., OSHA guidelines, etc.), lighting fixture standby power and startup time (e.g., Title 24 of the California Code of Regulations, etc.), plenum rating (e.g., City of Chicago Electrical Code, etc.), and other electrical and lighting requirements and guidelines such as those included in European Union standards.

In some example embodiments, one or more lighting and/or electrical codes and/or guidelines may be stored in the memory device 212 or another memory device. Alternatively or in addition, one or more lighting and/or electrical codes and/or guidelines may be retrieved or compared for compliance by the AR device 100 from a remote source in response to a user input provided to the AR device 100 via the BOM validation input interface 812 or another user interface. For example, the AR device 100 may retrieve relevant lighting and/or electrical code and/or guidelines or compare compliance with such guidelines based on geographic location information provided by a user or based on a location of the AR device 100 determined by the AR device 100 using GPS and/or other means.

In some example embodiments, the AR device 100 may display other design information 814 on the viewport 106. For example, the design information 814 may include information indicating whether the products in the BOM 808 are compliant with one or more codes and/or guidelines such as those described above. The AR device 100 may display design information 814 in response to the user input provided using the BOM validation input interface 812. Alternatively or in addition, the AR device 100 may display design information 814 in response to the generation of the BOM 808 as described above. In some example embodiments, the AR device 100 or via communication with a cloud sever having access to inventory information, may display whether or not one or more products in the BOM (e.g., the BOM 808) are available for purchase or an estimate of when the one or more products may be available for purchase or delivery.

In some example embodiments, the design information 814 may include suggestions of additional and/or replacement products. For example, the design information 814 may suggest one or more load control devices (e.g., relays, etc.) based on the number lighting fixtures and IoT devices included in the BOM 808 and the power ratings of the lighting fixtures and IoT devices. As another example, the design information 814 may suggest one or more replacement lighting fixtures to meet light level guidelines and/or requirements, occupancy-based lighting control requirements, plenum rating requirements, power density requirements, etc. In some example embodiments, the design information 814 may provide information indicating wire gauge recommendations based the number of lighting fixtures and load control devices included in the BOM 808. A user may use the product menu 804 to add products to the BOM 808 or to replace products included in the BOM 808.

In some example embodiments, the user may order the products included in the BOM 808 using the order input interface 810. For example, clicking or tapping the order input interface 810 may result in the e-commerce interface 802 or another page/interface being displayed on the viewport 106 for the execution of a purchase/ordering of the products included in the BOM.

In general, the AR device may execute software code included in the AR application or interfaced with the AR application to perform the operations described herein. Alternatively or in addition, the AR device 100 may send relevant information to another device (e.g., a cloud server) to perform some of the operations.

In some alternative embodiments, the BOM 808, interfaces, etc. shown in FIG. 8C may be displayed in a different format, on different pages, etc. without departing from the scope of this disclosure. In some alternative embodiments, one or more of the interfaces and information shown in FIG. 8C may be omitted without departing from the scope of this disclosure.

Figure 9:
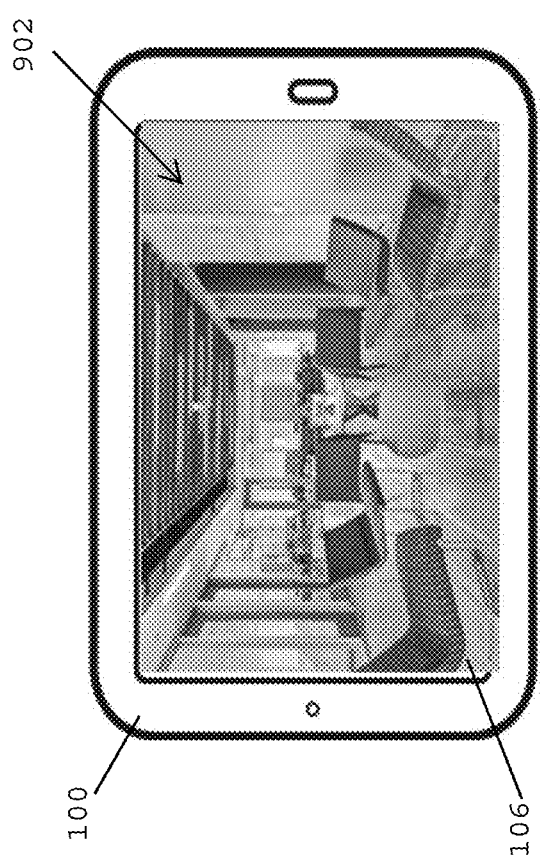
FIGS. 9-11 illustrate lighting design stages using the AR device of FIGS. 1A-1D according to another example embodiment.
Figure 10:
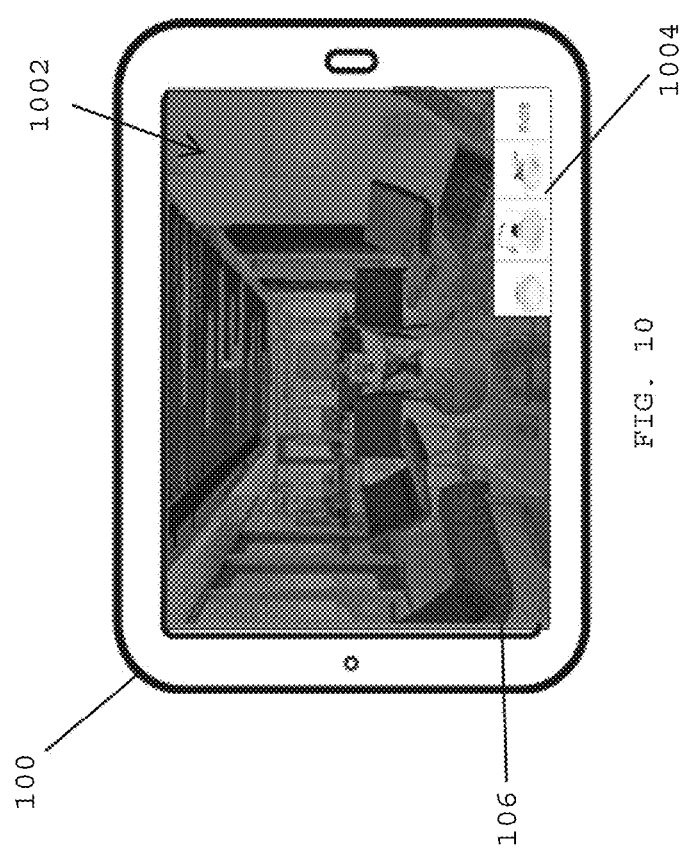
Figure 11:
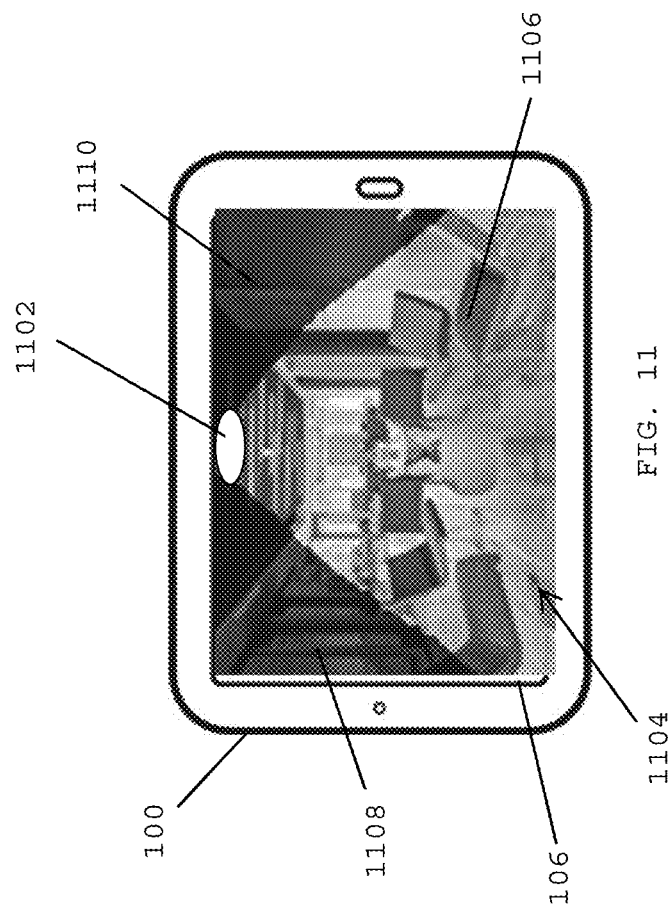

FIGS. 9-11 illustrate lighting design stages using the AR device 100 of FIGS. 1A-1D according to another example embodiment. Although the descriptions below are presented generally with respect to the AR device 100 of FIGS. 1A and 1B, the description is equally applicable to the AR devices 120, 130 of FIGS. 1C and 1D. In some example embodiments, FIG. 9 illustrates a real-time image 902 of a target area displayed on the viewport 106 of the AR device 100 incorporating the lighting design AR application. FIG. 10 illustrates a modified image 1002 of a target area along with lighting fixture 3-D models 1004 displayed for selection by a user. For example, as described with respect to FIG. 4, a user may provide an input to the AR device 100 (e.g., via the input area 108 or via the viewport 106) to apply a darkening filter to the pixels of the viewport 106 such that the modified image 1002 is a result of the real-time image 902 and the darkening of the viewport 106. As can be seen in FIG. 10, the real-time image 902 of the target area may still be visible to the user after the darkening filter is applied to allow the user to place one or more selected lighting fixture 3-D models at a desired location with respect to the real-time image 902 of the target area.

In some example embodiments, FIG. 11 illustrates an image 1104 that includes a real-time image 902 of the target area overlaid with a lighting pattern associated with or resulting from a selected lighting fixture 3-D model 1102 and an associated photometric file. The AR device 100 executes the lighting design AR application to process the photometric data of the selected 3-D model 1102 and generate the lighting pattern, which is overlaid on the real-time image 902 of the target area along with the selected lighting fixture 3-D model 1102. For example, the AR device 100 may use the photometric data associated with the selected lighting fixture 3-D model 1102 to generate a display model (e.g., a polygon or another display model) representing the lighting pattern, and the generated display model may be displayed on the viewport 106 overlaid on the real-time image 902 of the target area. In some alternative embodiments, the display model may be received/retrieved by the AR device 100 in response to the selection of the lighting fixture 3-D model 1102. For example, the AR device 100 may receive/retrieve the display model representing the lighting pattern (e.g., as a polygon or another type of display model) from another device (e.g., a local or remote server) that generates the display model after receiving from the AR device 100 information indicating the selected lighting fixture 3-D model 1102.

Information such as color temperature, luminance levels, etc. contained in the photometric data may be represented by the parameters of the display model, and the pixels of the viewport 106 are changed/set based on the parameters of the display model. For example, different points or parts of a polygon (or another display model) may be associated with different luminance levels, color temperature values, etc. contained in the photometric data associated with the selected lighting fixture 3-D model 1102. The AR device 100 may display the real-time image of the target area overlaid with the polygon by adjusting/setting the pixels of the viewport 106 to account for the parameters of the polygon.

In some example embodiments, the AR device 100 may use the photometric data associated with the selected lighting fixture 3-D model 1102 along with the lighting conditions in the target area to generate a polygon (or another display model) that has parameters that are based on both the photometric data and the lighting conditions. For example, the AR device 100 may use the lighting condition sensed by the ambient light sensor 110 to generate the parameters of a display model. In some example embodiments, the AR device 100 may generate a display model based on the photometric data of the selected lighting fixture 3-D model 1102 and modify the parameters of the display model based on the sensed lighting condition.

In some example embodiments, the AR device 100 may execute an artificial intelligence application to determine objects and structures in the target area, for example, based on the real-time imager of the target area. For example, the AR device 100 may identify reflective surfaces, walls, furniture, etc. and account for reflections, shadows, etc. in generating the display model that is overlaid on the real-time image displayed on the viewport 106.

The AR device 100 executes the lighting design AR application to selectively remove/change the darkening filter applied to the pixels of the viewport 106 as described above with respect to FIG. 7. A shown in FIG. 11 an area 1106 may be well lit as compared to areas 1108 and 1110 that may be dimly lit. The lighting design AR application may process the photometric data of the selected 3-D model 1102 to determine the appearance of shadows, etc., resulting in realistic lighting patterns.

As illustrated in FIG. 11, the selected lighting fixture 3-D model 1102 is displayed in the real-time image of the target area, enabling the user to assess how the corresponding lighting fixture will look when installed in the target area. Thus, a user, such as a lighting designer, owner, etc., may more effectively perform lighting design of a particular area (e.g., a living room, a bedroom, a hallway, etc.) without having to install actual lighting fixtures while minimizing design errors.

As described above, a display model that represents the photometric data associated with one or more lighting fixtures may be a 2D polygon, a 3-D polygon, a combination of 2D and/or 3-D polygons, graphical image(s), another type of image(s), etc. A polygon as an example of a display model may be a 2D polygon, a 3-D polygon, a combination of 2D and/or 3-D polygons, graphical image(s), another type of image(s), etc.

In some alternative embodiments, another device may perform some of the operations described herein with respect to the AR device 100. To illustrate, another device, such as a local or remote server, may generate one or more display models based on information provided by the AR device 100. For example, the AR device 100 may provide information such as the selected lighting fixture 3-D model 602-608 and/or relevant photometric data to another processing device that generates the display model(s), and the AR device 100 may receive/retrieve the generated display model(s) from the other processing device.

Figure 12:
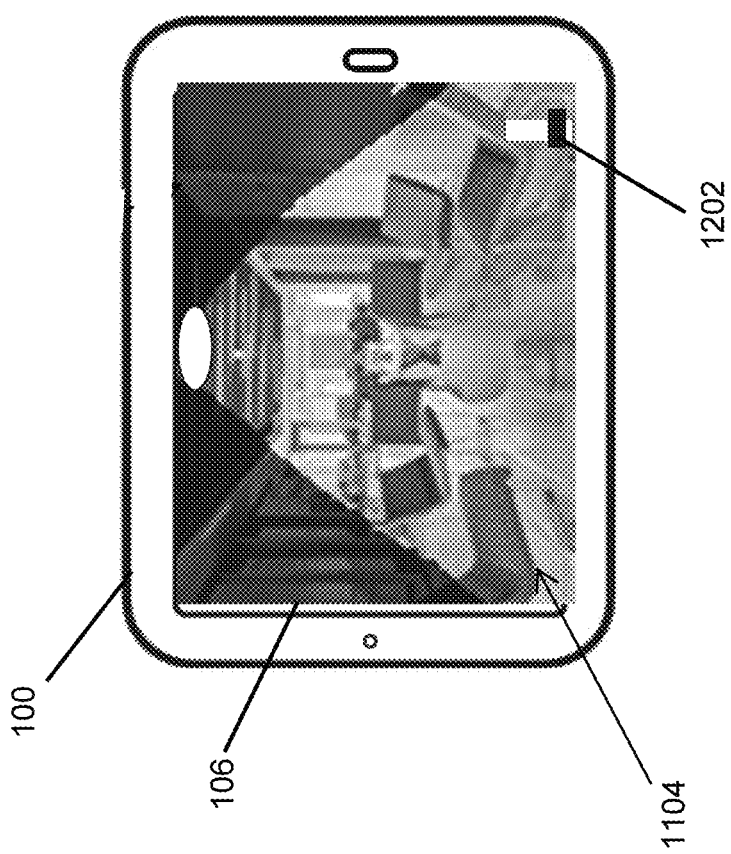
FIG. 12 illustrates a lighting characteristic selector of the augmented reality device of FIGS. 1A and 1B according to an example embodiment.

FIG. 12 illustrates a lighting characteristic selector 1202 of the augmented reality device of FIG. 1 according to an example embodiment. In some example embodiments, the lighting characteristic selector 1202 may be used to change and/or select a color temperature or even a particular color (e.g., wavelength) of the light from the 3-D model 1102. For example, the selector 1202 may be used to select from discrete color temperature values corresponding to lighting fixture 3-D models stored or available to the AR device 100. Alternatively or in addition, the selector 1202 or another selector may be used to change and/or select luminance levels, light output patterns of the selected 3-D model 1102, etc. In some example embodiments, changing a characteristic of the light from the selected 3-D model 1102 may effectively result in a replacement of the selected 3-D model by another 3-D model or in the replacement of the associated photometric file(s), for example, when the outward appearance of the 3-D model is not affected by the changes. The change/selection of a characteristic of the light from the selected 3-D model 1102 may result in a corresponding change being reflected in the image 1104 displayed on the viewport 1104.

Figure 13C:
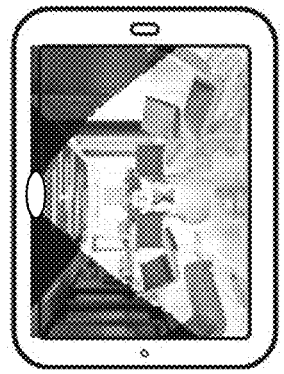
FIGS. 13A-13C illustrate the lighting pattern of FIGS. 11 and 12 with different color temperatures according to an example embodiment.
Figure 13B:
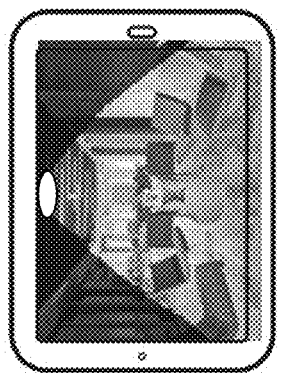
Figure 13A:
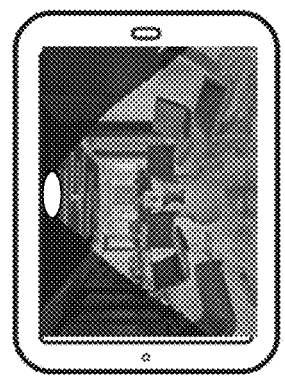

FIGS. 13A-13C illustrate the lighting pattern of FIGS. 11 and 12 with different color temperatures according to an example embodiment. The lighting pattern with the particular color temperature shown in FIGS. 13A-13C may be produced by the AR device based on a user selection of a respective color temperature using, for example, the lighting characteristics selector 1202 of FIG. 12 or another selection means. For example, the CCT of 2200 K shown in FIG. 13A may correspond to the bottom most position of the lighting characteristics selector 1202, the CCT of 4000 K shown in FIG. 13B may correspond to a middle position of the lighting characteristics selector 1202, and the CCT of 6500 K shown in FIG. 13C may correspond to the upper most position of the lighting characteristics selector 1202. To illustrate, in response to a CCT selection indicated by the lighting characteristics selector 1202, the AR devices 100 may execute code to change the color (and as needed, the brightness) of relevant pixels. For example, subpixels of each relevant pixel may be adjusted to produce a desired color of the particular pixel. In some example embodiments, the AR device 100 applies a darkening, brightening, and/or color adjustment filter to the pixels of the viewport 106 to display the lighting pattern with the CCT corresponding to the selection indicated by the lighting characteristics selector 1202.

In some example embodiments, particular positions of the lighting characteristics selector 1202 may be associated with a respective display model stored in or otherwise retrievable by the AR device 100. For example, each model may be a polygon that has a shape corresponding to a particular light distribution pattern, where the polygon has display parameters corresponding to a CCT value, etc. To illustrate, the AR device 100 may modify the pixels of the viewport 106 to display the polygon (i.e., the display model) overlaid on the real-time image of the target area. In some example embodiments, the AR device 100 may generate or retrieve the CCT related parameters of the polygon based on the CCT indicated by the lighting characteristics selector 1202. In some example embodiments, the AR device 100 may generate or modify the parameters of the polygon based on the CCT selection indicated by the lighting characteristics selector 1202 along with the lighting condition in the target area, for example, sensed by the ambient light sensor 110 of the device 100.

In some alternative embodiments, each color temperature of the lighting pattern shown in FIGS. 13A-13C may be produced by selecting a lighting fixture 3-D model from among the 3-D models 1004 shown in FIG. 10, where the selected 3-D model is associated with a photometric file that reflects the desired color temperature.

In some example embodiments, the lighting pattern of FIGS. 11 and 12 may also be produced with a desired luminance level in a similar manner as described with color temperature. To illustrate, the lighting pattern of FIGS. 11 and 12 may also be produced with a desired luminance level by selecting the desired luminance level using the selector 1202 of FIG. 12 or another means. For example, a top position of the lighting characteristics selector 1202 may correspond to a first luminance level (e.g., 1300 lumens), a middle position of the lighting characteristics selector 1202 may correspond to a second luminance level (e.g., 1100 lumens), and a bottom position of the lighting characteristics selector 1202 may correspond to a third luminance level (e.g., 900 lumens). To illustrate, in response to a luminance level selection indicated by the lighting characteristics selector 1202, the AR devices 100 may execute code to change the color (and as needed, the brightness) of relevant pixels. In some example embodiments, the AR device 100 applies a darkening or brightening filter to the pixels of the viewport 106 to display the lighting pattern with the luminance levels corresponding to the selection indicated by the lighting characteristics selector 1202.

In some example embodiments, particular positions of the lighting characteristics selector 1202 may be associated with a respective display model stored in or otherwise retrievable by the AR device 100. For example, each display model may be a polygon that has a shape corresponding to a particular light distribution pattern, where the polygon has display parameters corresponding to luminance levels, etc. To illustrate, the AR device 100 may modify the pixels of the viewport 106 to display the polygon (i.e., the display model) overlaid on the real-time image of the target area. In some example embodiments, the AR device 100 may generate or retrieve the luminance level related parameters of the polygon based on the luminance level indicated by the lighting characteristics selector 1202. In some example embodiments, the AR device 100 may generate or modify the parameters of the polygon based on the luminance level selection indicated by the lighting characteristics selector 1202 along with the lighting condition in the target area, for example, sensed by the ambient light sensor 110 of the device 100.

Alternatively, the desired luminance intensity may be achieved by selecting a 3-D model associated with a photometric file that includes the desired luminance intensity.

Figure 14:
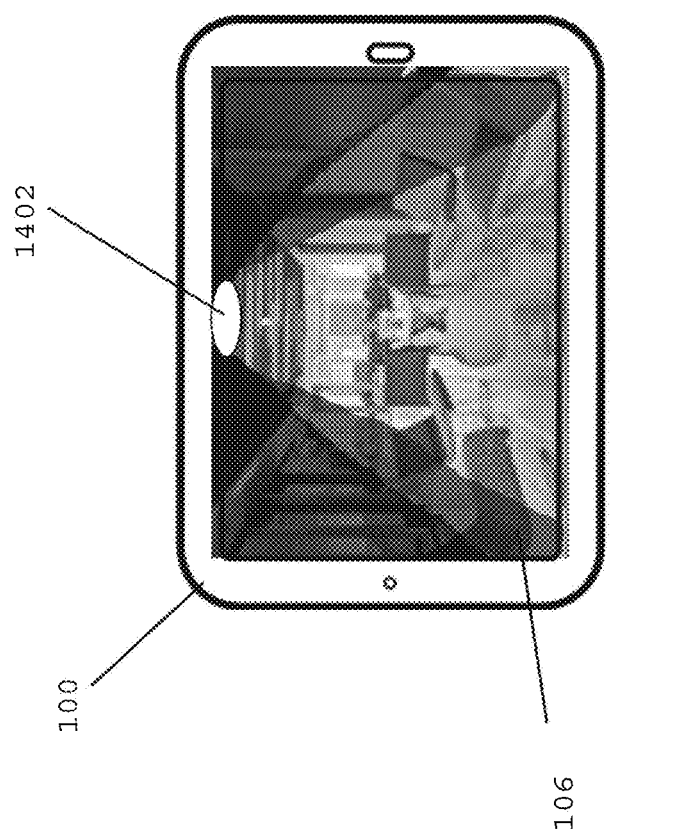
FIG. 14 illustrates an alternative lighting pattern produced by the augmented reality device of FIGS. 1A and 1B according to an example embodiment.

FIG. 14 illustrates an alternative lighting pattern produced by the AR device 100 according to an example embodiment. The alternative lighting pattern may result from the selection of a lighting fixture 3-D model 1402 that produces a different lighting pattern as compared to the 3-D model 1102 of FIG. 11.

In some example embodiments, the color temperature, luminance intensity, lighting pattern, and/or another characteristic of the light from a lighting fixture 3-D model may be changed after the initial lighting pattern as shown in FIG. 11 (also in FIG. 7A) is displayed.

Figure 15:
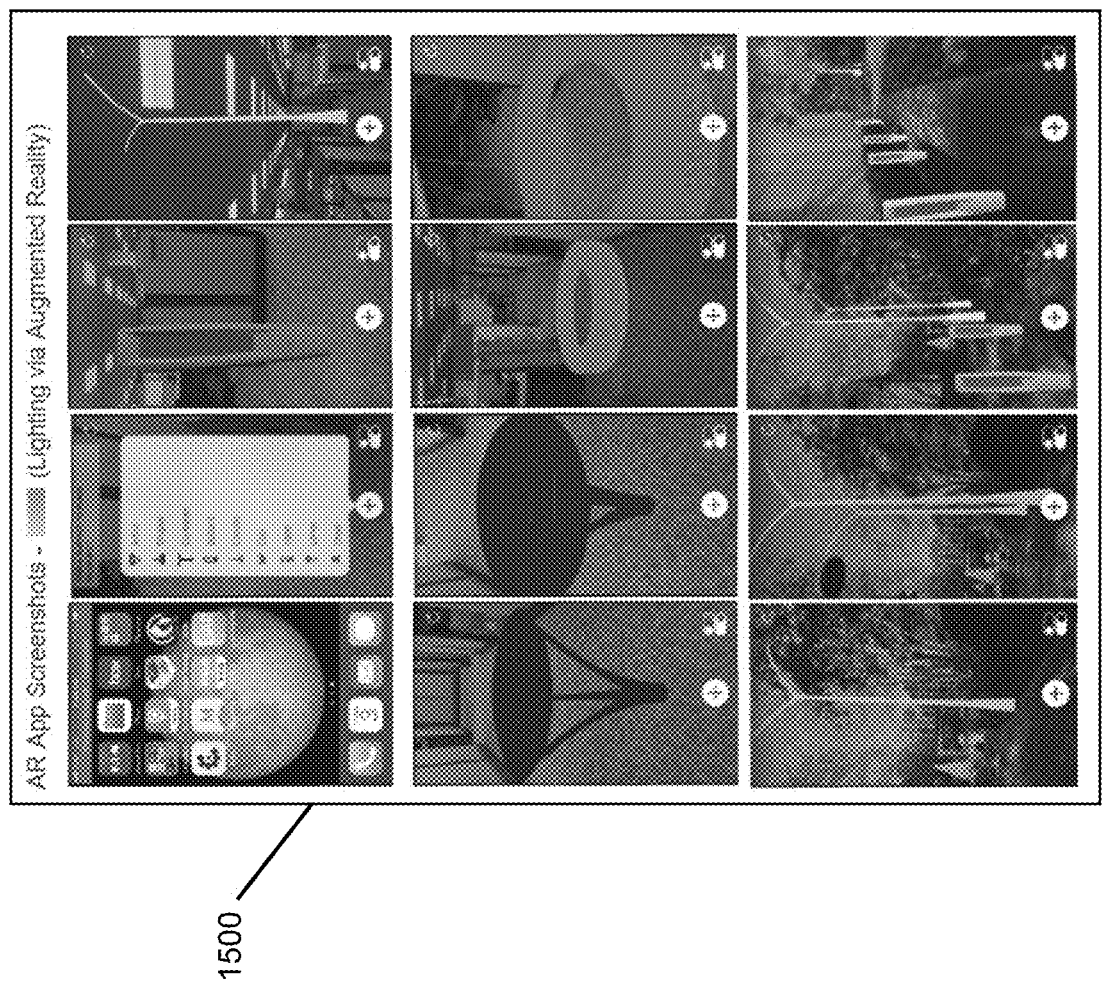
FIG. 15 illustrates different screenshots of images produced using the augmented reality device of FIGS. 1A and 1B according to an example embodiment.

FIG. 15 illustrates an image frame 1500 screenshots of images produced using the augmented reality device of FIGS. 1A and 1B according to an example embodiment. These images may also be displayed on a screen of the AR devices 120, 130 of FIGS. 1C and 1D. In some example embodiments, going from left to right of each row of images, in the top row, the leftmost image shows an icon (LiAR) for activating the AR application described above. The next image in the top row shows a menu that can be used, for example, to select a lighting fixture model to be placed in a real-time image of the area viewable by the camera of the AR device. The right two images on the top row and all the images in the middle row show 3-D models of different lighting fixtures overlaid on the image of the physical area (e.g., an office hallway) as viewed by the camera of the AR device.

The images on the bottom row show 3-D models of different outdoor lighting fixtures overlaid on the image of the physical area (e.g., a walkway) as viewed by the camera of the AR device. In general, the AR devices 100, 120, 130 may execute AR lighting design application to overlay one or more 3-D models of indoor and outdoor lighting fixtures on images of physical spaces (e.g., indoor space such as living room, kitchen, hallway, halls, etc. and outdoor spaces such as parking garages, open parking lots, walkways, stadiums, auditoriums, etc. to make a realistic assessment of the appearance of the lighting fixtures as well as the lighting effects of the lighting fixtures prior to the installation of the lighting fixtures.

Figure 16:
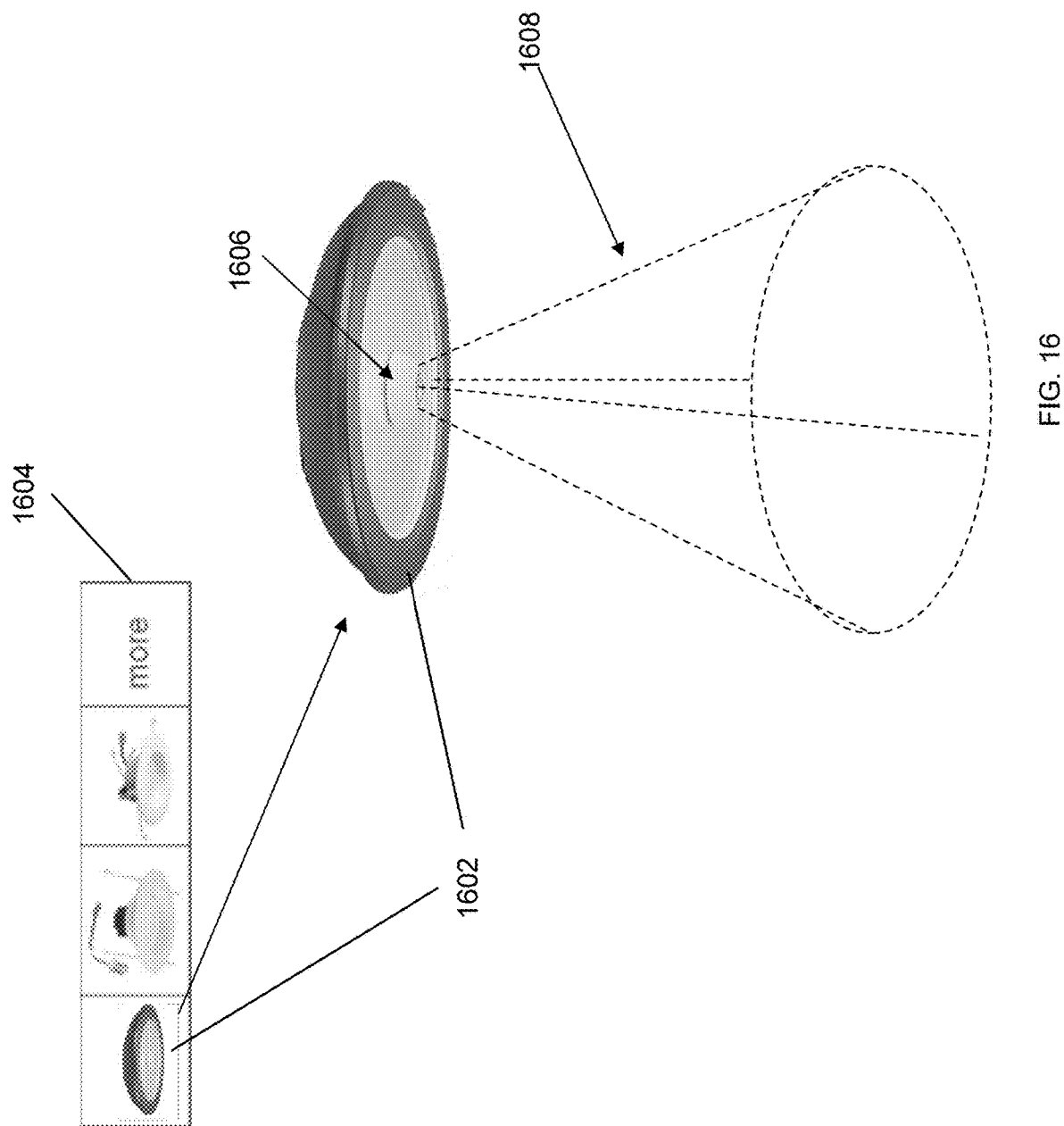
FIG. 16 illustrates a 3-D model 1602 of a lighting fixture with an integrated sensor 1606 according to an example embodiment.

FIG. 16 illustrates a 3-D model 1602 of a lighting fixture with an integrated sensor 1606 according to an example embodiment. In some example embodiments, the AR devices 100, 120, 130 may be used in IoT design (e.g., placement of IoT devices in a space) in addition to or instead of the lighting design. The AR devices 100, 120, 130 may be used to perform IoT design in a similar manner as described above with respect to the AR device 100 and lighting design. For example, a menu 1604 of 3-D models of lighting fixtures with and without integrated IoT devices (e.g., the sensor 1606) and standalone IoT devices may be displayed or otherwise provided on the viewport 106 of the AR device 100 and on the corresponding display screen of the AR devices 120 and 130. Each 3-D model may be associated with a parameter data file that includes data indicating the detection range/angles/field of view 1608 of the sensor 1606 (e.g., a motion sensor, carbon dioxide sensor, carbon monoxide sensor, smoke sensor, etc.). A user may select a 3-D model such as the 3-D model 1602 of a lighting fixture with the sensor 1606 and place the 3-D model on a desired location on the real-time image of a target area as described above with respect to FIGS. 3-11. The AR devices 100, 120, 130 may execute the AR application to overlay on the real-time image of the target area a display model (e.g., a polygon or another display model) corresponding to the detection range/angle of the sensor 1606 in a similar manner as described above with respect to lighting design. For example, the AR device 100, 120, 130 may generate the display model or retrieve an existing display model associated with the selected 3-D model 1602. In some example embodiments, the parameter data file may include other information that can be used to generate the display model without departing from the scope of this disclosure.

Figure 17:
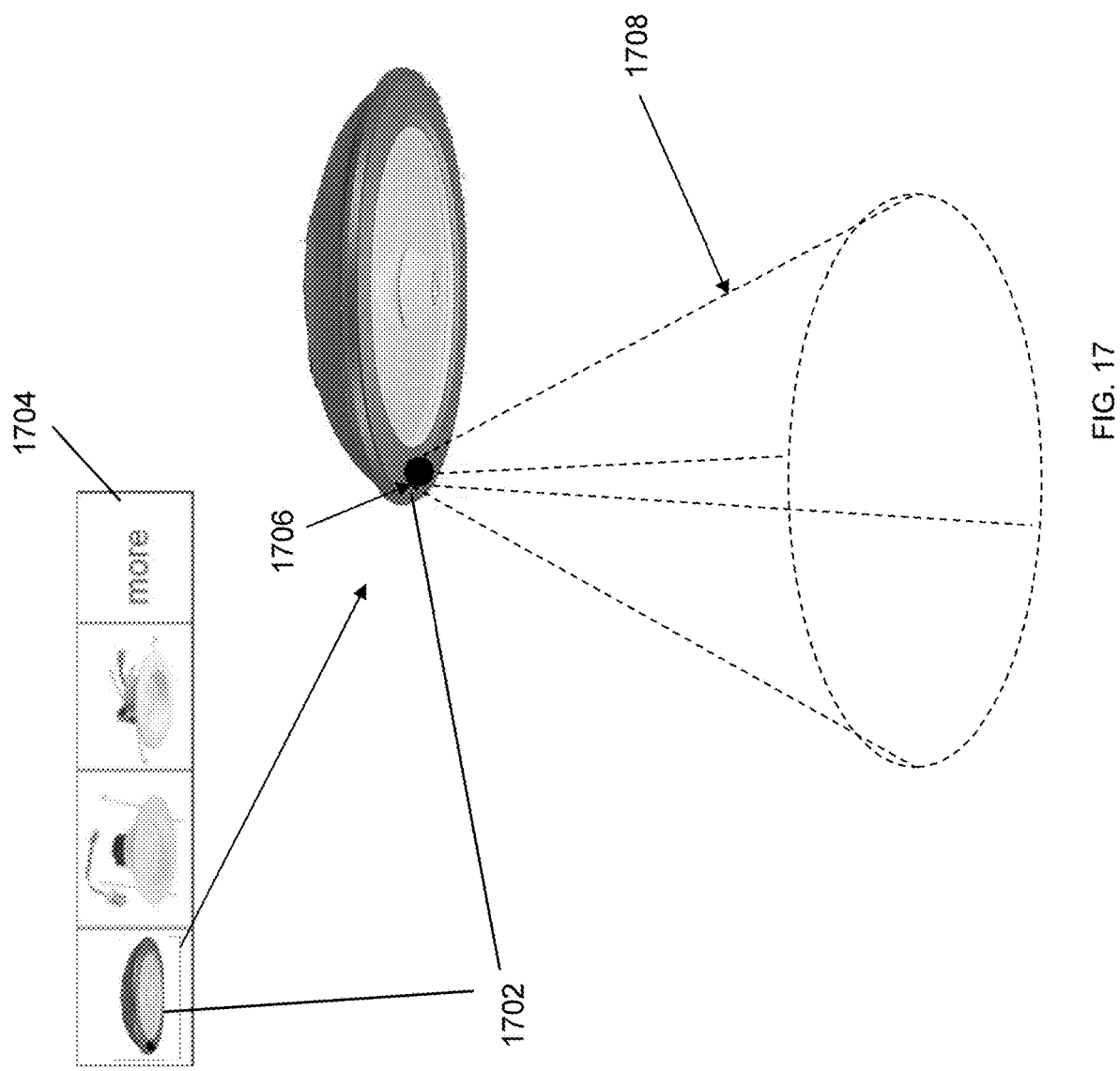
FIG. 17 illustrates a 3-D model of a lighting fixture with an integrated camera 1706 according to an example embodiment.

FIG. 17 illustrates a 3-D model of a lighting fixture with an integrated camera 1706 according to an example embodiment. In some example embodiments, a menu 1704 of 3-D models of lighting fixtures with and without integrated IoT devices (e.g., the camera 1706) and standalone IoT devices may be displayed or otherwise provided on the viewport 106 of the AR device 100 and on the corresponding display screen of the AR devices 120 and 130. Each 3-D model may be associated with a parameter data file that includes data indicating the field of view 1708 of the camera 1706. A user may select a 3-D model such as the 3-D model 1702 of a lighting fixture with the integrated camera 1706 and place the 3-D model on a desired location on the real-time image of a target area as described above with respect to FIGS. 3-11. The AR devices 100, 120, 130 may execute the AR application to overlay on the real-time image of the target area a display model (e.g., a polygon or another display model) corresponding to the field of view 1708 of the camera 1706 in a similar manner as described above with respect to lighting design. For example, the AR device 100, 120, 130 may generate the display model or retrieve an existing display model associated with the selected 3-D model 1702. In some example embodiments, the parameter data file may include other information that can be used to generate the display model without departing from the scope of this disclosure.

Figure 18:
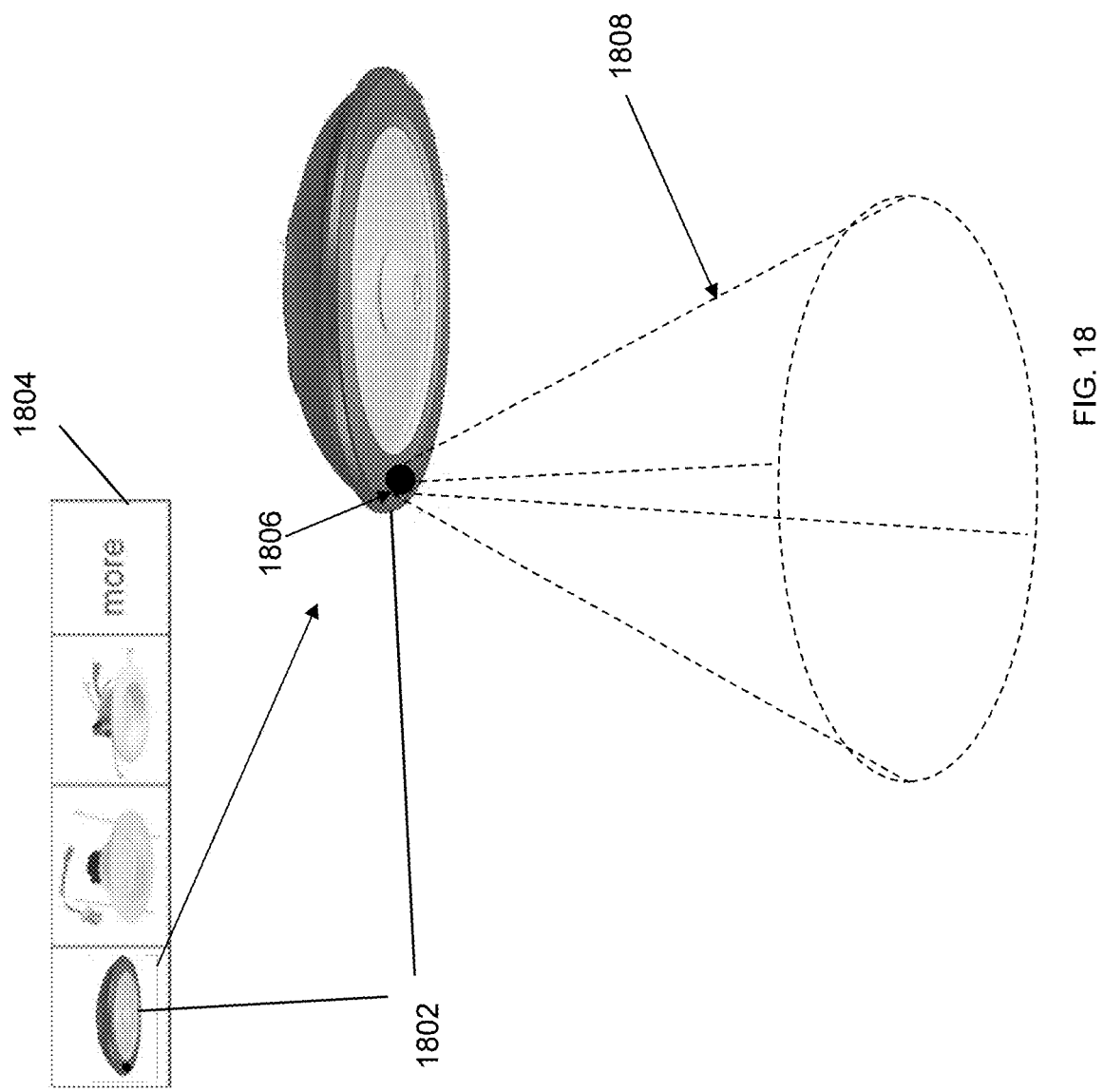
FIG. 18 illustrates a 3-D model of a lighting fixture with an integrated speaker 1806 according to an example embodiment.

FIG. 18 illustrates a 3-D model of a lighting fixture with an integrated speaker or array of speakers 1806 according to an example embodiment. In some example embodiments, a menu 1804 of 3-D models of lighting fixtures with and without integrated IoT devices (e.g., the speaker or array of speakers 1806) and standalone IoT devices may be displayed or otherwise provided on the viewport 106 of the AR device 100 and on the corresponding display screen of the AR devices 120 and 130. Each 3-D model may be associated with a parameter data file that includes data indicating the range and/or directionality 1808 of the sound that can be produced by the speaker or array of speaker or array of speakers 1806, for example, at a maximum rating of the speaker or array of speakers 1806 and/or at different percentages of the maximum rating of the speaker or array of speakers 1806. A user may select a 3-D model such as the 3-D model 1802 of a lighting fixture with the integrated speaker or array of speakers 1806 and place the 3-D model on a desired location on the real-time image of a target area as described above with respect to FIGS. 3-11. The AR devices 100, 120, 130 may execute the AR application to overlay on the real-time image of the target area a display model (e.g., a polygon or another display model) corresponding to the range 1808 of the speaker or array of speakers 1806 in a similar manner as described above with respect to the photometric data in lighting design. For example, the AR device 100, 120, 130 may generate the display model or retrieve an existing display model associated with the selected 3-D model 1802. In some example embodiments, the parameter data file may include other information that can be used to generate the display model without departing from the scope of this disclosure.

Figure 19:
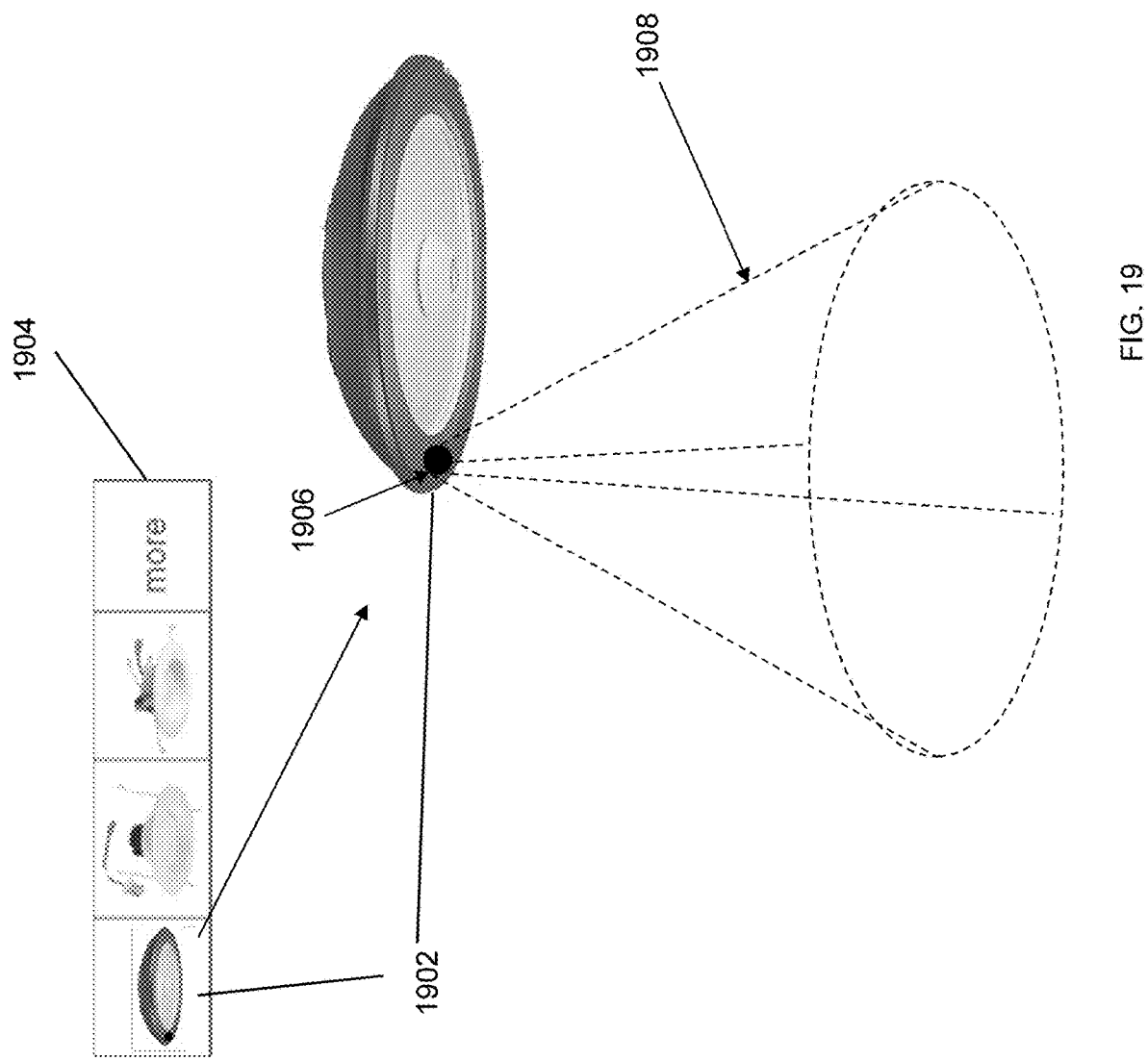
FIG. 19 illustrates a 3-D model of a lighting fixture with an integrated microphone 1906 according to an example embodiment.

FIG. 19 illustrates a 3-D model of a lighting fixture with an integrated microphone or array of microphones 1906 according to an example embodiment. In some example embodiments, a menu 1904 of 3-D models of lighting fixtures with and without integrated IoT devices (e.g., the microphone or array of microphones 1906) and standalone IoT devices may be displayed or otherwise provided on the viewport 106 of the AR device 100 and on the corresponding display screen of the AR devices 120 and 130. Each 3-D model may be associated with a parameter data file that includes data indicating the range and/or directionality 1908 that a sound generated at a particular decibel or different decibels can be detected by the microphone or array of microphones 1906. A user may select a 3-D model such as the 3-D model 1902 of a lighting fixture with the integrated microphone or array of microphones 1906 and place the 3-D model on a desired location on the real-time image of a target area as described above with respect to FIGS. 3-11.

The AR devices 100, 120, 130 may execute the AR application to overlay on the real-time image of the target area a display model (e.g., a polygon or another display model) corresponding to the range 1908 of the microphone or array of microphones 1906 in a similar manner as described above with respect to the photometric data in lighting design. For example, the AR device 100, 120, 130 may generate the display model or retrieve an existing display model associated with the selected 3-D model 1702. In some example embodiments, the parameter data file may include other information that can be used to generate the display model without departing from the scope of this disclosure.

In some example embodiments, the AR devices 100, 120, 130 and the AR application may be used to perform lighting as well as IoT design, where 3-D models of lighting fixtures with and without IoT devices are presented to the user on the display screen of the AR devices. In general, operations provided herein with respect to one of the AR devices 100, 120, 130 are applicable to other ones of the AR devices 100, 120, 130.

In some alternative embodiments, a parameter data file that includes alternative gradient of lighting information may be used instead of the photometric data file described above. The description provided herein with respect to photometric data and photometric data files may be equally applicable to parameter data and parameter data files with alternative gradient of lighting data.

Figure 20:
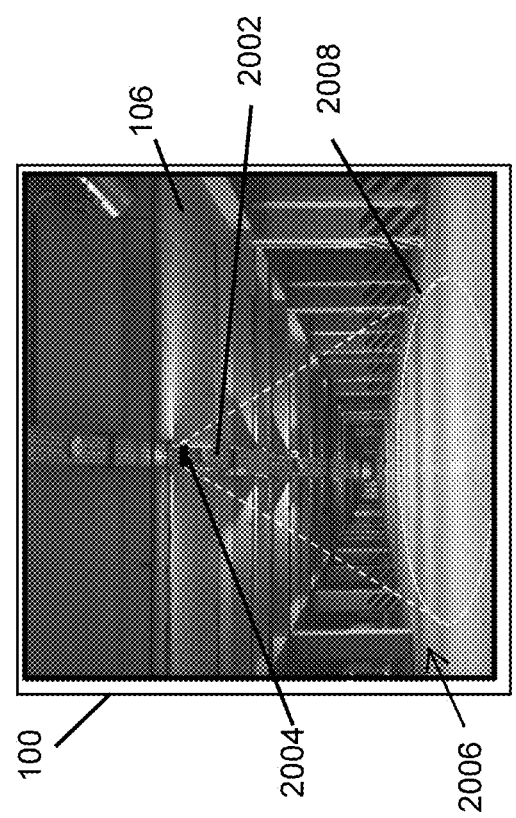
FIGS. 20 and 21 illustrate use of the augmented reality device of FIG. 1A to simulate sensor-controlled lighting behavior according to an example embodiment.
Figure 21:
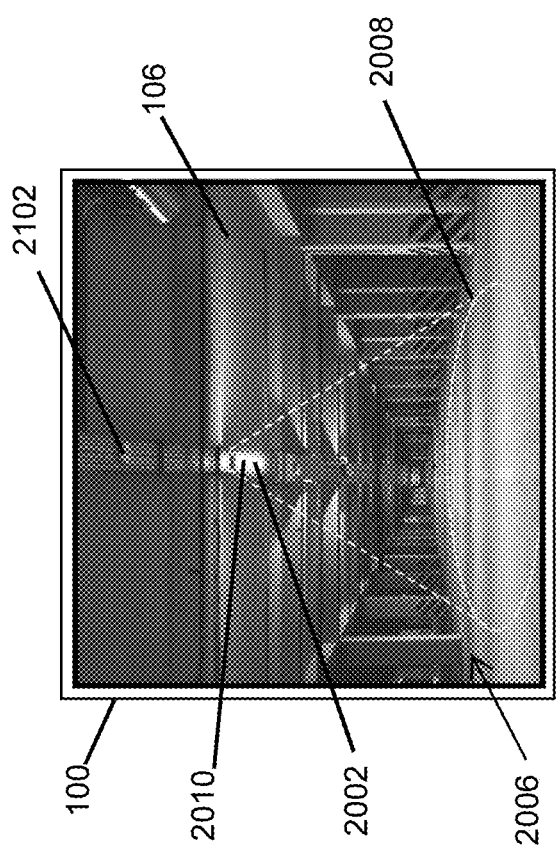

FIGS. 20 and 21 illustrate use of the augmented reality device 100 of FIG. 1A to simulate sensor-controlled lighting behavior according to an example embodiment. In some example embodiments, the AR devices 120, 130 of FIGS. 1C and 1D may be used instead of the AR device 100. Referring to FIGS. 1A-21, in some example embodiments, the AR device 100 may display a real-time image 2006 of a target area, for example, a parking lot or garage or an indoor space in a similar manner as described above with respect to FIGS. 3 and 9. The AR device 100 may display one or more 3-D models such as a 3-D model 2002 of a lighting fixture with one or more IoT devices shown as an IoT device 2004. For example, the 3-D model 2002 may correspond to the 3-D model 1602 shown in FIG. 16 or 1702 shown in FIG. 16.

In some example embodiments, the IoT device 2004 may have an operational range 2008. For example, the IoT device 2004 may be a sensor such as a motion sensor. To illustrate, the operational range 2008 of the IoT device 2004 may be the detection range, angle, or field of view of a motion sensor. As another example, the IoT device 2004 may be a camera, where the operational range 2008 of the IoT device 2004 may be the field of view of the camera.

In some example embodiments, some operations of the lighting fixture represented by the 3-D model 2002 may depend on or may be controlled by the one or more IoT devices of the lighting fixtures. To illustrate, after the one or more 3-D models, including the 3-D model 2002 that includes the IoT device 2004, are displayed on the viewport 1006, a user carrying the AR device may move toward the real-time image 2006 and the IoT device 2004 (i.e., toward the 3-D model 2002). When the user reaches the operational range 2008 (which may or may not be displayed in the viewport 106) of the IoT device 2004, a lighting pattern 2010 may be displayed by the AR device 100. The display of the lighting pattern 2010 in response to the user moving into or within the operational range 2008 of the IoT device 2004 simulates the behavior of the lighting fixture with one or more IoT devices represented by the 3-D model 2002 in response to a person (or a car or other object detected by the IoT device) moving into or within the detection or sensing region of the one or more IoT devices.

In some example embodiments, the lighting pattern 2010 may be removed from the viewport 106 in response to the user holding the AR device 100 moving out of the operational range 2008 of the IoT device. For example, if the user returns to the original location in the target physical area, the image displayed on the viewport 106 may be similar to the image shown in FIG. 20.

By simulating the behavior of lighting fixtures without installing the lighting fixtures and the IoT devices, a user may achieve desirable results, confirm desired operation with the need for physical installation, and/or avoid some design errors. For example, more accurate location and/or orientation of IoT devices integrated with lighting fixtures or external to lighting fixtures may be determined by simulating the behavior of lighting fixtures in response to the IoT devices.

In some alternative embodiments, the IoT device 2004 may be external to the lighting fixture represented by the 3-D model 2002. In some example embodiments, the behavior of multiple lighting fixtures in response to one or more IoT devices may be simulated in a similar manner. In some example embodiments, the lighting pattern 2010 may be similar to the lighting pattern shown in FIG. 3 or FIG. 9. In some example embodiments, similar simulation of the operation of devices (that are not light fixtures, such as automatic doors, shades, fans, thermostats, displays or other controllable devices) being controlled or in communication with IoT device(s) in response to the AR device entering or leaving the simulated range or pattern associated with an operating characteristic of an IoT device(s) may be displayed on the AR device.

Figure 22:
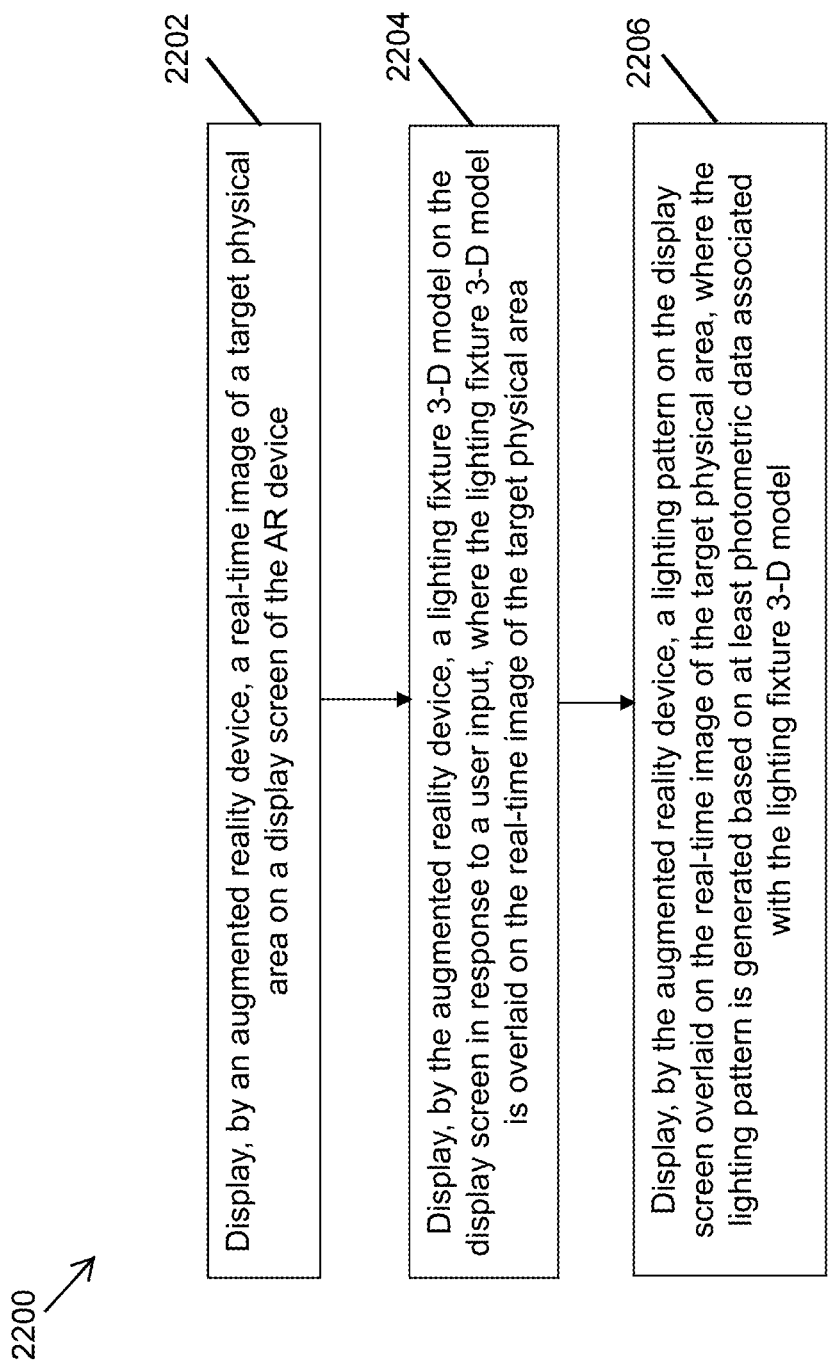
FIG. 22 illustrates a method of augmented reality-based lighting and IoT design according to an example embodiment.

FIG. 22 illustrates a method 2200 of augmented reality-based lighting and IoT design according to an example embodiment. Referring to FIGS. 1A-22, in some example embodiments, the method 2200 includes, at step 2202, displaying, by an augmented reality device (e.g., the AR device 100, 120, 130), a real-time image of a target physical area on a display screen of the AR device. For example, the AR device 100 may display the real-time image 304 of the target physical area 302 as viewed by the camera 102.

At step 2204, the method 2200 may include displaying, by the augmented reality device, a lighting fixture 3-D model on the display screen in response to a user input, where the lighting fixture 3-D model is overlaid on the real-time image of the target physical area. For example, the 3-D model 602 and other 3-D models may be overlaid on the real-time image 304. To illustrate, the lighting fixture 3-D model may be overlaid on the real-time image 304 before or after a darkening filter has been applied to the real-time image 304 as described with respect to FIG. 4. As another example, one or more lighting fixture 3-D models may be overlaid on the real-time image 902 shown in FIG. 9.

At step 2206, the method 2200 may include displaying, by the augmented reality device, a lighting pattern on the display screen overlaid on the real-time image of the target physical area, where the lighting pattern is generated based on at least photometric data associated with the lighting fixture 3-D model. For example, image 702, including the lighting pattern, shown in FIG. 7A may be displayed by the AR device 100 by overlaying the lighting pattern on the real-time image 304 of the target physical area 302. The AR device 100, 120, 130 or another device may generate the lighting pattern from at least the photometric data associated with the lighting fixture 3-D model as described above.

In some example embodiments, the method 2200 may include darkening the display screen before displaying the lighting fixture 3-D model on the display screen as described with respect to FIGS. 4 and 10. For example, the real-time image of the target physical area may remain visible after the darkening of the display screen to allow the placement of lighting fixture 3-D models at desired locations in the real-time image 304. In some alternative embodiments, the darkening the display screen may be omitted when, for example, assessment of lighting pattern is not performed. For example, a lighting design may be focused on the aesthetic features of the lighting fixture(s) (or one or more of the light fixtures subcomponents such as a trim, optic, or accessories) in the target area instead of lighting patterns.

In some example embodiments, the method 2200 may include changing a color temperature associated with the lighting pattern displayed on the display screen. The color temperature may be changed in response to a user input. For example, the lighting characteristic selector 1202 may be used to change and/or select a color temperature as described with respect to FIGS. 12-13C. In some alternative embodiments, replacing the displayed 3-D model by another 3-D model may result in a different color temperature.

In some example embodiments, the method 2200 may include changing a luminance level associated with the lighting pattern displayed on the display screen. The luminance level may be changed in response to a user input. For example, the lighting characteristic selector 1202 may be used to change and/or select a luminance level as described with respect to FIGS. 12-13C. In some alternative embodiments, replacing the displayed 3-D model by another 3-D model may result in a different luminance level.

In some example embodiments, the method 2200 may include displaying, by the augmented reality device, luminance level values indicating luminance levels associated with the lighting pattern overlaid on the real-time image of the target physical area, for example, as described with respect to FIG. 7B. The method 220 may also include displaying, by the augmented reality device, one or more other lighting fixture 3-D models on the display screen in response to a user input, for example, as described with respect to FIG. 6. The one or more lighting fixture 3-D models may be overlaid on the real-time image of the target physical area in a similar manner as the 3-D model at step 2204. In some alternative embodiments, one or more other lighting fixture 3-D models may be added to the real-time image (e.g., the real-time image 304, 902) displayed on the display screen (e.g., the display screen 106) before or after darkening the display screen. Alternatively, the darkening of the display screen may be omitted.

In some alternative embodiments, one or more steps of the method 2200 may be omitted or may be performed in a different order than described above. Although some of the steps of the method 2200 are described with respect to one or more images or figures, the steps may be applicable to other images and figures without departing from the scope of this disclosure. Although some of the steps of the method 2200 are described with respect to the AR device 100, the steps may be performed by the other AR devices including the AR device 120 and 130 without departing from the scope of this disclosure. In general, the steps of the method 2200 may be performed by the AR devices 100, 120, 130. For example, a controller (e.g., the controller 202) of the AR devices may execute software code to perform the steps of the method 2200.

Figure 23:
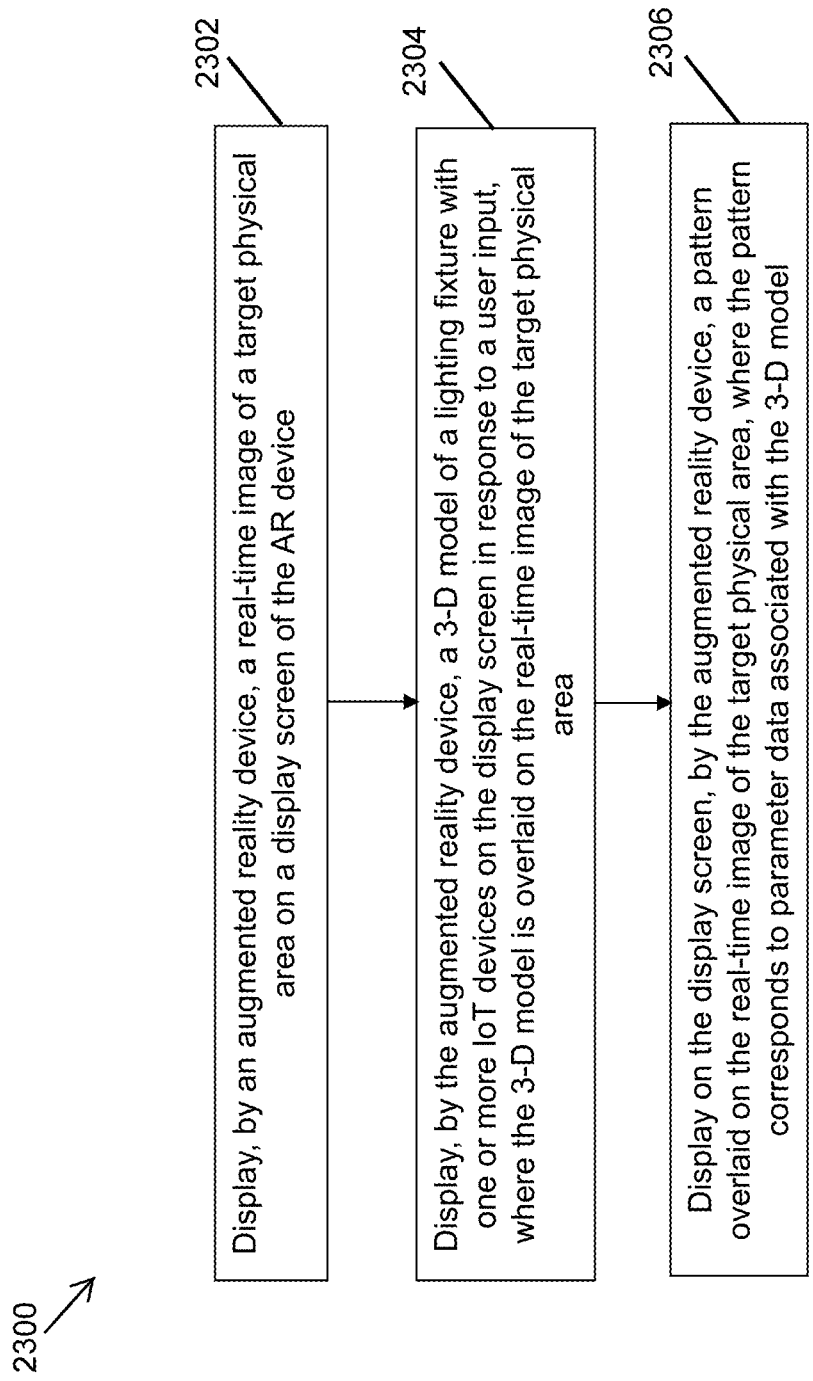
FIG. 23 illustrates a method of augmented reality-based lighting and IoT design according to another example embodiment.

FIG. 23 illustrates a method 2300 of augmented reality-based lighting and IoT design according to another example embodiment. Referring to FIGS. 1A-23, in some example embodiments, the method 2300 includes, at step 2302, displaying, by an augmented reality device (e.g., the AR device 100, 120, 130), a real-time image of a target physical area on a display screen of the AR device. For example, the AR device 100 may display the real-time image 304 of the target physical area 302 as viewed by the camera 102.

At step 2304, the method 2300 may include displaying, by the augmented reality device, a 3-D model of a lighting fixture with one or more IoT devices on the display screen in response to a user input, where the 3-D model is overlaid on the real-time image of the target physical area. For example, the 3-D model 602 may correspond to a lighting fixture with one or more integrated IoT devices (or, alternatively, one or more standalone IoT devices), and the 3-D model 602 and other similar 3-D models may be overlaid on the real-time image 304 shown in FIG. 3. The 3-D model 602 may be overlaid on the real-time image 304 before or after a darkening filter has been applied to the real-time image 304 as described with respect to FIG. 4. As another example, a 3-D model of a lighting fixture with one or more IoT devices may be overlaid on the real-time image 902 shown in FIG. 9.

At step 2306, the method 2300 may include displaying on the display screen, by the augmented reality device, a pattern overlaid on the real-time image of the target physical area, where the pattern corresponds to parameter data associated with the 3-D model. For example, the pattern may correspond to the one or more operating characteristics associated with an IoT device(s) integrated with the lighting fixture correspond to the 3-D model. In some example embodiments, a lighting pattern as described above, for example, with respect to FIGS. 7A and 11 may also be overlaid on the real-time image displayed on the display screen.

To illustrate with an example, the one or more IoT devices may include one or more sensors, and the pattern overlaid on the real-time image may show the detection range, angle, and/or field of view of the one or more sensors. For example, a pattern showing the detection range/angle 1608 shown in FIG. 16 may be overlaid on the real-time image 304 or 902 in a similar manner as the lighting pattern or luminance levels described above. The 3-D model of the lighting fixture with the one or more IoT devices may be associated with a parameter data file that includes data indicating the detection range, angle, and/or field of view of the one or more sensors.

As another example, the one or more IoT devices may include one or more cameras, and the pattern overlaid on the real-time image may show the field of view of the one or more cameras. For example, a pattern showing the field of view 1708 of the camera 1706 shown in FIG. 17 may be overlaid on the real-time image 304 or 902 in a similar manner as the lighting pattern or luminance levels described above. The 3-D model of the lighting fixture with the one or more IoT devices may be associated with a parameter data file that includes data indicating the field of view of the one or more cameras.

As another example, the one or more IoT devices may include one or more speakers, and the pattern overlaid on the real-time image may show the range and/or directionality of a sound produced by the one or more speakers, for example, at a particular decibel (a decibel value or values may also be displayed). For example, a pattern showing the range and/or directionality 1808 of the speaker 1806 shown in FIG. 18 may be overlaid on the real-time image 304 or 902 in a similar manner as the lighting pattern or luminance levels described above. The 3-D model of the lighting fixture with the one or more IoT devices may be associated with a parameter data file that includes data indicating the range and/or directionality of a sound produced by the one or more speakers at one or more decibels.

As another example, the one or more IoT devices may include one or more microphones, and the pattern overlaid on the real-time image may show the sound detection range and/or directionality of the one or more microphones, for example, at a particular decibel (a decibel value or values may also be displayed). For example, a pattern showing sound detection range and directionality 1908 of the microphone 1906 shown in FIG. 19 may be overlaid on the real-time image 304 or 902 in a similar manner as the lighting pattern or luminance levels described above. The 3-D model of the lighting fixture with the one or more IoT devices may be associated with a parameter data file that includes data indicating sound detection range and/or directionality of the one or more microphones.

In some example embodiments, a lighting pattern as described above, for example, with respect to FIGS. 7A and 11 may also be overlaid on the real-time image displayed on the display screen.

In some example embodiments, one or more steps of the method 2300 may be performed using 3-D models of standalone IoT devices. In some example embodiments, one or more steps of the method 2300 may be performed as one or more steps of the method 2200 without departing from the scope of this disclosure. In some alternative embodiments, one or more steps of the method 2300 may be omitted or may be performed in a different order than described above. Although some of the steps of the method 2300 are described with respect to one or more images or figures, the steps may be applicable to other images and figures without departing from the scope of this disclosure. In general, the steps of the method 2300 may be performed by the AR devices 100, 120, 130. For example, a controller (e.g., the controller 202) of the AR devices may execute software code to perform the steps of the method 2300.

Figure 24:
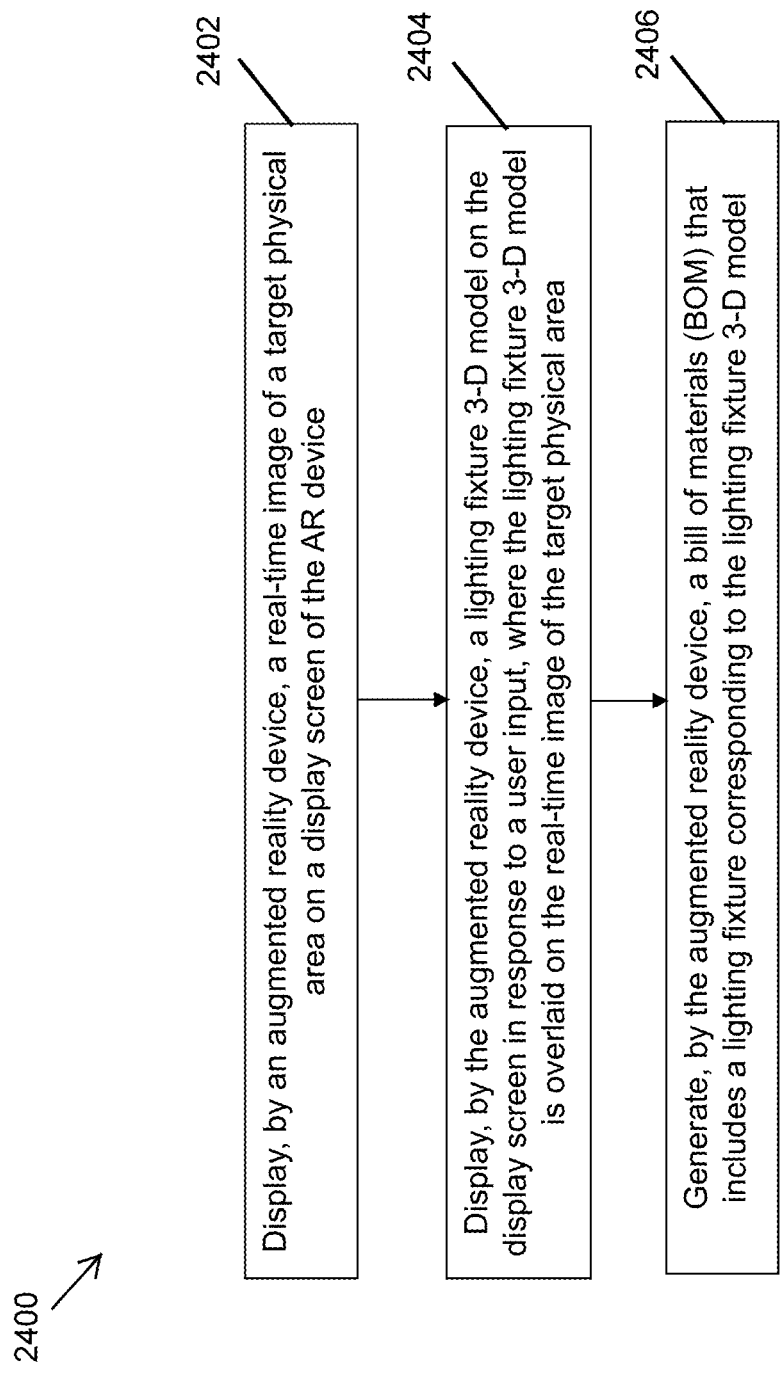
FIG. 24 illustrates a method of augmented reality-based lighting and IoT design according to another example embodiment.

FIG. 24 illustrates a method 2400 of augmented reality-based lighting and IoT design according to another example embodiment. Referring to FIGS. 1A-24, in some example embodiments, the method 2400 includes, at step 2402, displaying, by an augmented reality device (e.g., the AR device 100, 120, 130), a real-time image of a target physical area on a display screen of the AR device. For example, the AR device 100 may display the real-time image 304 of the target physical area 302 as viewed by the camera 102. As another example, the AR device 100 may display the real-time image 902 of a target physical area as viewed by the camera 102.

At step 2404, the method 2400 may include displaying, by the augmented reality device, a lighting fixture 3-D model on the display screen in response to a user input, where the lighting fixture 3-D model is overlaid on the real-time image of the target physical area. For example, the 3-D model 602 may correspond to a lighting fixture with or without one or more integrated IoT devices, and the 3-D model 602 and other similar 3-D models may be overlaid on the real-time image 304 shown in FIG. 3. As another example, a 3-D model of a lighting fixture with or without one or more IoT devices may be overlaid on the real-time image 902 shown in FIG. 9.

At step 2406, the method 2400 may include generating, by the augmented reality device, a BOM (or purchase order) that includes a lighting fixture corresponding to the lighting fixture 3-D model. For example, the AR device 100 may generate the BOM 808 shown in FIG. 8C. To illustrate, the AR device 100 may generate or retrieve from a remote device (e.g., cloud server) that generates the BOM 808 in response to a user input provided to the AR device 100, for example, via the BOM generation input interface 806 or another input interface. Alternatively, the BOM may be generated upon a completion of lighting and IoT design process that may be indicated in one of several means as can be understood by those of ordinary skill in the art with the benefit of this disclosure.

For example, the 3-D model 602 and other 3-D models may be overlaid on the real-time image 304. To illustrate, the lighting fixture 3-D model may be overlaid on the real-time image 304 before or after a darkening filter has been applied to the real-time image 304 as described with respect to FIG. 4. As another example, one or more lighting fixture 3-D models may be overlaid on the real-time image 902 shown in FIG. 9.

In some example embodiments, the method 2400 may include displaying, by the augmented reality device, a lighting pattern on the display screen overlaid on the real-time image of the target physical area, for example, as described with respect to the method 2200. In some example embodiments, the method 2400 may include displaying, by the augmented reality device, a product menu (e.g., the product menu 804 and/or a search bar to search for products) on the display screen (e.g., the viewport 106) for use by a user to add one or more products to the BOM, such as the BOM 808.

In some example embodiments, the method 2400 may include displaying, by the augmented reality device, a message (e.g., the design information 814) suggesting one or more other lighting products to be added to the BOM (e.g., the BOM 808). In some example embodiments, the method 2400 may include determining, by the augmented reality device or via communication with a cloud sever, whether one or more products in the BOM (e.g., the BOM 808) are available for purchase or an estimate of when the one or more products may be available for purchase or delivery. In some example embodiments, the method 2400 may include determining, by the augmented reality device or via communication with a cloud sever, whether one or more products in the BOM (e.g., the BOM 808) are compliant with an electrical or lighting code or guideline (e.g., ICC, OSHA, Title 24 of the California Code of Regulations, and/or other codes or standards). In some example embodiments, the method 2400 may include displaying, by the augmented reality device, a message e.g., the design information 814) indicating whether the one or more products in the BOM are compliant with the electrical or lighting code or guideline. The displayed information (e.g., the design information 814) may also include another message displayed by the AR device suggesting one or more other lighting products as replacements to one or more products included in the BOM. In some example embodiments, the method 2400 may also include displaying a message indicating whether one or more lighting fixtures listed in the BOM provide a light having a lighting level that is compliant with an electrical or lighting code or guideline. For example, the message may be included in the design information 814 displayed on the viewport 106.

In some example embodiments, one or more steps of the method 2400 may be performed as one or more steps of the methods 2200 and 2300 without departing from the scope of this disclosure. In some alternative embodiments, one or more steps of the method 2400 may be omitted or may be performed in a different order than described above. Although some of the steps of the method 2400 are described with respect to one or more images or figures, the steps may be applicable to other images and figures without departing from the scope of this disclosure. In general, the steps of the method 2400 may be performed by the AR devices 100, 120, 130. For example, a controller (e.g., the controller 202) of the AR devices may execute software code to perform the steps of the method 2400.

Figure 25:
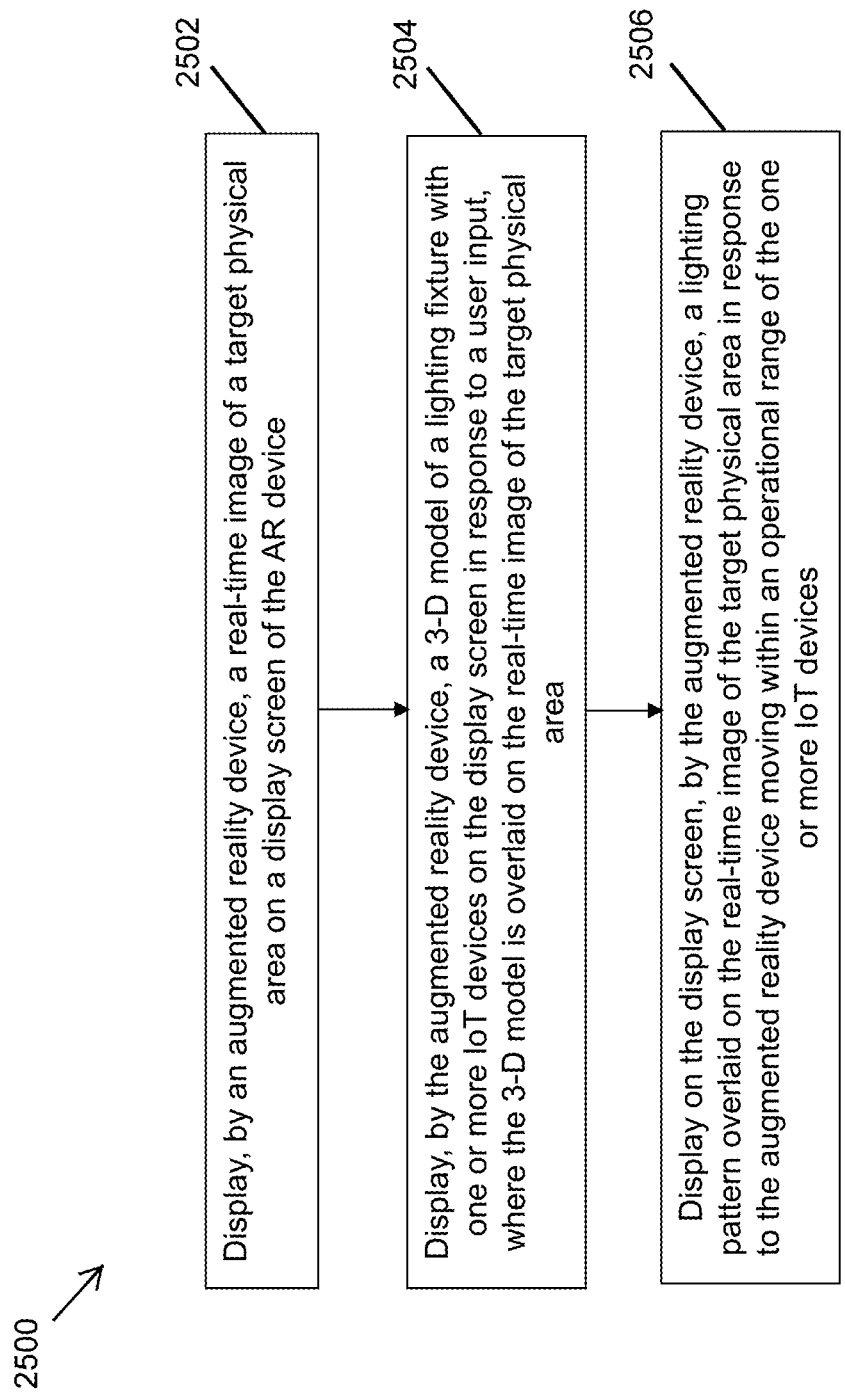
FIG. 25 illustrates a method of augmented reality-based lighting and IoT design according to another example embodiment.

FIG. 25 illustrates a method of augmented reality-based lighting and IoT design according to another example embodiment. Referring to FIGS. 1A-25, in some example embodiments, the method 2500 includes, at step 2502, displaying, by an augmented reality device (e.g., the AR device 100, 120, 130), a real-time image of a target physical area on a display screen of the AR device. For example, the AR device 100 may display the real-time image 304 of the target physical area 302 as viewed by the camera 102. As another example, the AR device 100 may display the real-time image 902 of a target physical area as viewed by the camera 102.

At step 2504, the method 2500 may include displaying, by the augmented reality device, a 3-D model of a lighting fixture with one or more IoT devices on the display screen in response to a user input, where the 3-D model is overlaid on the real-time image of the target physical area. For example, the 3-D model 602 may correspond to a lighting fixture (or other device controlled or in communication with one or more IoT devices) with or without one or more integrated IoT devices, and the 3-D model 602 and other similar 3-D models may be overlaid on the real-time image 304 shown in FIG. 3. As another example, a 3-D model of a lighting fixture with or without one or more IoT devices may be overlaid on the real-time image 902 shown in FIG. 9.

At step 2506, the method 2500 may include displaying on the display screen, by the augmented reality device, a lighting pattern overlaid on the real-time image of the target physical area in response to the augmented reality device moving within an operational range of the one or more IoT devices. For example, the lighting pattern may be similar to the lighting pattern shown in FIGS. 7A and 11 or may be intended to just show that the 3-D model is emitting a light similar to the emitted light shown in FIG. 21. Alternatively, the lighting pattern may have a different appearance than shown in FIGS. 7A, 11, and 21 without departing from the scope of this disclosure. In some example embodiments, the method 2500 may include, before displaying the light pattern, displaying on the display screen an IoT device pattern overlaid on the real-time image of the target physical area in response to the augmented reality device moving within an operational range of the one or more IoT devices. For example, the IoT device pattern may correspond to the operational range 2008 (e.g., range, angles, field of view, etc.) of the one or more IoT devices.

In some example embodiments, the method 2500 may include displaying on the display screen, by the augmented reality device, an IoT device pattern overlaid on the real-time image of the target physical area, for example, as shown in FIG. 21. For example, the one or more IoT devices may include one or more motion sensors, where the operational range of the one or more IoT devices is a detection range of the one or more motion sensors such as the detection range/angles/field of view 1608 of the sensor 1606 shown in FIG. 16 or the operational range 2008 (e.g., detection range) of the one or more IoT devices 2004 (e.g., one or more sensors) shown in FIG. 20. As another example, the one or more IoT devices may include one or more cameras, where the operational range of the one or more IoT devices is a field of view of the one or more cameras such as the field of view 1708 of the camera 1706 shown in FIG. 17 or the operational range 2008 (e.g., field of view) of the one or more IoT devices 2004 (e.g., one or more cameras) shown in FIG. 20.

In some example embodiments, the method 2500 includes removing the overlaid lighting pattern from the display screen in response to the AR device moving out of the operational range of the one or more IoT devices. For example, when a person carrying the AR device 100 moves outside of the operational range 2008 of the one or more IoT devices (e.g., one or more motion sensors and/or cameras), the light pattern illustrated in FIG. 21 may be removed such that, when the AR device 100 is returned to the same position as in FIG. 20, the image displayed on the AR device 100 appears similar to the image shown in FIG. 20.

In some example embodiments, one or more steps of the method 2500 may be performed to simulate the operation of devices (that are not light fixtures, such as automatic doors, shades, fans, thermostats, displays or other controllable devices) being controlled or in communication with IoT device(s) in response to the AR device entering or leaving the simulated range or pattern associated with an operating characteristic of an IoT device. In some example embodiments, one or more steps of the method 2500 may be performed as one or more steps of the other methods described herein without departing from the scope of this disclosure. In some alternative embodiments, one or more steps of the method 2500 may be omitted or may be performed in a different order than described above. Although some of the steps of the method 2500 are described with respect to one or more images or figures, the steps may be applicable to other images and figures without departing from the scope of this disclosure. In general, the steps of the method 2500 may be performed by the AR devices 100, 120, 130. For example, a controller (e.g., the controller 202) of the AR devices may execute software code to perform the steps of the method 2500.

In the above description, a display model that represents photometric data or other parameter data associated with one or more lighting fixtures or parameter data associated with one or more IoT devices may be a 2D polygon, a 3-D polygon, a combination of 2D and/or 3-D polygons, graphical image(s), another type of image(s), etc. A polygon as an example of a display model may be a 2D polygon, a 3-D polygon, a combination of 2D and/or 3-D polygons, graphical image(s), another type of image(s), etc.

In some alternative embodiments, another device may perform some of the operations described herein with respect to the AR device 100. To illustrate, another device, such as a local or remote server, may generate one or more display models based on information provided by the AR device 100. For example, the AR device 100 may provide information, such as information indicating selected lighting fixture 3-D model, and/or relevant photometric data or other parameter data to another processing device that generates the display model(s), and the AR device 100 may receive/retrieve the generated display model(s) from the other processing device.

Figure 26:
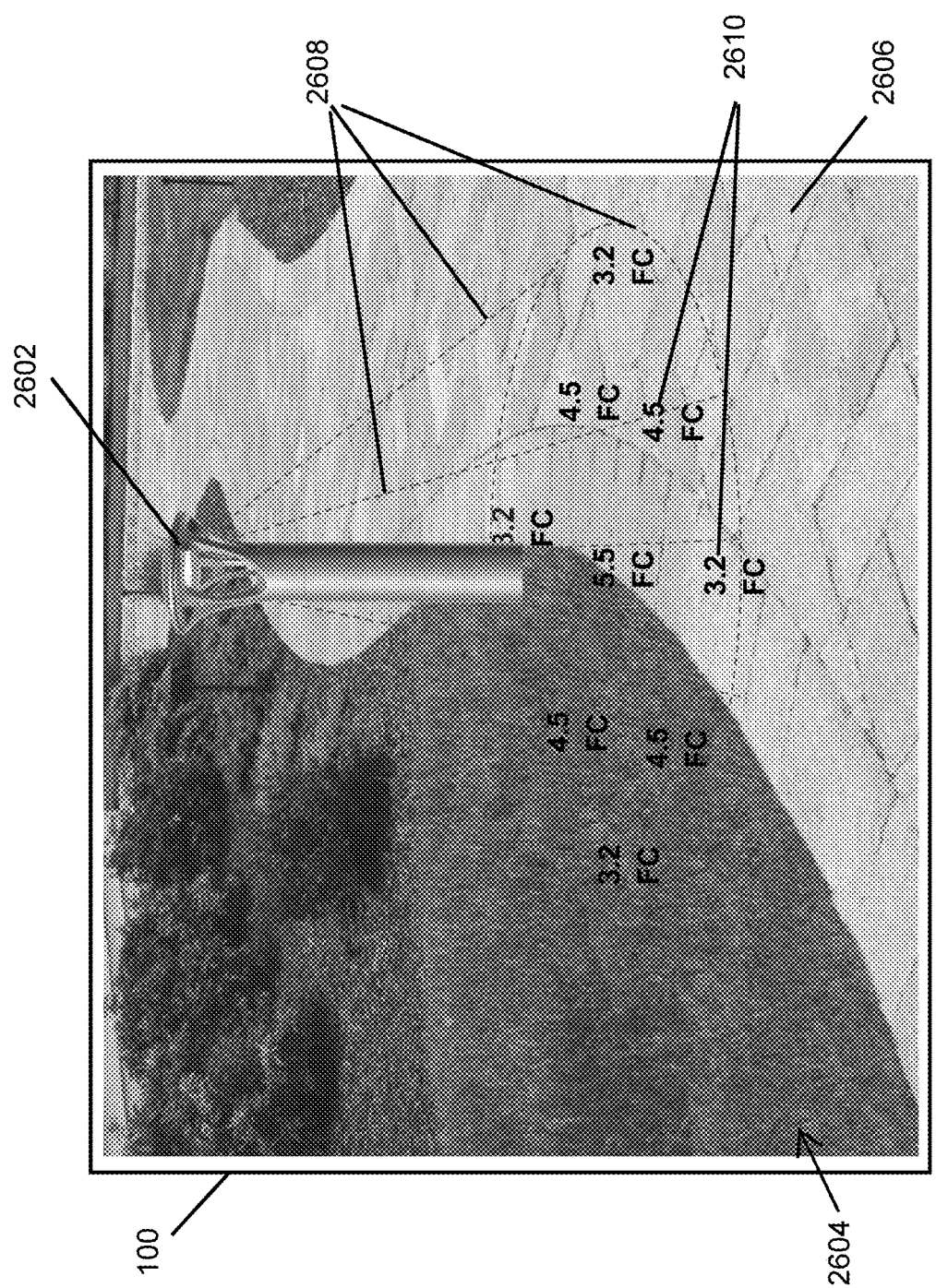
FIG. 26 illustrates a 3-D model of a lighting fixture and a lighting pattern including illuminance values overlaid on a real-time image of a target physical area according to an example embodiment.

FIG. 26 illustrates a 3-D model of a lighting fixture and a lighting pattern including luminance values overlaid on a real-time image of a target physical area according to an example embodiment. Referring to FIGS. 1B and 26, in some example embodiments, a real-time image 2604 of a target physical area as viewed by the camera 102 of the AR device 100 may be displayed on the viewport 106 of the AR device 100. For example, a lighting designer may desire to determine the appearance of a lighting fixture in the target physical area and characteristics of a light provided by the lighting fixture before installing the lighting fixture. Using the AR device 100 and an AR application, a 3-D model 2602 of a lighting fixture may be displayed in the viewport 106 of the AR device 100 as shown in FIG. 26. The 3-D model 2602 is overlaid on the real-time image 2604 of the target physical area displayed on the viewport 106 of the AR device 100 in a similar manner as described above.

In some example embodiments, illuminance values may be displayed on the viewport 106. To illustrate, the illuminance values may indicate brightness levels of the light that can be provided by the lighting fixture represented by the 3-D model 2602. For example, the illuminance values 2610 may be generated and displayed with respect to the light source of the lighting fixture as represented by the 3-D model 2602 and different locations on the ground 2606. The illuminance values 2610 that are overlaid on the real-time image 2604 may be in units of foot-candle (FC) and may be generated based on intensity values extracted from a photometric data file associated with the 3-D model 2602 or with the lighting fixture represented by the 3-D model 2602. The photometric data file may be an Illuminating Engineering Society (IES) file or another photometric data file. In some alternative embodiments, lighting data that is provided to the AR device 100 by a user may be used instead of or in addition to the photometric data. The general shape of the light that can be provided by the lighting fixture represented by the 3-D model 2602 may also be displayed on the viewport 106 of the AR device 100, for example, as dotted lines 2608. For example, the lines 2608 may be associated with a minimum threshold, where the shape (i.e., the outer contour) of the light is defined based on illuminance values that are above the minimum threshold (e.g., 3 FC). The minimum threshold may be set based on the expected effect of a light at various illuminance values or various distances from the light fixture as can be understood by those of ordinary skill in the art with the benefit of this disclosure.

As illustrated in FIG. 26, some areas of the ground 2606 may be associated with higher brightness level (e.g., 5.5 foot-candle (FC)) while other areas may be associated with a relatively darker level (e.g., 3.2 FC). As a user moves in the target area holding the AR device 100, the real-time image displayed on the viewport/display screen of the AR device 100 may change as different parts of the target physical area are viewed through the camera 102 of the AR device 100. Because the 3-D model 2602 remains virtually anchored to a location (e.g., based on coordinates) in the target physical areas, the 3-D model 2602 can be viewed from different sides on the viewport/display screen 106 as the AR device 100 moves in the target physical area as long as the virtual location of the 3-D model 2602 in the target physical area is in view of the camera 102.

As the user moves around in the target physical area holding the AR device 100, different luminance values may be displayed on the viewport 106 depending on the part of the target area that is displayed on the viewport 106 or depending on the position of the AR device 100 relative to the virtual locations of the 3-D model 2602 and/or the illuminance values. Because the illuminance values are anchored to locations in the target physical area (e.g., locations on the ground 2606), although different illuminance values may be displayed on the viewport 106 depending on the particular real-time image of the target physical area, the illuminance values that are associated with particular locations in the target physical area remain unchanged by the movement of the user and the AR device 100.

In some example embodiments, the illuminance values 2610 may be generated for various locations on the ground 2606 based on the height at which the light source of the lighting fixture as represented by the 3-D model 2602 is located. The height of the light source of the lighting fixture may be incorporated in the 3-D model 2602 of the lighting fixture. Horizontal angle, vertical angle, and intensity information provided in an IES file with respect to different lighting fixture installation heights may be used to generate illuminance values with respect to various locations on a horizontal surface and/or a vertical surface. The information in the IES file may also be used to determine color temperature and lighting shape of the light that can be provided by a lighting fixture. In this specification, the term "height" and the phrases "installation height" and "mounting height"

used with respect to a lighting fixture are intended to refer to the location of the light source of the lighting fixture with respect to a floor or a similar surface below the lighting fixture or on which the lighting fixture is installed.

In some example embodiments, the AR device 100 may execute software code that is separate or integrated with the lighting design AR application to generate illuminance values and to determine lighting shape of a light based on, for example, the illuminance values. The AR device 100 may execute the AR application to display on the viewport 106 the 3-D model 2602, illuminance values, color temperature, and/or shape of the light that can be provided of the lighting fixture.

In some example embodiments, the 3-D model 2602 may be selected from a menu similar to the menu 502 or other menus described above and may be placed in the desired location in the real-time image 2604 of the target physical area in a similar manner as described above with respect to other 3-D models. The AR device 100 may execute the AR application to position the 3-D model 2602 and maintain the location of the 3-D model 2602 with respect to the target physical area as the AR device 100 is moved and different real-time images are displayed on the viewport 106 of the AR device 100.

Although FIG. 26 is described with respect to the AR device 100, the AR devices 120, 130 or another AR device may be used without departing from the scope of this disclosure. In some alternative embodiments, multiple 3-D models and associated illuminance values and lighting shapes may be displayed on the AR device 100 without departing from the scope of this disclosure.

Figure 27:
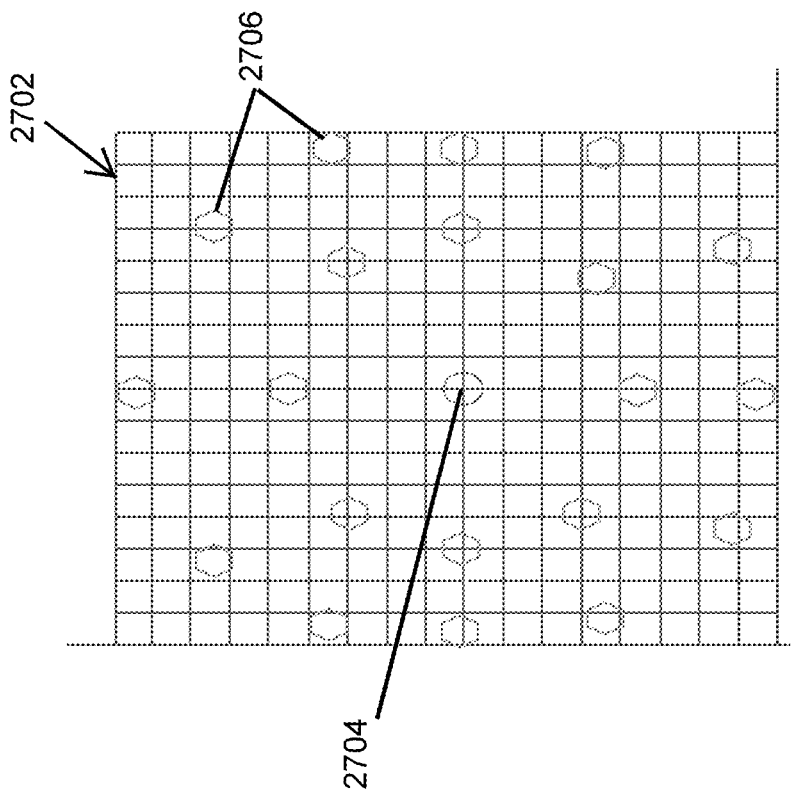
FIG. 27 illustrates a two-dimensional array that is partially populated with light intensity data extracted from a photometric file according to an example embodiment.

FIG. 27 illustrates a two-dimensional array 2702 that is partially populated with light intensity data extracted from a photometric data file according to an example embodiment. Referring to FIGS. 1B, 26, and 27, in some example embodiments, the two-dimensional array 2702 may represent a floor level, and the expected mounting height of a lighting fixture may be used to extract the relevant intensity values from an IES file associated with the lighting fixture. For example, the two-dimensional array 2702 may be considered as covering a floor or another surface that can be illuminated by a light from a lighting fixture installed at a mounting height above the floor or the other surface. To illustrate, the two-dimensional array 2702 may represent a scenario where a lighting fixture is at a location 2704, which is at a center of the two-dimensional array 2702, at a mounting height above a floor level. Horizontal angle, vertical angle, and intensity values for the particular expected mounting height of the lighting fixture may be extracted from the IES file, and intensity values, such as intensity values 2706, may be used to populate some locations of the two-dimensional array 2702 representing locations on the floor. The populated locations of the two-dimensional array 2702 may correspond to particular horizontal and vertical angles included in the IES file with respect to the expected installation height of the lighting fixture above the floor at the location 2704.

In some example embodiments, linear interpolations of the populated intensity values may be performed to fully or mostly populate the two-dimensional array 2702. The linear interpolations may be performed between two intensity values in a manner that can be readily understood by those of ordinary skill in the art with the benefit of this disclosure. The size and resolution of the two-dimensional array 2702 may depend on the type of lighting fixture. For example, the size and resolution of the two-dimensional array that is used for a linear lighting fixture may be different from the size and resolution of the two-dimensional array that is used with a round lighting fixture. To illustrate, the size and resolution of the two-dimensional arrays, such as the two-dimensional array 2702, may be pre-defined for different lighting fixtures.

In some example embodiments, another level (e.g., a table surface) instead of a floor level may be used to determine the net height of a lighting fixture above the level in order to select the relevant intensity, horizontal angle, and vertical angle values from an IES file. Although particular locations of the array 2702 are shown as populated, in alternative embodiments, more or fewer locations or different locations may be populated with intensity values without departing from the scope of this disclosure. The height and mounting height of a light fixture as used herein generally refer to the location of the light source of the lighting fixture above the floor or another surface.

Figure 28:
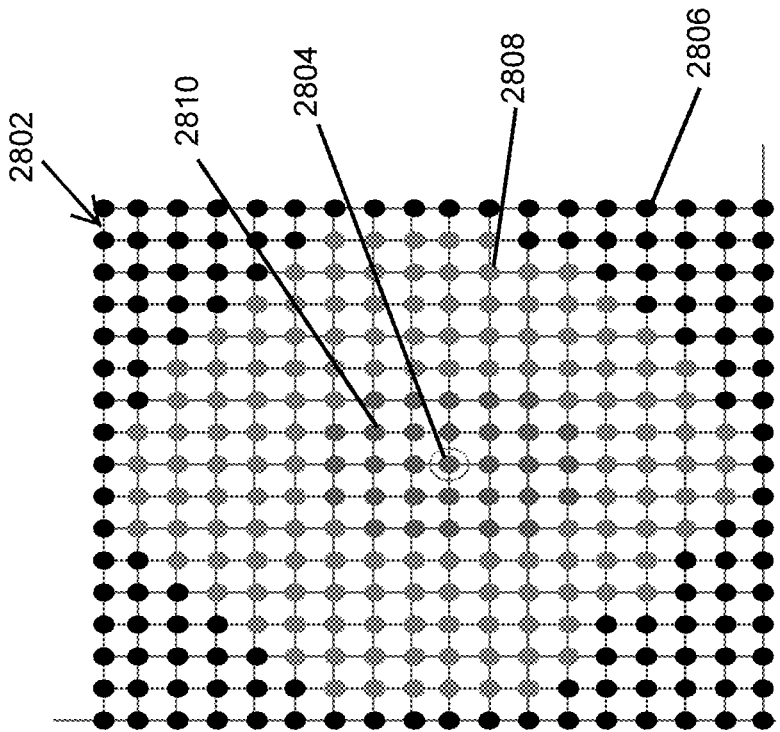
FIG. 28 illustrates a two-dimensional array populated with light illuminance data generated from light intensity data of the two-dimensional array of FIG. 27 according to an example embodiment.

In some example embodiments, after being fully or mostly populated, the two-dimensional array 2702 may be used to generate a two-dimensional array populated with light illuminance data. To illustrate, FIG. 28 illustrates a two-dimensional array 2802 populated with light illuminance data generated from light intensity data of the two-dimensional array 2702 of FIG. 27 according to an example embodiment. The illuminance values that are used to populate may be generated from the light intensity values of the two-dimensional array 2702 using Equation (1) below.

$$E_H = \frac{I(\alpha, \Psi)\cos^3(\alpha)}{h^2} \qquad \text{Eq. 1}$$

Figure 38:
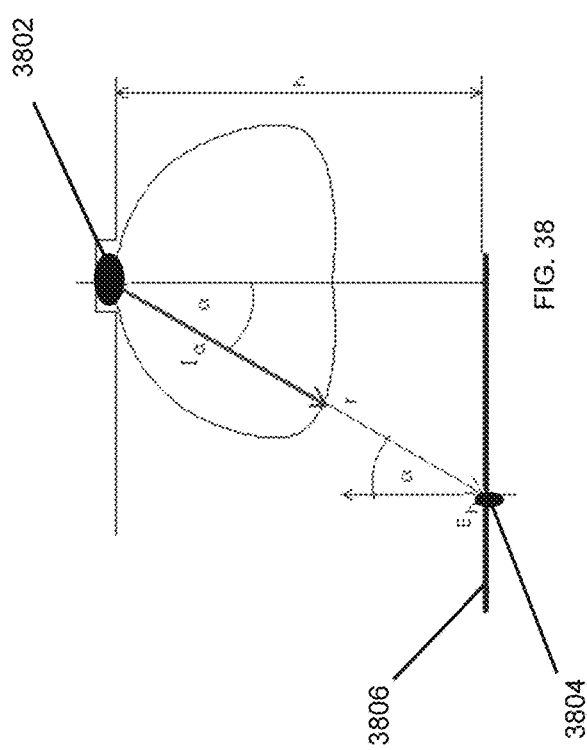
FIG. 38 illustrates parameters used to determine lighting patterns on a floor surface according to an example embodiment.

In Equation (1), $E_H$ represents illuminance values on a horizontal surface, and other parameters of Equation (1) are shown in FIG. 38. For example, $\alpha$ represents a vertical angle, $\Psi$ represents a horizontal angle, and h represents the expected mounting height of a lighting fixture 3802. $I(\alpha, \Psi)$ represents luminance intensity values for vertical and horizontal angles, $\alpha$ and $\Psi$, for the particular expected mounting height, h, of the lighting fixture.

Using different shades (or colors) for illustrative purposes, where each shade (or color) represents an illuminance value, FIG. 28 shows the illuminance values (e.g., illuminance values 2806, 2808, 2810) can vary depending on the relative distances of the different locations of the array 2802 from the location 2804 of the lighting fixture. The location 2804 of the lighting fixture is considered as being directly above a center of the floor level, where the floor level is represented by the two-dimensional array 2802.

In some example embodiments, illuminance values that are below a threshold value may be dropped from the two-dimensional array 2802. For example, the illuminance values represented by the darkest shade in FIG. 28 may be dropped from the two-dimensional array 2802 in subsequent operations performed on the two-dimensional array 2802.

Although particular locations are shown as populated with particular shades in the array 2802, in alternative embodiments, the locations may be populated with different shades without departing from the scope of this disclosure. The AR devices 100, 120, 130 may execute software code, standalone or part of the AR application, to perform the operations described above with respect to FIGS. 27 and 28, for example, in response to relevant user inputs as can be readily understood by those of ordinary skill in the art with the benefit of this disclosure.

Figure 29:
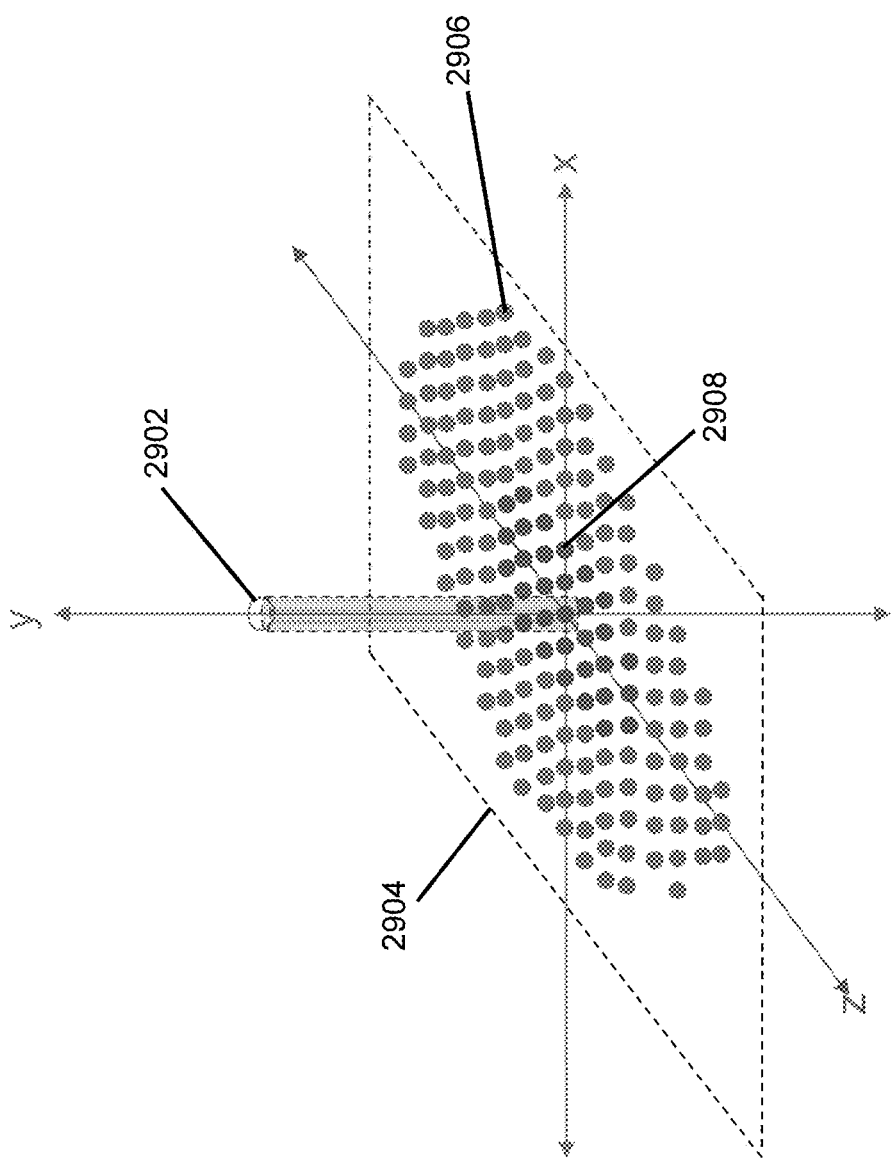
FIG. 29 illustrates augmented reality display information mapped from the light illuminance data of the two-dimensional array of FIG. 28 according to an example embodiment.
Figure 30:
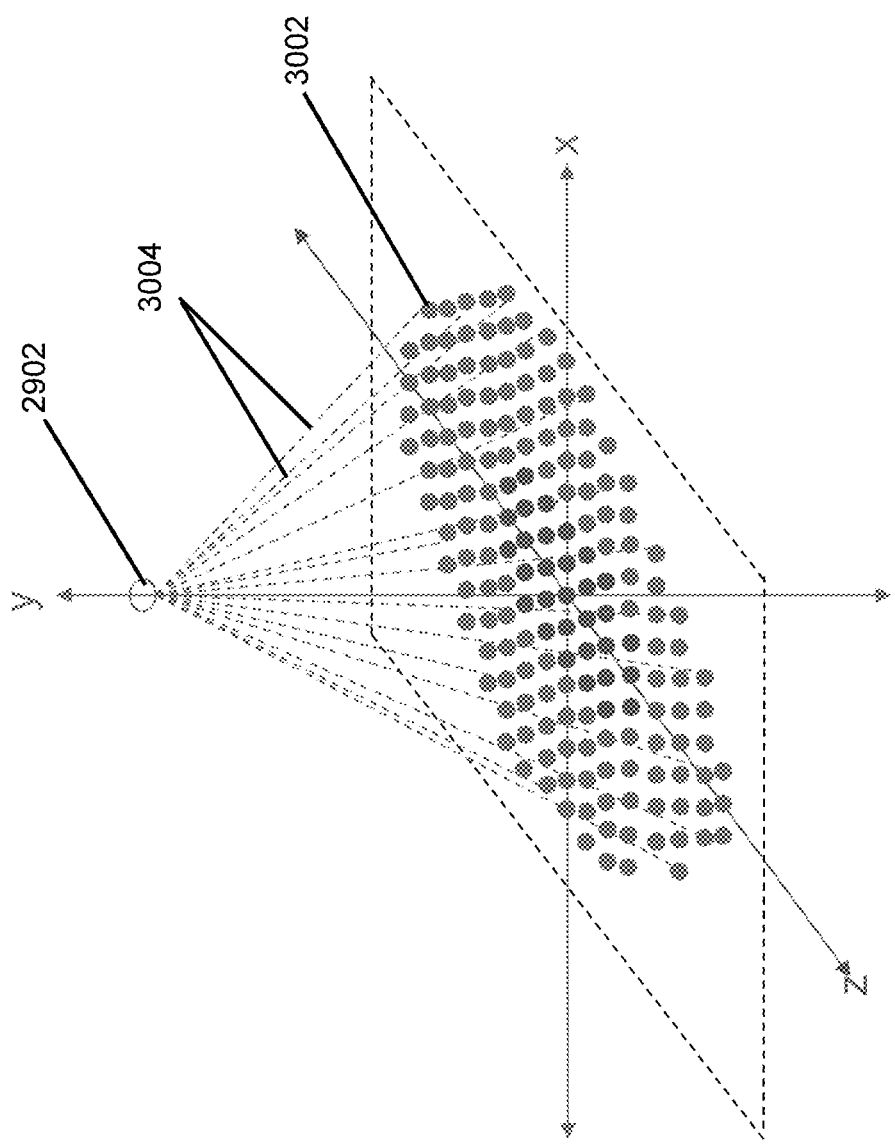
FIG. 30 illustrates the augmented reality display information of FIG. 29 with a lighting shape according to an example embodiment.

In some example embodiments, the illuminance information of the two-dimensional array 2802 may be mapped or otherwise changed to augmented reality display information, before or after some illuminance values that are below a threshold value are dropped. FIG. 29 illustrates augmented reality display information mapped from the light illuminance data of the two-dimensional array 2802 of FIG. 28 according to an example embodiment. FIG. 30 illustrates the augmented reality display information of FIG. 29 with a lighting shape according to an example embodiment. In FIGS. 29 and 30, a location 2902 of a lighting fixture is shown above a center of the floor level area 2904 at an expected installation or mounting height. The location 2902 of the lighting fixture corresponds to the location 2704 shown in FIG. 27 and the location 2804 shown in FIG. 28 and represents the location of the lighting fixture at an expected installation/mounting height above the floor level area 2904, which corresponds to the two-dimensional array 2802. In some example embodiments, the reference to augmented reality in this specification is intended to include mixed reality (MR) as can be understood by those of ordinary skill in the art with the benefit of this disclosure.

Using different shades (or colors) for illustrative purposes, where each shade (or color) represents an illuminance value, FIG. 29 shows the illuminance values (e.g., illuminance values 2906, 2908) can vary depending on the relative distances of the locations on the floor level area 2904 from the location 2902 of the lighting fixture above the center of the floor level area 2904. As can be seen in FIG. 29, illuminance values for locations that are relatively too distant from the location 2902 of the lighting fixture have been removed, for example, based on comparisons of the illuminance values against a minimum threshold (e.g., 2.5 FC). To illustrate, the floor level area 2904 would be more fully populated if the relatively low illuminance values are not removed. The illuminance values for such locations may be dropped or removed by performing the comparison against the minimum threshold before or after transforming the illuminance information in the two-dimensional array 2802 of FIG. 28 to the augmented reality display information displayed in FIG. 29.

In some example embodiments, lines, such as the dotted lines 3004, extending between the location 2902 and the populated locations (e.g., the shaded circle 3002) of the floor level area 2904 may represent a general lighting shape of the light that would be provided by the lighting fixture installed at the location 2902. For example, the dotted lines 3004 may extend between the location 2902 and the shaded circles (e.g., the shaded circle 3002) that represent outer contour of the light as determined by comparing the illuminance values represented by the shaded circles against the minimum threshold of illuminance.

In some alternative embodiments, multiple floor level areas may be displayed with respect to a respective location of a respective lighting fixture similar to the floor level area 2904 and the location 2902 of a light fixture, where, for example, the different floor level areas represent different areas of the same room. In some alternative embodiments, some floor level areas may overlap such that some illuminance values of different floor level areas may be additively combined. Although particular locations of the floor level area 2904 are shown as populated with the shaded circles representing illuminance values, in alternative embodiments, more or fewer locations or different locations may be populated without departing from the scope of this disclosure.

Figure 31:
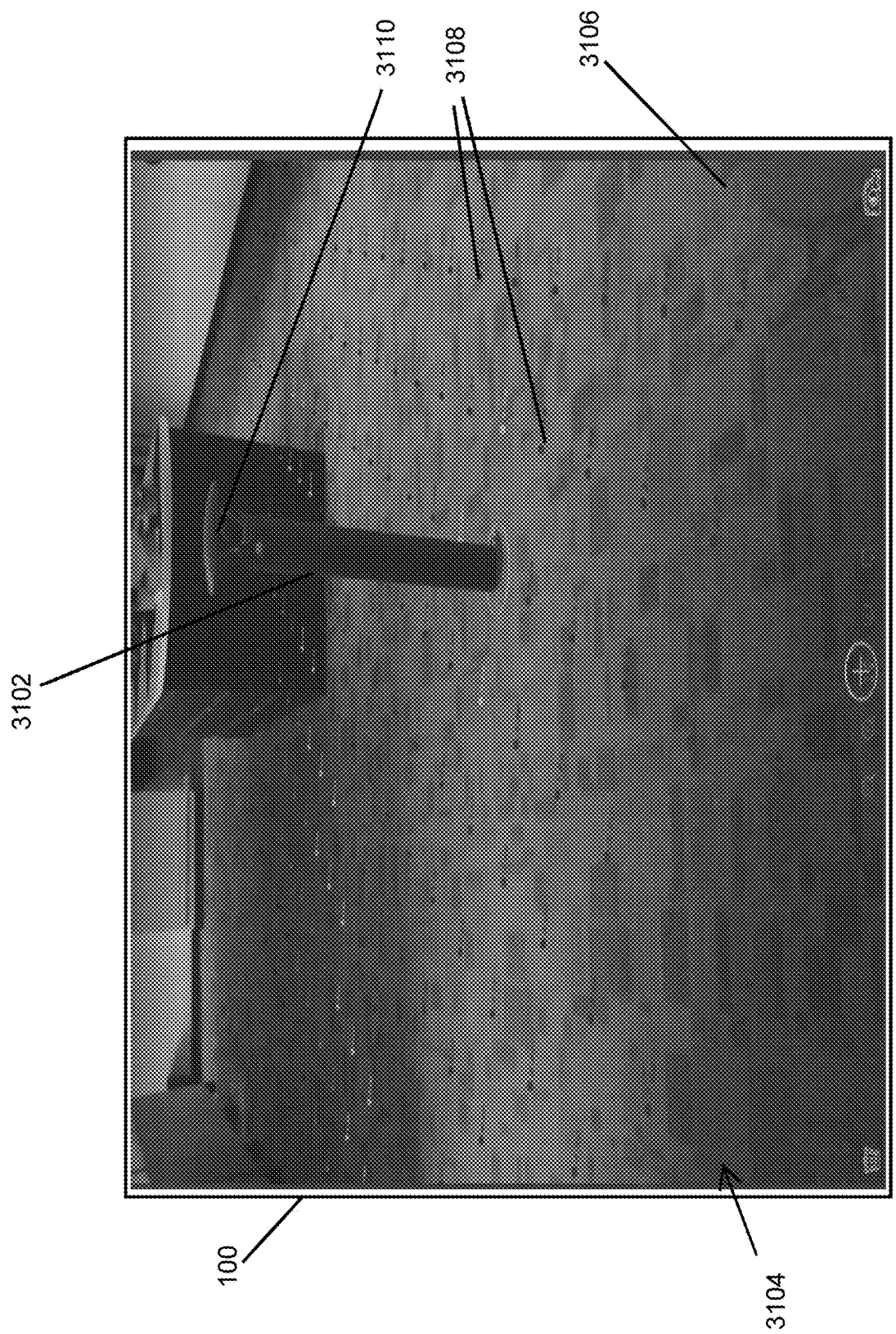
FIG. 31 illustrates a 3-D model of a lighting fixture and luminance values generated based on photometric data overlaid on a real-time image of a target physical area according to an example embodiment.
Figure 32:
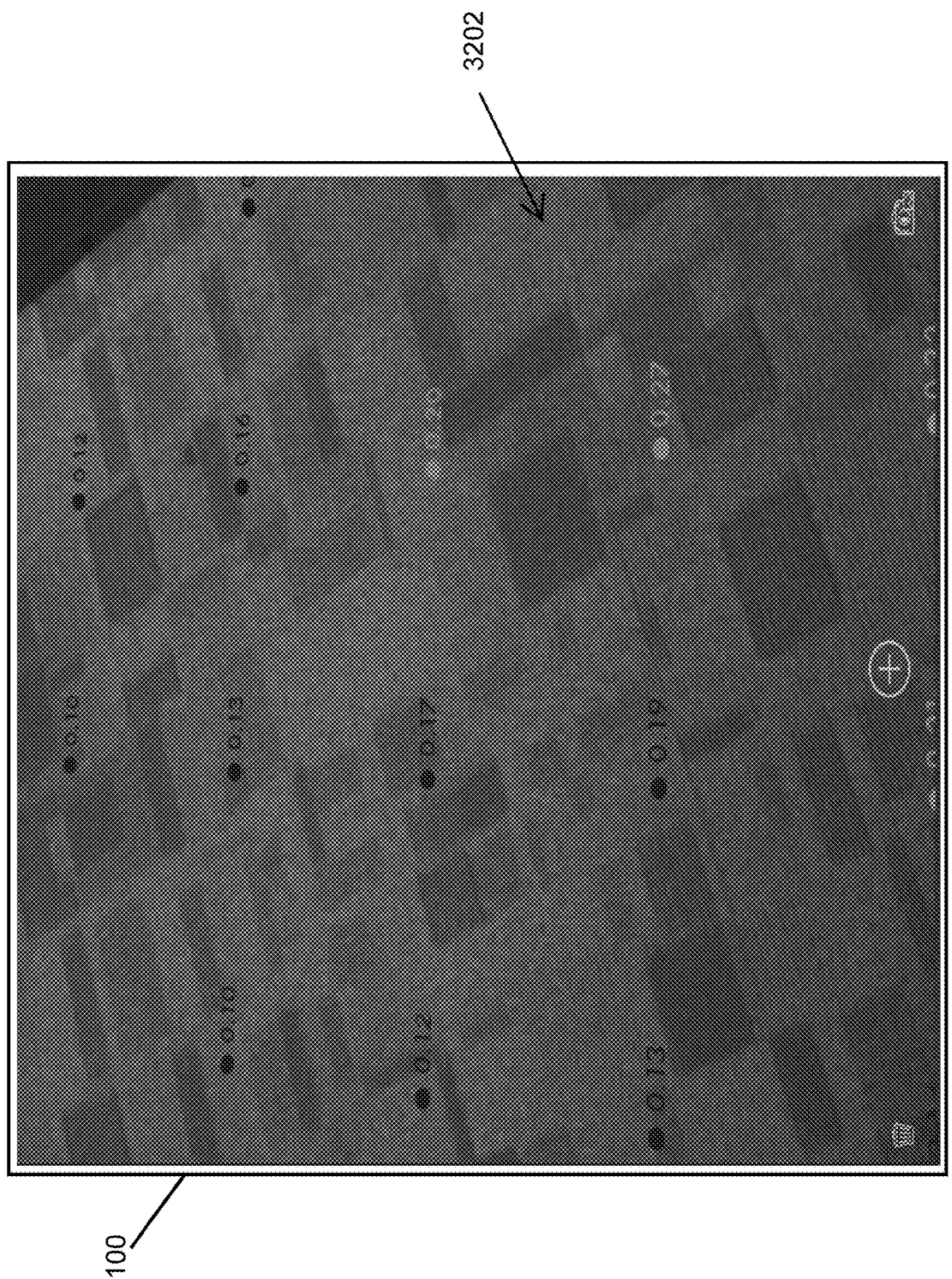
FIG. 32 illustrates a close up view of a portion of the real-time image shown in FIG. 31 according to an example embodiment.

FIG. 31 illustrates a 3-D model 3102 of a lighting fixture and illuminance values generated based on photometric data overlaid on a real-time image 3104 of a target physical area according to an example embodiment. FIG. 32 illustrates a close up view of a portion 3202 of the real-time image shown in FIG. 31 according to an example embodiment. Referring to FIGS. 1B, 31 and 32, in some example embodiments, the illuminance values, such as illuminance values 3108, that are overlaid on the real-time image 3104 may be generated in a manner described with respect to FIGS. 27-30. For example, before the illuminance values are displayed overlaid on the real-time image 3104, the AR device 100 may execute software code (e.g., standalone and/or part of the AR application) to perform the operations described above with respect to FIGS. 27-30 when a user places the 3-D model 3102 at the location in the real-time image 3104. For example, when a user places the 3-D model 3102 at the location in the real-time image 3104, the AR device 100 may execute a software code to select and parse the photometric data file (e.g., IES file) associated with the 3-D model 3102 and to extract relevant information, such as horizontal angle, vertical angle, and luminous intensity values.

In some example embodiments, the AR device 100 may use the location of a light source 3110 of the 3-D model 3102 as the mounting height of the lighting fixture represented by the 3-D model 3102 and extract relevant horizontal angle, vertical angle, and intensity values from the photometric data file for that particular height. The AR device 100 may use the information obtained from the photometric data file to determine illuminance values for different locations at the floor level of the real-time image 3104 of the target physical area in a similar manner as described with respect to FIGS. 27-30. For example, the floor level area 2904 shown in FIG. 29 may correspond to at least a portion of the floor 3106 in the real-time image 3104 displayed on the viewport 106 of the AR device 100.

In some example embodiments, upon determining the illuminance values for different locations at the floor level, for example, as described with respect to FIG. 28, the AR device 100 may display the illuminance values overlaid on the real-time image 3104 as shown in FIGS. 31 and 32. In some example embodiments, upon determining the illuminance values for different locations at the floor level and the general lighting shape as augmented reality information, for example, as described with respect to FIGS. 29 and 30, the AR device 100 may display the illuminance values along with the general lighting shape overlaid on the real-time image 2604 as shown in FIG. 26.

In some example embodiments, if the user moves the 3-D model 3102 to a different location in the real-time image 3104, the AR device 100 may repeat the operations for the new location of the 3-D model 3102. If the user places another 3-D model on the real-time image 3104, the AR device 100 may perform the operations for the new 3-D model. In some example embodiments, two or more illuminance values generated based on two or more 3-D models may be associated with a single location on the floor 3106 of the real-time image 3104. In such cases, the two or more illuminance values may be combined into a single illuminance value that may be displayed at the particular location on the floor 3106.

Although the FIGS. 30 and 31 are described with respect to the AR device 100, the AR devices 120, 130 or another AR device may be used without departing from the scope of this disclosure. Although a 3-D model of a particular lighting fixture is shown in FIG. 30, in alternative embodiments, a 3-D model of a different type of lighting fixture may be used. For example, 3-D models of a ceiling mounted lighting fixture, a suspended lighting fixture, etc. may be used.

Figure 33:
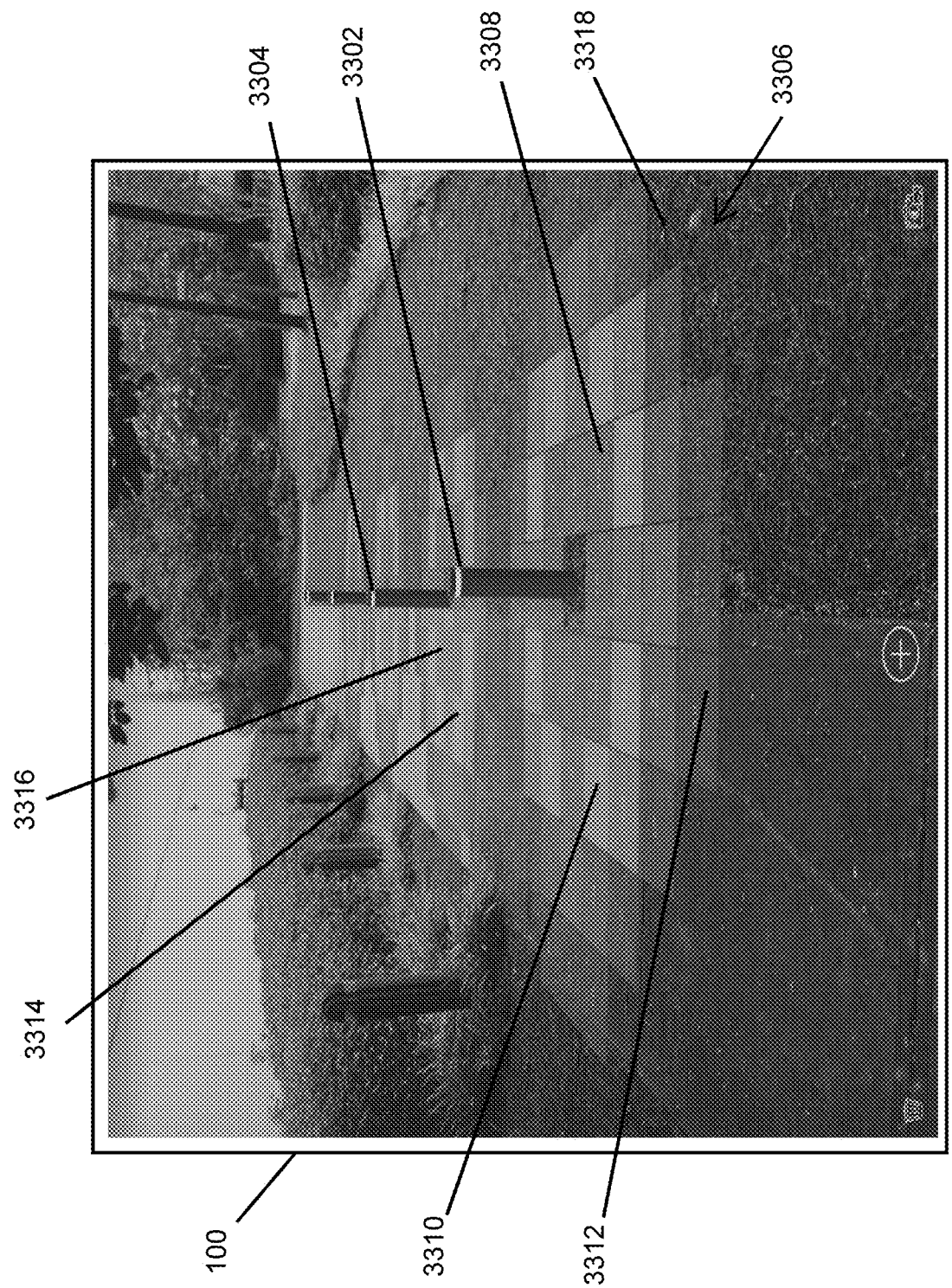
FIG. 33 illustrates 3-D models of a lighting fixture and color coded illuminance information overlaid on a real-time image of a target physical area according to an example embodiment.

FIG. 33 illustrates 3-D models 3302, 3304 of a lighting fixture and color coded illuminance information overlaid on a real-time image 3306 of a target physical area according to an example embodiment. Referring to FIGS. 1B and 33, in some example embodiments, the illuminance values that are determined as described with respect to FIGS. 27-30 may be represented by colored images, such as colored images 3308-3316, that are overlaid on the real-time image 3306. For example, the colored images including the colored images 3308-3316 may be rectangular images, where each colored image is filled with a color corresponding to a particular illuminance value (e.g., 4.5 FC, 5.5 FC, etc.) or a range of illuminance values. The colored images may be overlaid on the ground 3318 of the real-time image 3306 of the target physical area displayed in the viewport 106 of the AR device 100. The AR device 100 may execute the lighting design AR application or another software code to generate the color coded illuminance information from the illuminance values determined as described above with respect to FIGS. 27-30.

In some example embodiments, the colored images including the colored images 3308-3316 may be displayed as a "heat-map," where locations on the ground 3318 that are associated with higher illuminance values are shown with more reddish colors and where locations on the ground 3318 that are associated with lower illuminance values are shown with more bluish colors. Locations on the ground 3318 that are associated with mid-range illuminance values may be shown with greenish colors. Alternatively, different shades of grey and/or other colors may be used to convey illuminance information.

In some example embodiments, the illuminance values associated with multiple 3-D models, such as the 3-D models 3302, 3304, and the same location on the ground 3318 may be added together, and the sum of the illuminance values may be conveyed by the colored images. In some example embodiments, a particular color of the colored images may represent a range of illuminance values. For example, red may represent illuminance values above 5 FC, and green may represent illuminance values between 4 FC and 5 FC.

In some alternative embodiments, the colored images that are overlaid on the ground 3318 may have one or more other shapes instead of or in addition to the rectangular shape. In some alternative embodiments, the colored images may be replaced by a continuous image, where different areas of the image have different colors that convey respective illuminance information. In some example embodiments, illuminance values may be displayed in addition to the colored images that convey the color coded illuminance information.

Although the FIG. 33 is described with respect to the AR device 100, the AR devices 120, 130 or another AR device may be used without departing from the scope of this disclosure. Although 3-D models of a particular lighting fixture are shown in FIG. 33, in some alternative embodiments, 3-D models of different type or types of lighting fixture may be used. For example, 3-D models of indoor lighting fixture, a wall mounted lighting fixture, etc. may be used.

Figure 34:
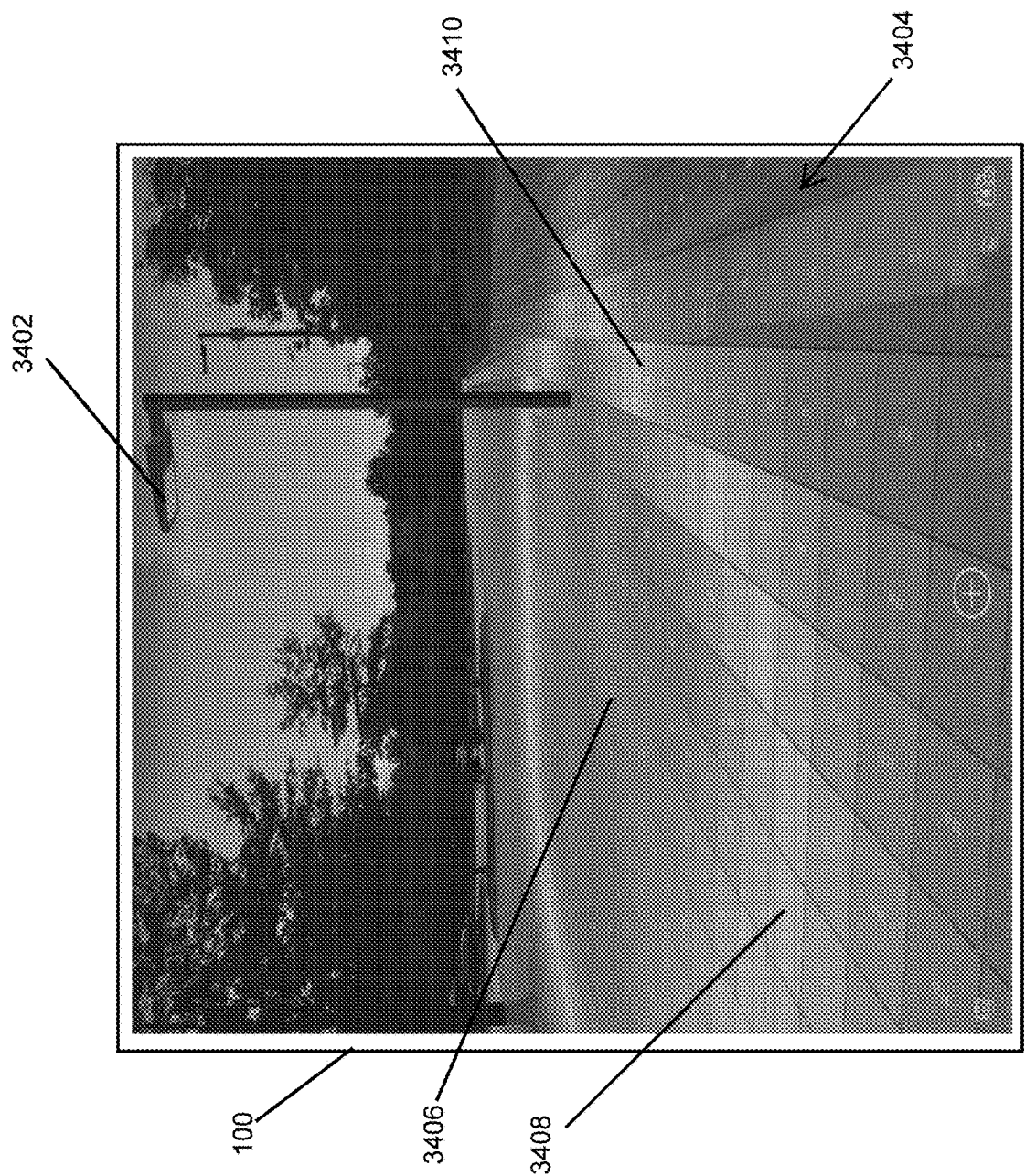
FIG. 34 illustrates a 3-D model of a lighting fixture and color coded illuminance information overlaid on a real-time image of a target physical area according to an example embodiment.

FIG. 34 illustrates a 3-D model 3404 of a lighting fixture and color coded illuminance information overlaid on a real-time image 3404 of a target physical area according to an example embodiment. Referring to FIGS. 1B and 34, in some example embodiments, the illuminance values that are determined as described with respect to FIGS. 27-30 may be represented by colored images, such as colored images 3406-3410, that are overlaid on the real-time image 3306. For example, the colored images including the colored images 3406-3410 may be rectangular images, where each colored image is filled with a color corresponding to a particular illuminance value (e.g., 4.5 FC, 5.5 FC, etc.) or a range of illuminance values (e.g., below 3.2 FC, 3.2 FC-4.5 FC, 4.5 FC-5.5 FC, above 5.5 FC, etc.). The colored images may be overlaid on the ground of the real-time image 3404 of the target physical area displayed in the viewport 106 of the AR device 100. The AR device 100 may execute the lighting design AR application or another software code to generate the color coded illuminance information from the illuminance values determined as described above with respect to FIGS. 27-30.

In some example embodiments, the colored images including the colored images 3406-3410 may be displayed as a "heat-map" in a similar manner as described with respect to FIG. 33. In some example embodiments, the illuminance values associated with multiple 3-D models and the same location on the ground 3318 may be added together, and the sum of the illuminance values may be conveyed by the colored images.

In some alternative embodiments, the colored images that are overlaid on the ground may have one or more other shapes instead of or in addition to the rectangular shape. In some alternative embodiments, the colored images may be replaced by a continuous image, where different areas of the image have different colors that convey respective illuminance information. In some example embodiments, illuminance values may be displayed in addition to the colored images that convey the color coded illuminance information.

Although the FIG. 34 is described with respect to the AR device 100, the AR devices 120, 130 or another AR device may be used without departing from the scope of this disclosure. Although a 3-D model of a particular lighting fixture is shown in FIG. 34, in some alternative embodiments, a 3-D model of a different type of lighting fixture may be used. In some alternative embodiments, more than one 3-D model of a lighting fixture may be overlaid on the real-time image.

Figure 35:
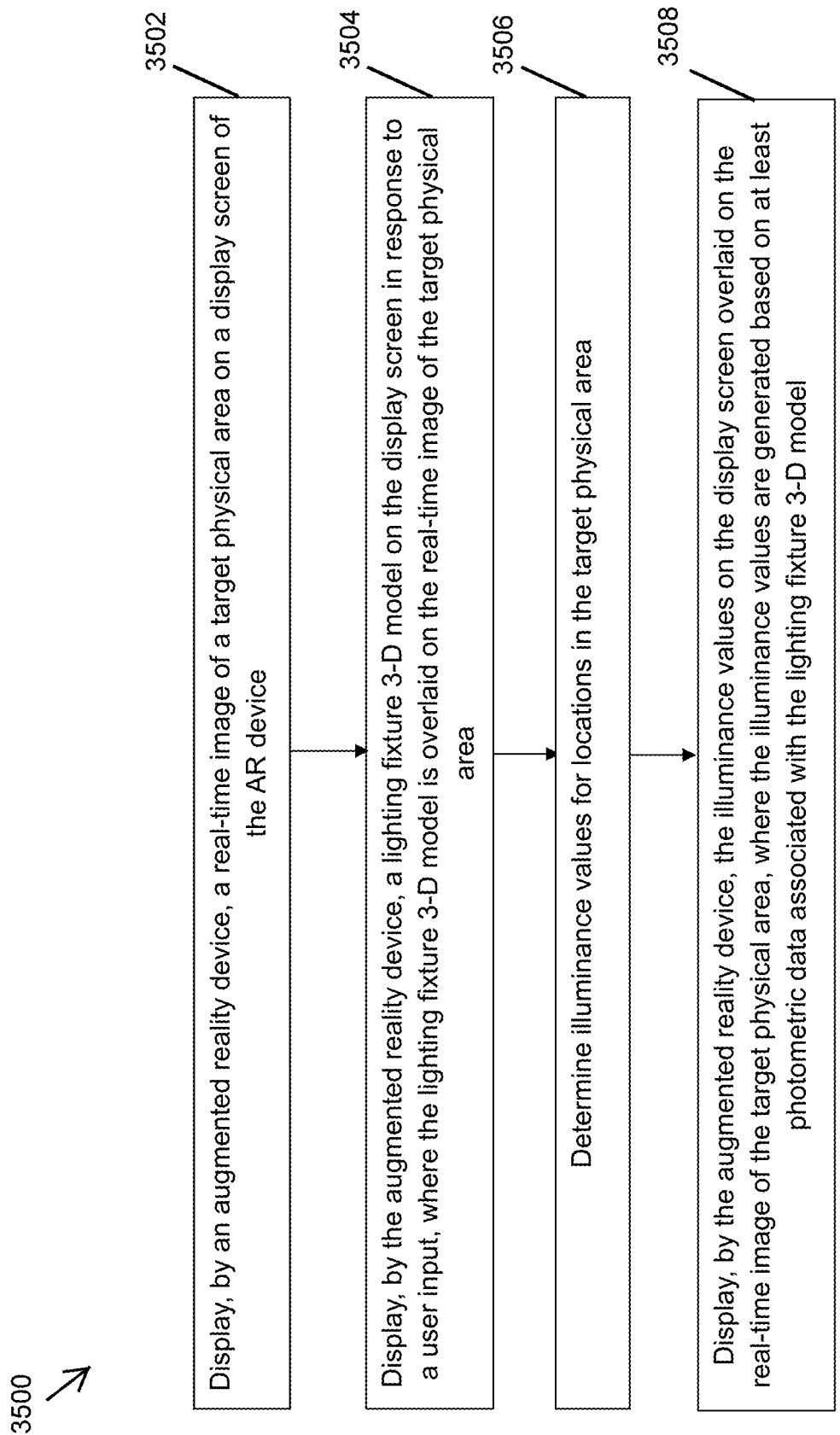
FIG. 35 illustrates a method of augmented reality-based lighting design according to an example embodiment.

FIG. 35 illustrates a method 3500 of augmented reality-based lighting design according to an example embodiment. Referring to FIGS. 1A-1D, 7A-7C, and 26-35, in some example embodiments, the method 3500 includes, at step 3502 displaying, by an augmented reality device, a real-time image of a target physical area on a display screen of the AR device. For example, the AR devices 100, 120, 130 may display a real-time image, such as the real-time image 702, 2604, 3104, 3306, 3404, of a target physical area such as a room, a parking lot, etc. The real-time image may be displayed on a viewport/display screen of the AR device as viewed by the camera of the AR device (e.g., the camera 102 of the AR device 100).

At step 3504, the method 3500 may include displaying, by the augmented reality device, a lighting fixture 3-D model on the display screen in response to a user input, where the lighting fixture 3-D model is overlaid on the real-time image of the target physical area. For example, the 3-D model 602, 2602, 3102, 3302, 3304, 3402 may be overlaid on the respective real-time image displayed in the viewport/display screen of the AR devices 100, 120, 130. To illustrate, a user may select a 3-D model of a lighting fixture from a menu of 3-D models of lighting fixtures provided on the viewport/display screen of the AR device and place the selected 3-D model at a desired location in the real-time image displayed on the viewport/display screen.

At step 3506, the method 3500 may include determining illuminance values for locations in the target physical area. For example, the AR devices 100, 120, 130 may determine illuminance values for locations on the floor/ground of the real-time image of the target physical area displayed on the AR devices 100, 120, 130 in a manner described with respect to FIGS. 27-30. In some example embodiments, the AR devices 100, 120, 130 may start performing steps to determine illuminance values upon the placement of the 3-D model of a lighting fixture in the real-time image of the target physical area.

At step 3508, the method 3500 may include displaying, by the augmented reality device, the illuminance values on the display screen overlaid on the real-time image of the target physical area. The illuminance values are generated based on at least photometric data associated with the lighting fixture 3-D model, for example, as described above with respect to FIGS. 27-30. For example, the AR devices 100, 120, 130 may display the illuminance values on the viewport/display screen of the AR devices 100, 120, 130 as shown in FIGS. 7B, 7C, 26, 31, and 32. In some example embodiments, the AR devices 100, 120, 130 may display on the viewport/display screen of the AR device the general lighting shape defined by the outer contour of the light that can be provided by the lighting fixture represented by the 3-D model in a similar manner as shown, for example, in FIG. 26.

In some alternative embodiments, one or more steps of the method 3500 may be omitted or may be performed in a different order than described above. Although some of the steps of the method 3500 are described with respect to one or more images or figures, the steps may be applicable to other images and figures without departing from the scope of this disclosure. Although some of the steps of the method 3500 are described with respect to the AR devices 100, 120, 130, the steps may be performed by other AR devices without departing from the scope of this disclosure. In general, the steps of the method 3500 may be performed by the AR devices 100, 120, 130 or another AR device that executes software code that is standalone or integrated in the lighting design AR application. For example, a controller (e.g., the controller 202) of the AR devices may execute software code to perform the steps of the method 3500.

Figure 36:
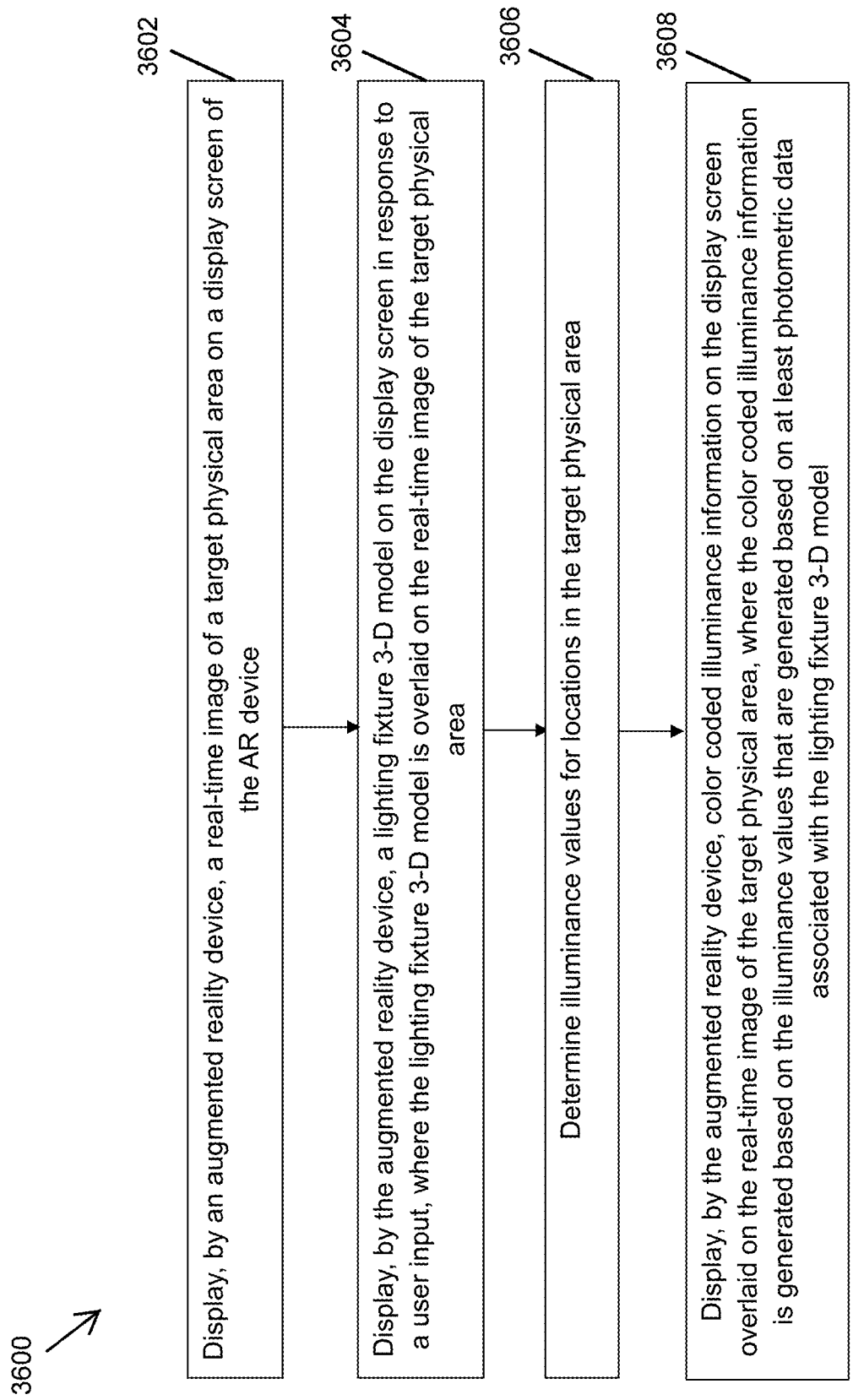
FIG. 36 illustrates a method of augmented reality-based lighting design according to another example embodiment.

FIG. 36 illustrates a method of augmented reality-based lighting design according to another example embodiment. Referring to FIGS. 1A-1D, 7A-7C, 16, and 26-36, in some example embodiments, the method 3600 includes at step 3602 displaying, by an augmented reality device, a real-time image of a target physical area on a display screen of the AR device. For example, the AR devices 100, 120, 130 may display a real-time image, such as the real-time image 702, 2604, 3104, 3306, 3404, of a target physical area such as a room, a parking lot, etc. The real-time image may be displayed on a viewport/display screen of the AR device as viewed by the camera of the AR device (e.g., the camera 102 of the AR device 100).

At step 3604, the method 3600 may include displaying, by the augmented reality device, a lighting fixture 3-D model on the display screen in response to a user input, where the lighting fixture 3-D model is overlaid on the real-time image of the target physical area. For example, the 3-D model 602, 2602, 3102, 3302, 3304, 3402 may be overlaid on the respective real-time image displayed in the viewport/display screen of the AR devices 100, 120, 130. To illustrate, a user may select a 3-D model of a lighting fixture from a menu of 3-D models of lighting fixtures provided on the viewport/display screen of the AR device and place the selected 3-D model at a desired location in the real-time image displayed on the viewport/display screen.

At step 3606, the method 3600 may include determining illuminance values for locations in the target physical area. For example, the AR devices 100, 120, 130 may determine illuminance values for locations on the floor/ground of the real-time image of the target physical area displayed on the AR devices 100, 120, 130 in a manner described with respect to FIGS. 27-30. In some example embodiments, the AR devices 100, 120, 130 may start performing steps to determine illuminance values upon the placement of the 3-D model of a lighting fixture in the real-time image of the target physical area.

At step 3608, the method 3600 may include displaying, by the augmented reality device, color coded illuminance information on the display screen overlaid on the real-time image of the target physical area, where the color coded illuminance information is generated from the illuminance values that are generated based on at least photometric data associated with the lighting fixture 3-D model, for example, as described above with respect to FIGS. 27-30. For example, the AR devices 100, 120, 130 may display color coded illuminance information on the viewport/display screen of the AR devices 100, 120, 130 shown in FIGS. 33 and 34 as shades of grey. In some example embodiments, the AR devices 100, 120, 130 may display, on the viewport/display screen of the respective AR device, the illuminance values in addition to the color coded illuminance information in a similar manner as shown, for example, in FIGS. 33 and 34. In some example embodiments, the AR devices 100, 120, 130 may display, in addition to the color coded illuminance information and/or the illuminance values, the general lighting shape defined by the outer contour (i.e., outer perimeter) of the light that can be provided by the lighting fixture represented by the 3-D model. In some example embodiments, the method 3600 may include displaying, by the augmented reality device, the illuminance values on the display screen overlaid on the real-time image of the target physical area instead of or before displaying color coded illuminance information.

In some alternative embodiments, one or more steps of the method 3600 may be omitted or may be performed in a different order than described above. Although some of the steps of the method 3600 are described with respect to one or more images or figures, the steps may be applicable to other images and figures without departing from the scope of this disclosure. Although some of the steps of the method 3600 are described with respect to the AR devices 100, 120, 130, the steps may be performed by other AR devices without departing from the scope of this disclosure. In general, the steps of the method 3600 may be performed by the AR devices 100, 120, 130 or another AR device that executes software code that is standalone or integrated in the lighting design AR application. For example, a controller (e.g., the controller 202) of the AR devices may execute software code to perform the steps of the method 3600.

Referring to FIGS. 1A-1D, 2, 7A-7C, and 26-36, a user may use an AR device, such as the AR devices 100, 120, 130, to execute lighting design AR application, IoT design AR application, and/or other software code or applications to perform operations described above. For example, a user may assess how lighting fixtures represented by lighting fixture 3-D models will look prior to installing the lighting fixtures in the target area. A user may also assess the lighting effect of lights from lighting fixtures represented by lighting fixture 3-D models prior to installing the lighting fixtures. Using an AR device, such as the AR devices 100, 120, 130, a user (e.g., a lighting designer, owner, etc.) may more effectively perform lighting design of a particular area (e.g., a living room, a bedroom, a hallway, office, warehouse, an outdoor landscape, a parking lot, etc.) without having to install actual lighting fixtures and at the same time minimizing design errors. Because lighting fixture models, illuminance values, and color coded illuminance information that are overlaid on a real-time image of a target physical are associated with/anchored to physical locations of the target physical area, a user may move in the target physical area holding the AR device 100 and assess the placements of lighting fixtures and the resulting lighting effect at different locations in the target physical area. As the user moves through and near the target physical area, the real-time image of the target physical area and the images and information overlaid on the real-time image may change depending on the part of the target physical area that is viewable by the camera of the AR device.

Figure 37:
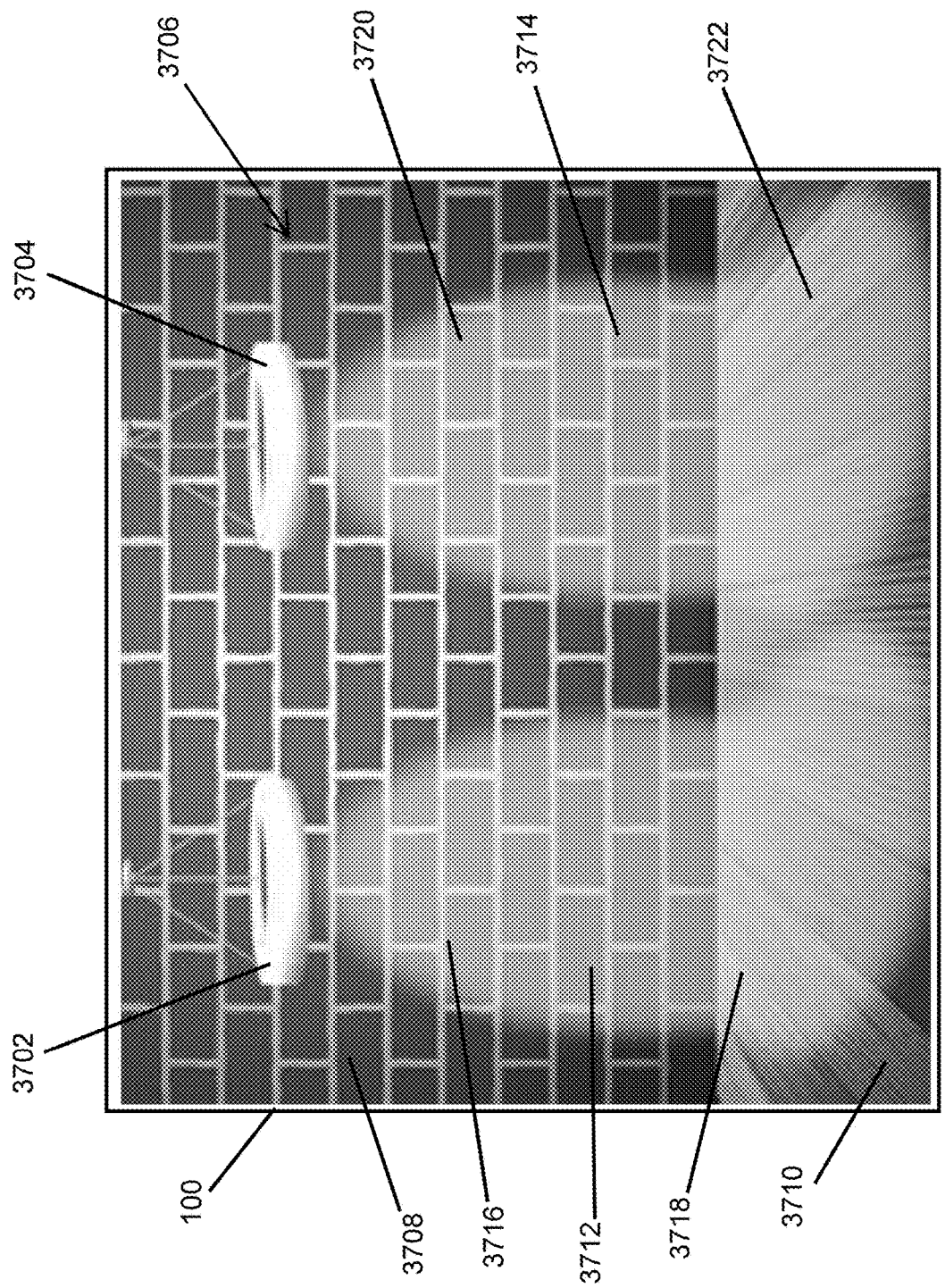
FIG. 37 illustrates 3-D models of a lighting fixture and respective lighting patterns overlaid on a real-time image of a target physical area according to an example embodiment.

FIG. 37 illustrates 3-D models 3702, 3704 of a lighting fixture and respective lighting patterns 3712, 3714 overlaid on a real-time image 3706 of a target physical area according to an example embodiment. Referring to FIGS. 1 and 37, in some example embodiments, the 3-D models 3702, 3704 and the real-time image 3706 may be displayed on the viewport/display screen 106 of the AR device 100. For example, the real-time image 3706 may include a wall 3708 and a floor 3710. The lighting patterns 3712, 3714 may be overlaid on the real-time image 3706 as translucent images to more realistically show the appearance of the lights that may be provided by the lighting fixtures represented by the 3-D models 3702, 3704.

In some example embodiments, a portion 3716, 3720 of each lighting pattern 3712, 3714, respectively, may be overlaid on the wall 3708, and another portion 3718, 3722 of each lighting pattern 3712, 3714, respectively, may be overlaid on the floor 3710. The contour (i.e., the outer perimeter) of each lighting pattern 3712, 3714 that is overlaid on the floor 3710 may be determined in a similar manner as described above with respect to FIGS. 26-30, for example, based on a minimum illuminance threshold, where illuminance values below the minimum threshold are excluded. For example, the minimum illuminance threshold may be predetermined (e.g., stored as a default setting) or may be provided by a user. The illuminance values that are used to determine the contours of the lighting pattern 3712, 3714 with respect to the floor 3710 may be determined from photometric data files (e.g., IES files) in a similar manner as described with respect to FIGS. 26-36. The area within the contour of each lighting pattern 3712, 3714 may be uniformly filled, for example, with a translucent filling as shown in FIG. 37.

In some example embodiments, the lighting patterns 3712, 3714 may also indicate the color temperature of the lights that may be provided by the lighting fixtures represented by the 3-D models 3702, 3704. For example, different translucence levels of the lighting patterns 3712, 3714 may provide a realistic indication of the color temperature of the lights that may be provided by the lighting fixtures represented by the 3-D models 3702, 3704. The color temperature information that is used to indicate the color temperature of the lights represented by the lighting patterns 3712, 3714 may be obtained from the respective photometric data file (e.g., IES file) associated with the 3-D models 3702, 3704.

In some example embodiments, the lighting patterns 3712, 3714 may be display models that are similar to display models described above with respect to FIGS. 1A-25. For example, each display model may be a 2D polygon, a 3-D polygon, and a combination of 2D and/or 3-D polygons, graphical image(s), another type of image(s), etc. that is overlaid on the real-time image of the target physical area as well as the lighting fixture 3-D model(s).

Because the 3-D models 3702, 3704 as well as the lighting patterns 3712, 3714 are virtually anchored to locations (e.g., coordinates) in the target physical area, the 3-D models 3702, 3704 as well as the lighting patterns 3712, 3714 may be viewed from different sides by moving the AR device 100 such that the camera 102 has a different view of the target physical area. In some example embodiments, if some parts of the 3-D models 3702, 3704 and/or the lighting patterns 3712, 3714 are blocked from the view of the camera 102, for example, by an object such as a wall, the particular parts of the 3-D models 3702, 3704 and/or the lighting patterns 3712, 3714 may not be displayed on the viewport/display screen of the AR device 100.

Although the FIG. 37 is described with respect to the AR device 100, the AR devices 120, 130 or another AR device may be used without departing from the scope of this disclosure. Although 3-D models of a particular lighting fixture are shown in FIG. 37, in some alternative embodiments, 3-D models of different type or types of lighting fixture may be used.

Figure 39:
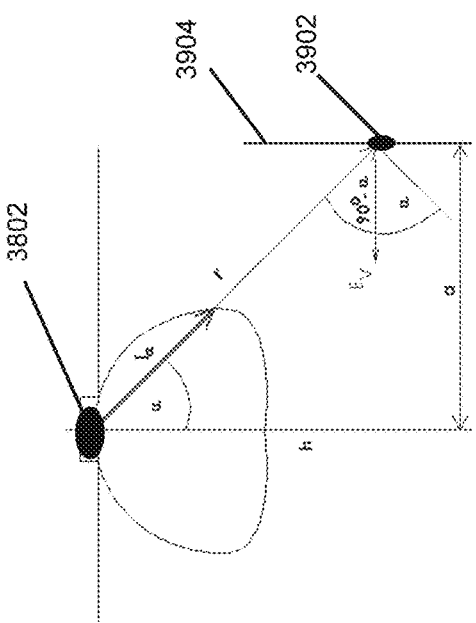
FIG. 39 illustrates parameters used to determine lighting patterns on a wall surface according to an example embodiment.

FIG. 38 illustrates parameters used to determine lighting patterns on a floor surface according to an example embodiment. FIG. 39 illustrates parameters used to determine lighting patterns on a wall surface according to an example embodiment. Referring to FIGS. 1, 7A-7C, and 26-39, illuminance values that are used to generate the lighting patterns 3712, 3714 may be generated using Equation (1) above, and Equation (2) below.

$$E_V = \frac{I(\alpha, \Psi)\cos^2(\alpha)\sin\alpha}{h^2} \qquad \text{Eq. 2}$$

In Equation (2), $E_V$ represents illuminance values on a vertical surface (e.g., a wall), a represents a vertical angle, $\Psi$ represents a horizontal angle, and h represents the expected mounting height of a lighting fixture (i.e., the height of the light source of the lighting fixture) such as the lighting fixture represented by the 3-D models 3702, 3704. $I(\alpha, \Psi)$ represents luminance intensity values for vertical and horizontal angles, $\alpha$ and $\Psi$, for the particular expected mounting height, h, of the lighting fixture. For a particular expected mounting height, h, the luminance intensity value, $I(\alpha, \Psi)$, may be obtained from the photometric data file (e.g., IES file) corresponding to a particular lighting fixture represented by the 3-D models 3702, 3704.

In some example embodiments, illuminance values with respect to locations on the floor 3710 may be determined using Equation (1) and in a similar manner as described with respect to FIGS. 27-30. The illuminance values may be compared to a minimum threshold such that locations on the floor 3710 that are associated with illuminance values that are below the minimum threshold are excluded. Remaining locations on the floor 3710 that are associated with illuminance values that match the minimum threshold or that are above but closest to the minimum threshold may define the illuminance contour of the lighting patterns 3712, 3714 with respect to the floor 3710. In some example embodiments, illuminance values and illuminance contour may be determined with respect to other horizontal surfaces, such as a table top, in a similar manner.

In some example embodiments, illuminance values with respect to locations on the 3708 may be determined using Equation (2) in a similar manner as described with respect to Equation 1 and the floor 3710. After the illuminance values are generated with respect to the wall 3708, the illuminance values may be compared to a minimum threshold such that locations on the wall 3708 that are associated with illuminance values that are below the minimum threshold are excluded. Remaining locations on the wall 3708 that are associated with illuminance values that match the minimum threshold or that are above but closest to the minimum threshold may define the illuminance contour of the lighting patterns 3712, 3714 with respect to the wall 3708. In some example embodiments, illuminance values and illuminance contour may be determined with respect to other horizontal surfaces, such as a table top, in a similar manner.

In some example embodiments, after the illuminance contours are determined with respect to the wall 3708 and the wall 3710, the lighting patterns 3712, 3714 may be generated where the lighting patterns 3712, 3714 are filled in to represent the lights that can be provided by the lighting fixtures represented by the 3-D models 3702, 3704. For example, the areas within the illuminance contours may be filled in to show the spread of the lights on the wall 3708 and the floor 3710. The light spreads on the floor 3710 and the wall 3708 may appear in the viewport/display screen of the AR device 100 as true to life light spreads that closely approximate the real world behavior of lights that will be provided by the lighting fixtures represented by the 3-D models 3702, 3704. The particular color and/or the level of translucency of the lighting patterns 3712, 3714 may indicate the color temperature of the lights that can be provided by the lighting fixtures represented by the 3-D models 3702, 3704. As described above, the color temperature information of the lights that can be provided by the lighting fixtures represented by the 3-D models 3702, 3704 may be obtained from the photometric data file (e.g., IES file) associated with the 3-D models 3702, 3704.

In some example embodiments, a lighting pattern may be determined and displayed by the AR device 100 in a manner described above when a 3-D model of a lighting fixture placed on the viewport 106 of the AR device 100, for example, by selecting the 3-D model from a menu displayed on the viewport 106. In some example embodiments, lighting pattern may be determined and displayed by the AR device 100 in a manner described above when a 3-D model of a lighting fixture is moved from one location to another in the real-time image displayed on the viewport 106 of the AR device 100. The selection and movement of 3-D models may be performed in various ways including gestures, voice commands, a mouse, etc.

Figure 40:
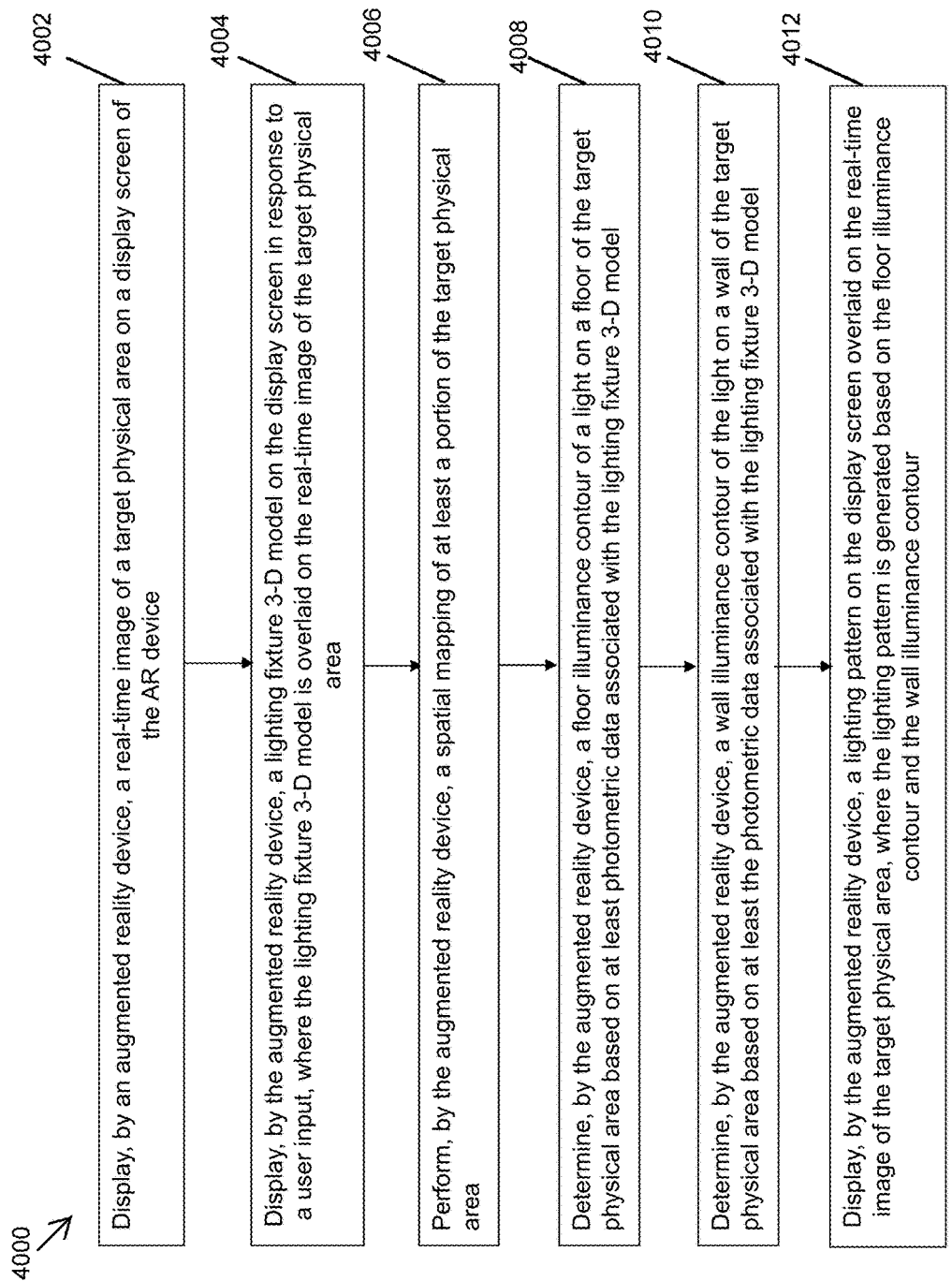
FIG. 40 illustrates a method of augmented reality-based lighting design according to an example embodiment.

FIG. 40 illustrates a method of augmented reality-based lighting design according to an example embodiment. Referring to FIGS. 1A-1D, 7A-7C, and 26-40, in some example embodiments, the method 4000 includes, at step 4002, displaying, by an augmented reality device, a real-time image of a target physical area on a display screen of the AR device. For example, the AR devices 100, 120, 130 may display a real-time image, such as the real-time image 702, 2604, 3104, 3306, 3404, 3706 of a target physical area such as a room, a parking lot, etc. The real-time image may be displayed on a viewport/display screen of the AR device as viewed by the camera of the AR device (e.g., the camera 102 of the AR device 100).

At step 4004, the method 4000 may include displaying, by the augmented reality device, a lighting fixture 3-D model on the display screen in response to a user input, where the lighting fixture 3-D model is overlaid on the real-time image of the target physical area. For example, the 3-D model 602, 2602, 3102, 3302, 3304, 3402, 3702, 3704 may be overlaid on the respective real-time image displayed in the viewport/display screen of the AR devices 100, 120, 130. To illustrate, a user may select a 3-D model of a lighting fixture from a menu of 3-D models of lighting fixtures provided on the viewport/display screen of the AR device and place the selected 3-D model at a desired location in the real-time image displayed on the viewport/display screen.

At step 4006, the method 4000 may include performing, by the augmented reality device, a spatial mapping of at least a portion of the target physical area. For example, the AR devices 100, 120, 130 may execute software code, such as modules of HoloToolkit, to identify surfaces within a radius (e.g., 15 feet) of the location of the 3-D model in the target physical area. For example, PlaneFinding and SurfacePlane.prefab and SurfacePlane.cs that are referenced by the SurfaceMeshesToPlanes components in HoloToolkit may be used to find planar surfaces and classify the surfaces as floor, wall, ceiling, etc. In some alternative embodiments, other AR toolkits, MR toolkits, and/or software developer's kits may be used to perform the above described and other relevant functions.

At step 4008, the method 4000 may include determining, by the augmented reality device, a floor illuminance contour of a light on a floor (e.g., the floor 3710 in FIG. 37) of the target physical area based on at least photometric data associated with the lighting fixture 3-D model, such as the 3-D models 3702, 3704. For example, a floor illuminance contour, i.e., the illuminance contour on a floor such as the floor 3710, may be determined by the AR devices 100, 120, 130 as described above with respect to FIGS. 37-39.

At step 4010, the method 4000 may include determining, by the augmented reality device, a wall illuminance contour of the light on a wall of the target physical area based on at least the photometric data associated with the lighting fixture 3-D model. For example, a wall illuminance contour, i.e., the illuminance contour on a wall such as the wall 3708, may be determined by the AR devices 100, 120, 130 as described above with respect to FIGS. 38 and 39.

At step 4012, the method 4000 may include displaying, by the augmented reality device, a lighting pattern on the display screen overlaid on the real-time image of the target physical area, where the lighting pattern is generated based on the floor illuminance contour and the wall illuminance contour. For example, the lighting patterns 3712, 3714 may be generated by the AR devices 100, 120, 130 based on the floor illuminance contour on the floor 3710 and the wall illuminance contour on the wall 3708.

In some alternative embodiments, one or more steps of the method 4000 may be omitted or may be performed in a different order than described above. Although some of the steps of the method 4000 are described with respect to one or more images or figures, the steps may be applicable to other images and figures without departing from the scope of this disclosure. Although some of the steps of the method 4000 are described with respect to the AR devices 100, 120, 130, the steps may be performed by other AR devices without departing from the scope of this disclosure. In general, the steps of the method 4000 may be performed by the AR devices 100, 120, 130 or another AR device that executes software code that is standalone or integrated in the lighting design AR application. For example, a controller (e.g., the controller 202) of the AR devices may execute software code to perform the steps of the method 4000. Although the AR device 100 may be referenced with respect to some of the figures through this description, the AR devices 120, 130 or another AR device may be used without departing from the scope of this disclosure.

Referring to FIGS. 26-40, a user may use an AR device, such as the AR devices 100, 120, 130, to execute lighting design AR application, IoT design AR application, and/or other software code or applications to perform operations described above. For example, a user may assess how lighting fixtures represented by lighting fixture 3-D models will look prior to installing the lighting fixtures in the target area. A user may also assess the lighting effect of lights from lighting fixtures represented by lighting fixture 3-D models prior to installing the lighting fixtures. Using an AR device, such as the AR devices 100, 120, 130, a user (e.g., a lighting designer, owner, etc.) may more effectively perform lighting design of a particular area (e.g., a living room, a bedroom, a hallway, office, warehouse, an outdoor landscape, a parking lot, etc.) without having to install actual lighting fixtures and at the same time minimizing design errors. Because lighting fixture models, illuminance values, and color coded illuminance information that are overlaid on a real-time image of a target physical are associated with/anchored to physical locations of the target physical area, a user may move in the target physical area holding the AR device 100 and assess the placements of lighting fixtures and the resulting lighting effect at different locations in the target physical area. As the user moves through and near the target physical area, the shape of the lighting pattern displayed on the viewport 106 may change depending on the part of the target area viewable by the camera 102 of the AR device 100 and the corresponding real-time image displayed on the viewport 106.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. An augmented reality-based lighting design method, comprising:

displaying, by an augmented reality device, a real-time image of a target physical area on a display screen;

displaying, by the augmented reality device, a lighting fixture 3-D model of a lighting fixture on the display screen in response to a user input, wherein the lighting fixture 3-D model is overlaid on the real-time image of the target physical area;

generating, by the augmented reality device, a lighting pattern based on illuminance values associated with locations in the target physical area; and displaying, by the augmented reality device, the lighting pattern on the display screen overlaid on the real-time image of the target physical area, wherein a translucence level of the lighting pattern is indicative of a color temperature of a light expected to be provided by the lighting fixture.

2. The method of claim 1, wherein the illuminance values are generated based on at least photometric data associated with the lighting fixture 3-D model or lighting data selected in response to a second user input.

3. The method of claim 1, wherein displaying the lighting pattern on the display screen overlaid on the real-time image of the target physical area includes displaying a portion of the lighting pattern on the display screen overlaid on a wall of the target physical area as shown in the real time image.

4. The method of claim 3, wherein displaying the lighting pattern on the display screen overlaid on the real-time image of the target physical area includes displaying a second portion of the lighting pattern on the display screen overlaid on a floor of the target physical area as shown in the real time image.

5. The method of claim 1, wherein the lighting pattern is generated in response to the lighting fixture 3-D model being placed overlaid on the real-time image of the target physical area.

6. The method of claim 1, wherein the lighting pattern is anchored to a location in the target physical area.

7. The method of claim 1, wherein a contour of the lighting pattern is determined based on the illuminance values and a minimum illuminance threshold and wherein one or more illuminance values that are below the minimum threshold are excluded in generating the lighting pattern.

8. The method of claim 1, wherein the lighting pattern is generated based on a floor illuminance contour with respect to a floor of the target physical area and a wall illuminance contour with respect to a wall of the target physical area adjoining the floor.

9. The method of claim 1, wherein the color temperature of the light expected to be provided by the lighting fixture is obtained from a photometric data associated with the lighting fixture 3-D model.

* * * * *